US010948992B1

(12) United States Patent
Bai

(10) Patent No.: US 10,948,992 B1
(45) Date of Patent: Mar. 16, 2021

(54) RING HUMAN-MACHINE INTERFACE

(71) Applicant: Guiyu Bai, Chandler, AZ (US)

(72) Inventor: Guiyu Bai, Chandler, AZ (US)

( * ) Notice: Subject to any disclaimer, the term of this patent is extended or adjusted under 35 U.S.C. 154(b) by 699 days.

(21) Appl. No.: 15/407,288

(22) Filed: Jan. 17, 2017

Related U.S. Application Data

(62) Division of application No. 14/274,602, filed on May 9, 2014, now Pat. No. 10,139,906.

(60) Provisional application No. 61/932,801, filed on Jan. 29, 2014.

(51) Int. Cl.
| | |
|---|---|
| *G06F 3/01* | (2006.01) |
| *G06F 3/044* | (2006.01) |
| *G06F 3/0346* | (2013.01) |
| *G06F 3/0354* | (2013.01) |
| *G06F 3/0488* | (2013.01) |
| *G06F 1/16* | (2006.01) |

(52) U.S. Cl.
CPC .............. *G06F 3/017* (2013.01); *G06F 1/163* (2013.01); *G06F 3/0346* (2013.01); *G06F 3/03547* (2013.01); *G06F 3/044* (2013.01); *G06F 3/04883* (2013.01); *G06F 2203/04108* (2013.01)

(58) Field of Classification Search
CPC ...................... G06F 3/017; G06F 3/011; G06F 2203/04108; G06F 1/163; G06F 3/04883; G06F 3/03547; G06F 3/0346; G06F 3/044
See application file for complete search history.

(56) References Cited

U.S. PATENT DOCUMENTS

| | | | |
|---|---|---|---|
| 2011/0007035 A1* | 1/2011 | Shai | G06F 3/014 345/179 |
| 2011/0041100 A1* | 2/2011 | Boillot | G06F 3/011 715/863 |
| 2014/0298266 A1* | 10/2014 | Lapp | G06F 3/04886 715/835 |
| 2017/0003762 A1* | 1/2017 | Ishii | G06F 1/1698 |

\* cited by examiner

*Primary Examiner* — Abbas I Abdulselam

(74) *Attorney, Agent, or Firm* — Fish & Richardson P.C.

(57) ABSTRACT

A ring for identify a gesture is provided. A user wears a ring on a first finger, in which the ring has a first contact region facing a second finger adjacent to the first finger, and a second contact region facing a third finger adjacent to the first finger. The first contact region is configured to detect a touch or proximity input from the second finger, and the second contact region is configured to detect a touch or proximity input from the third finger. Each of the first and second contact regions has one or more touch or proximity sensors. The user moves the first, second, and third fingers relative to each other. In response to a first finger and hand gesture, a touch or proximity input is detected at the first contact region but not at the second contact region. In response to a second finger and hand gesture, a touch or proximity input is detected at the second contact region but not at the first contact region. In response to a third finger and hand gesture, touch or proximity inputs are detected at both the first and second contact regions.

39 Claims, 58 Drawing Sheets

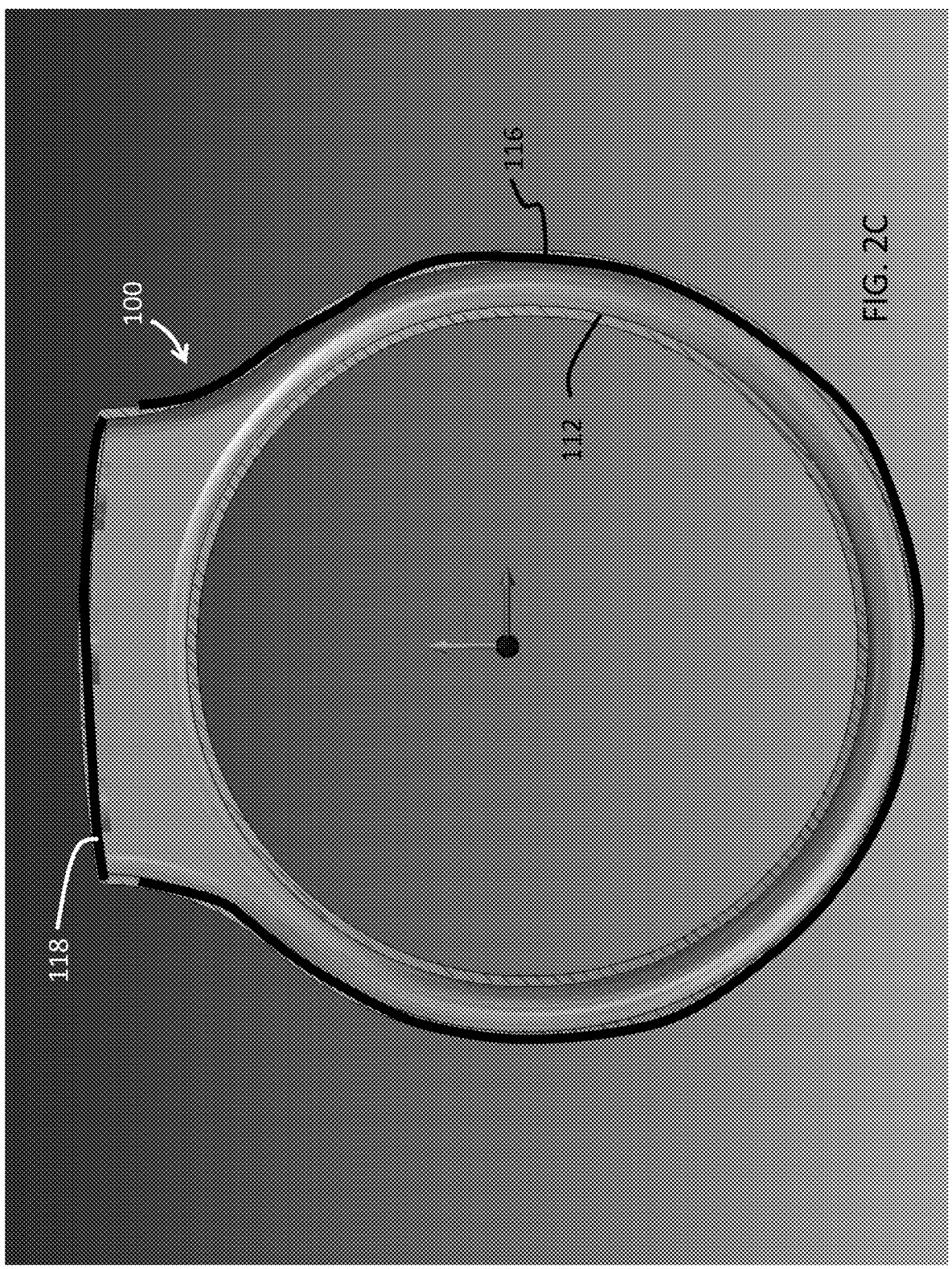

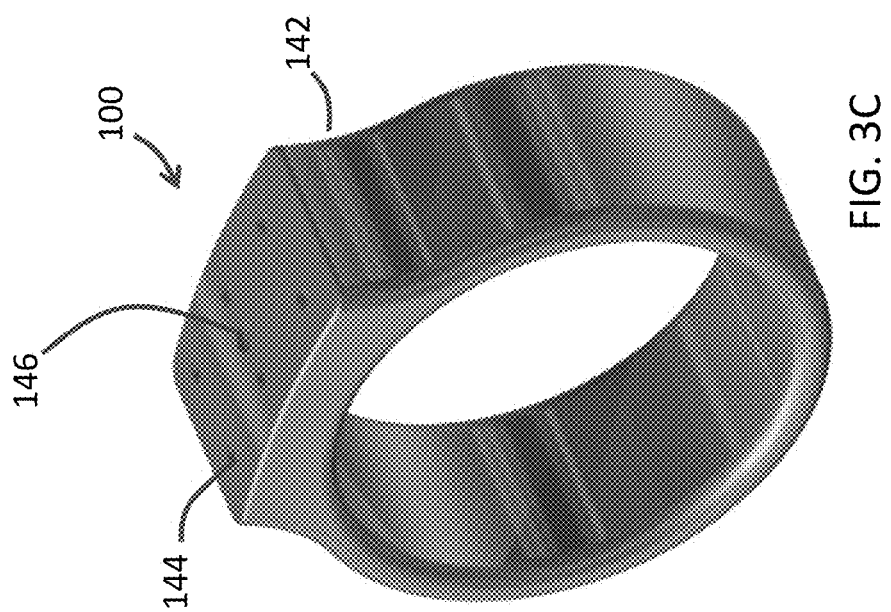

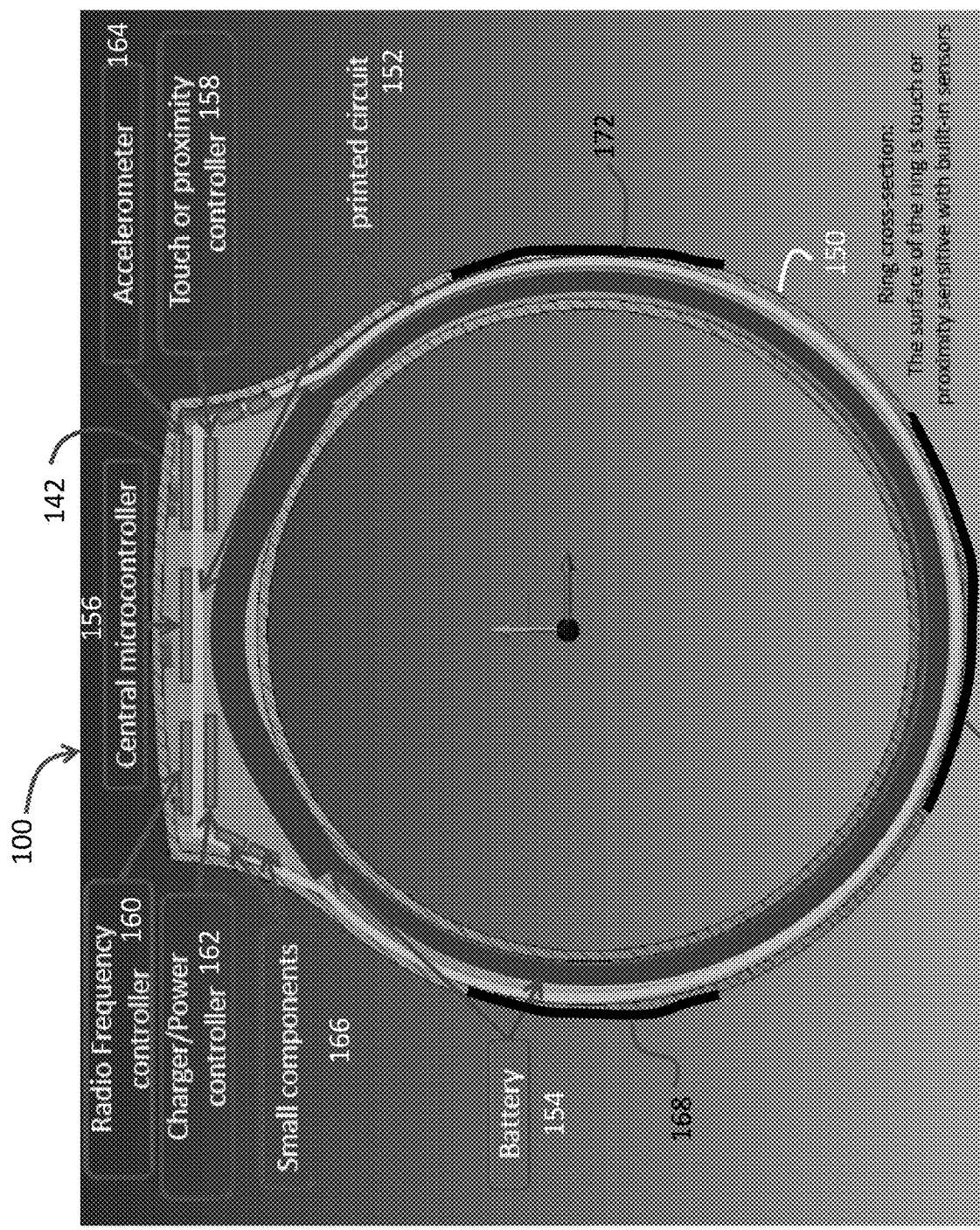

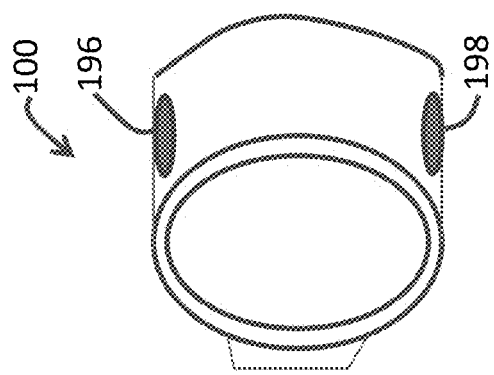
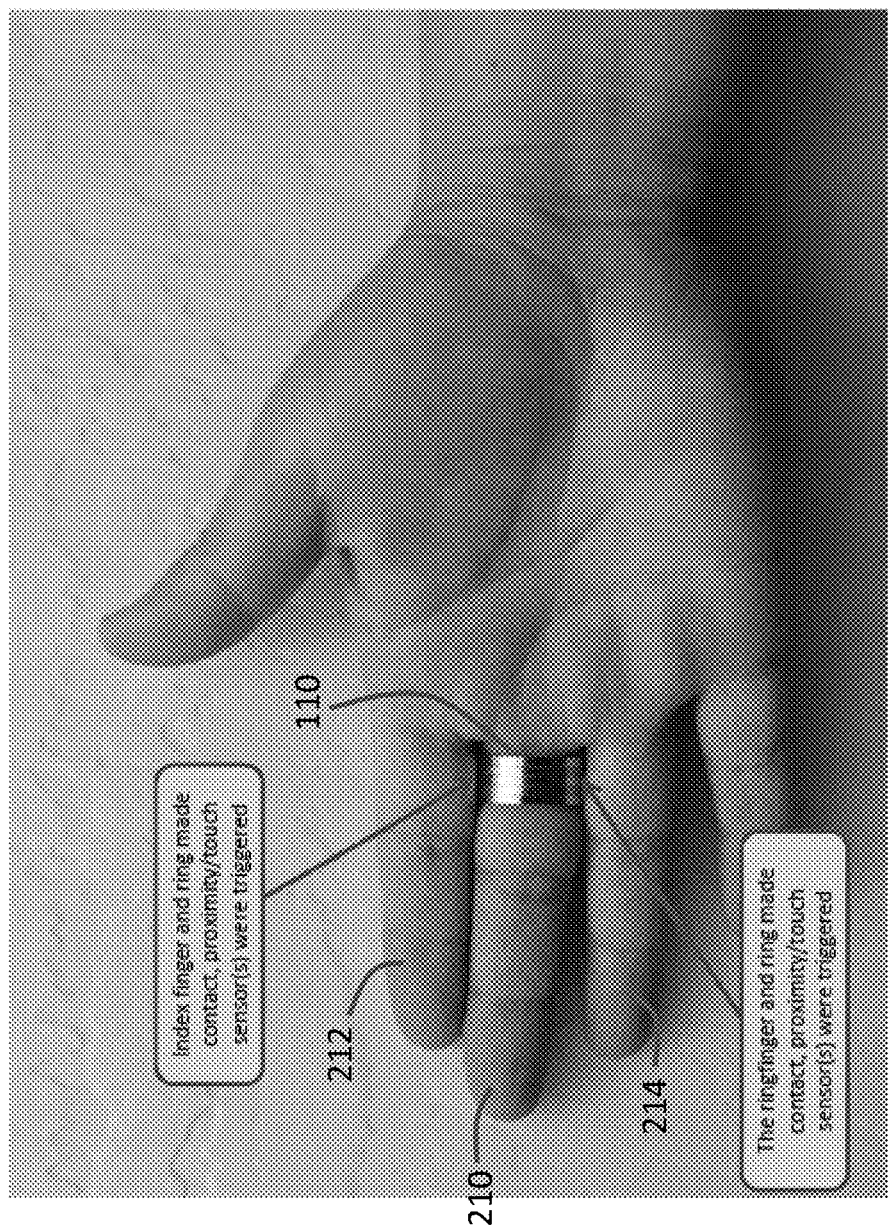
FIG. 6B
FIG. 6A

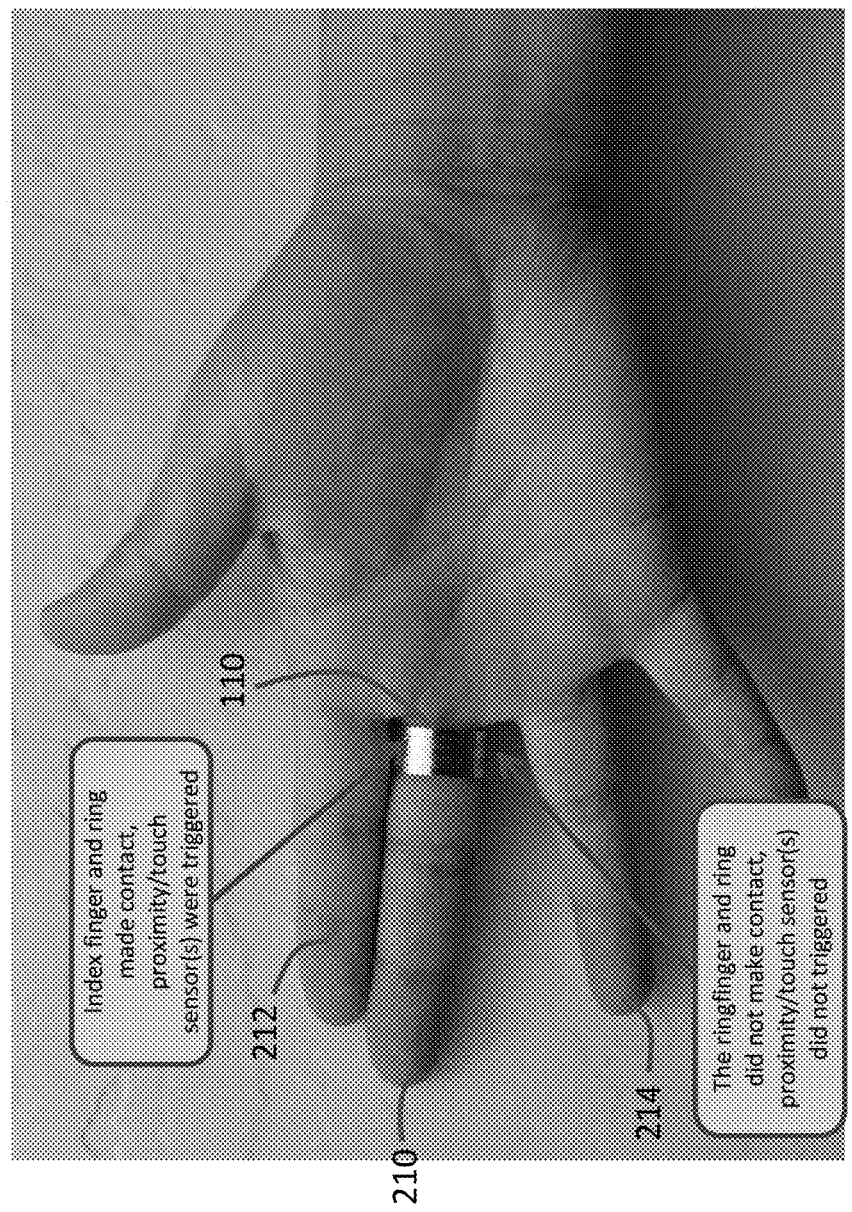
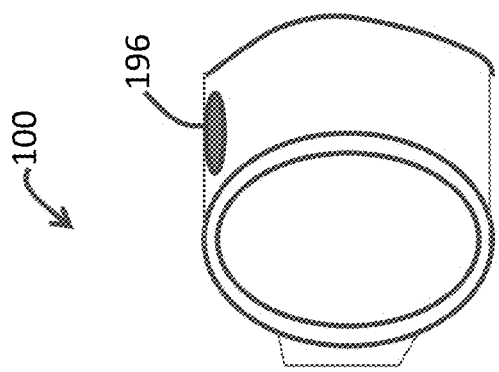
FIG. 7A
FIG. 7B

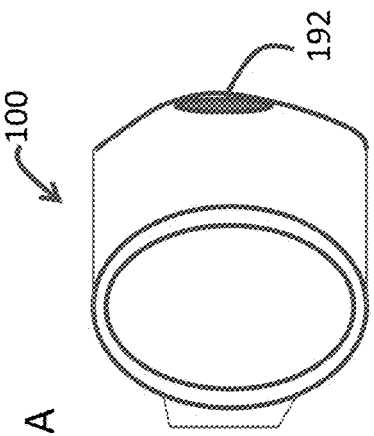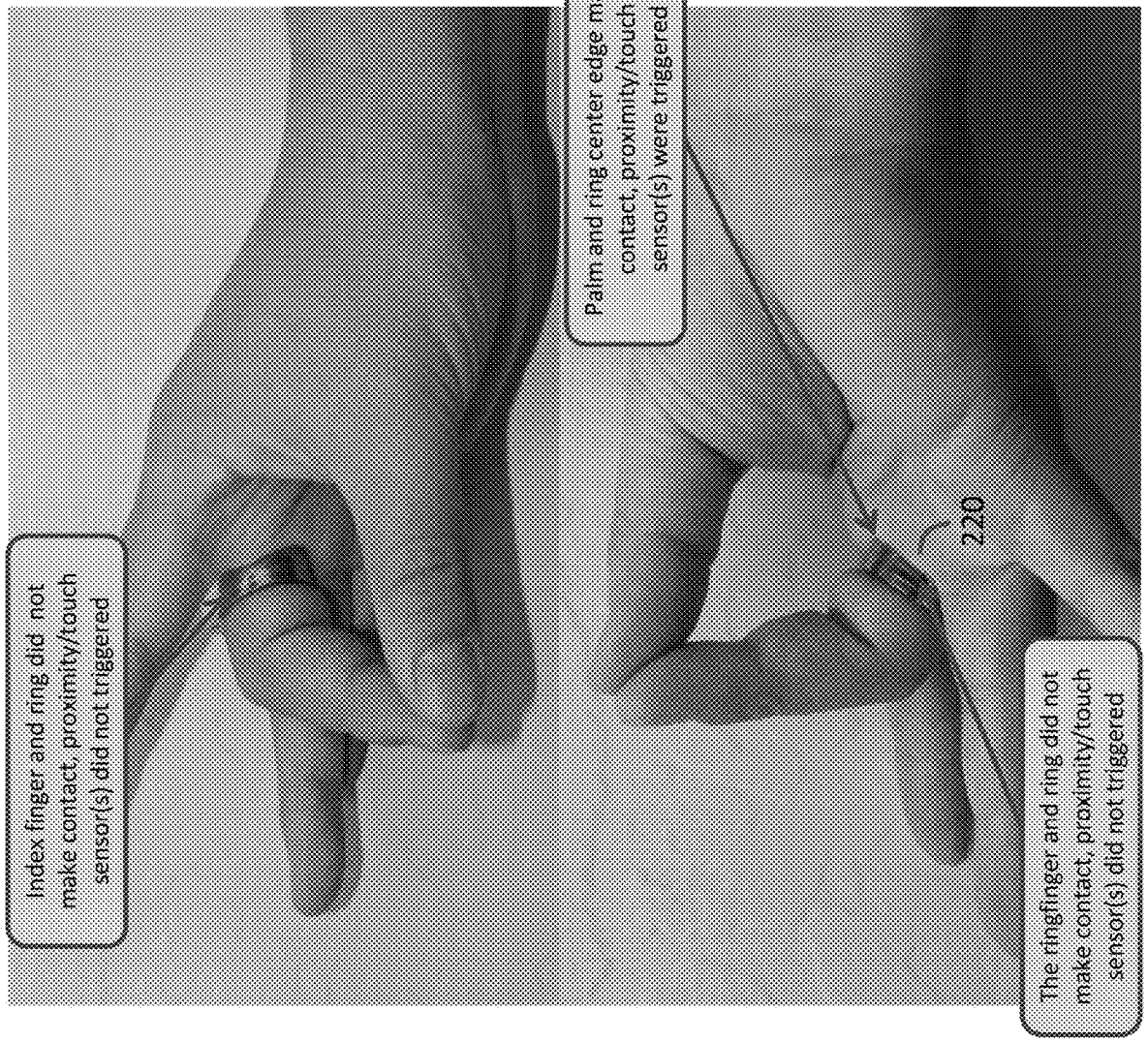
FIG. 11A  FIG. 11B  FIG. 11C

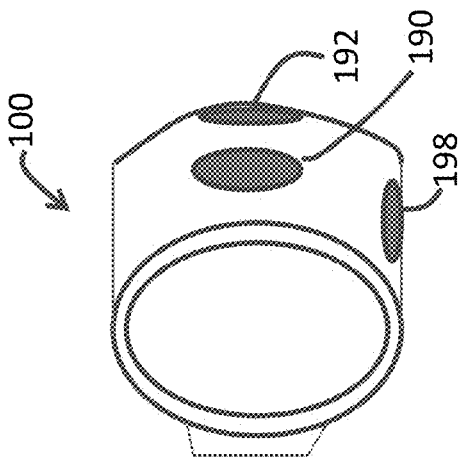
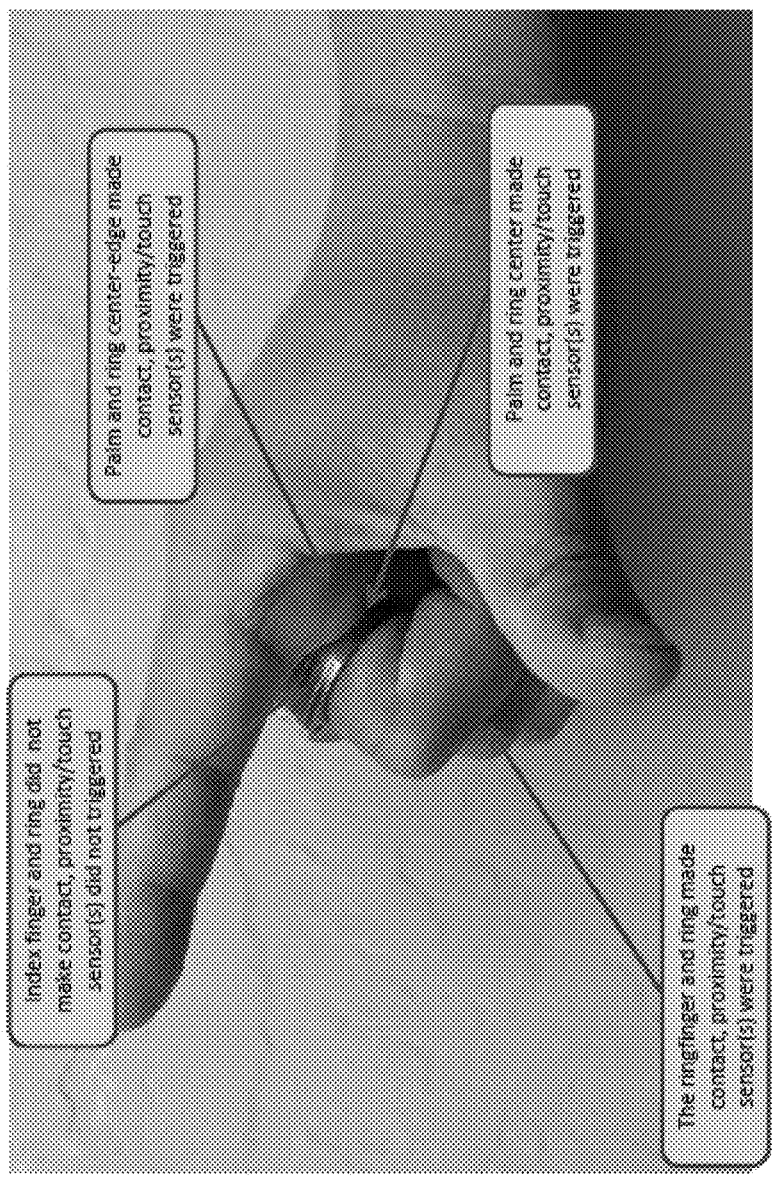
FIG. 14B
FIG. 14A

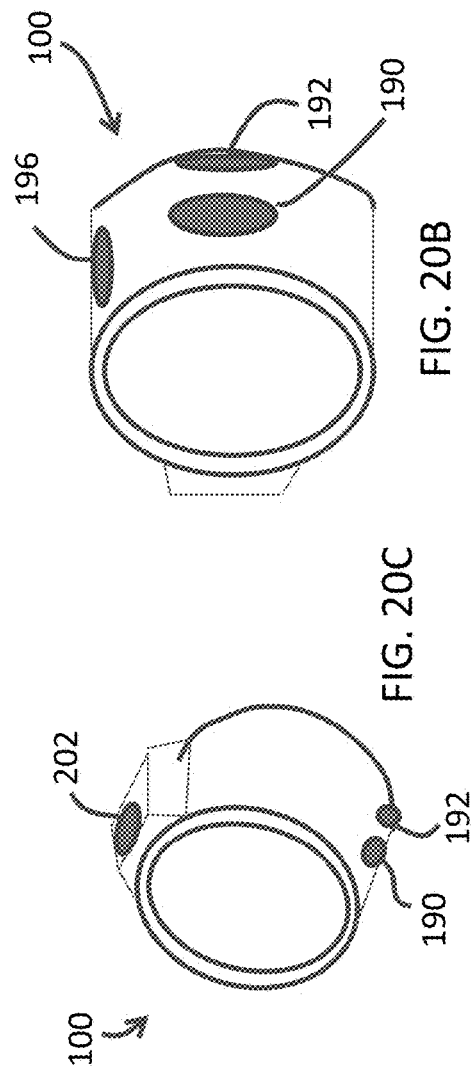
FIG. 20A
FIG. 20B
FIG. 20C

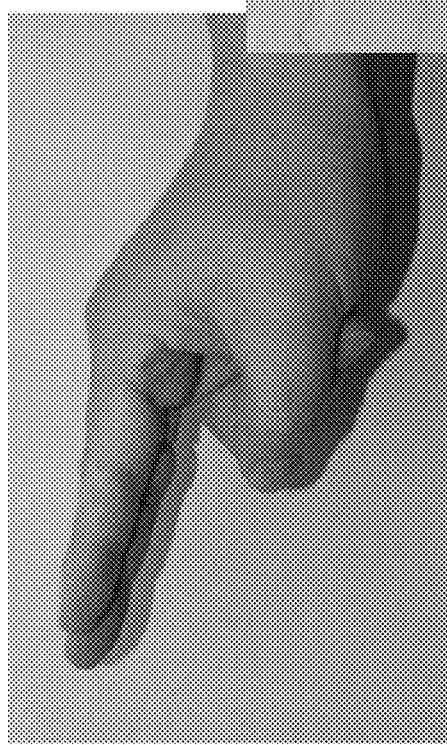
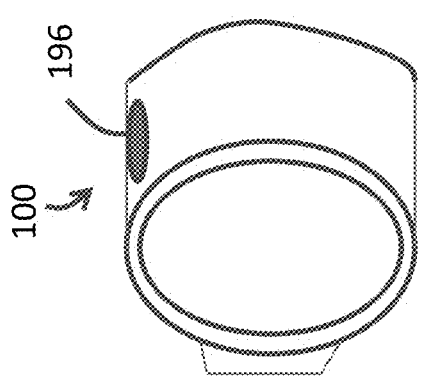
FIG. 25A
FIG. 25B
FIG. 25C

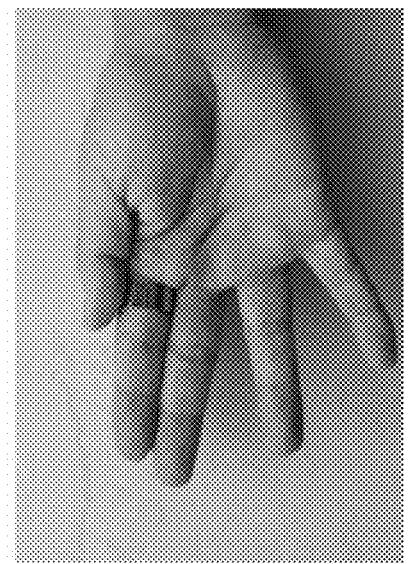
FIG. 28A
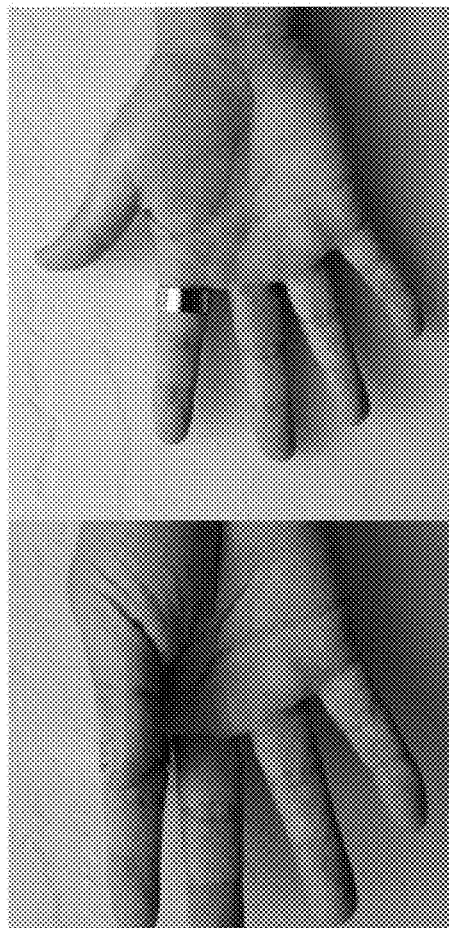
FIG. 28B
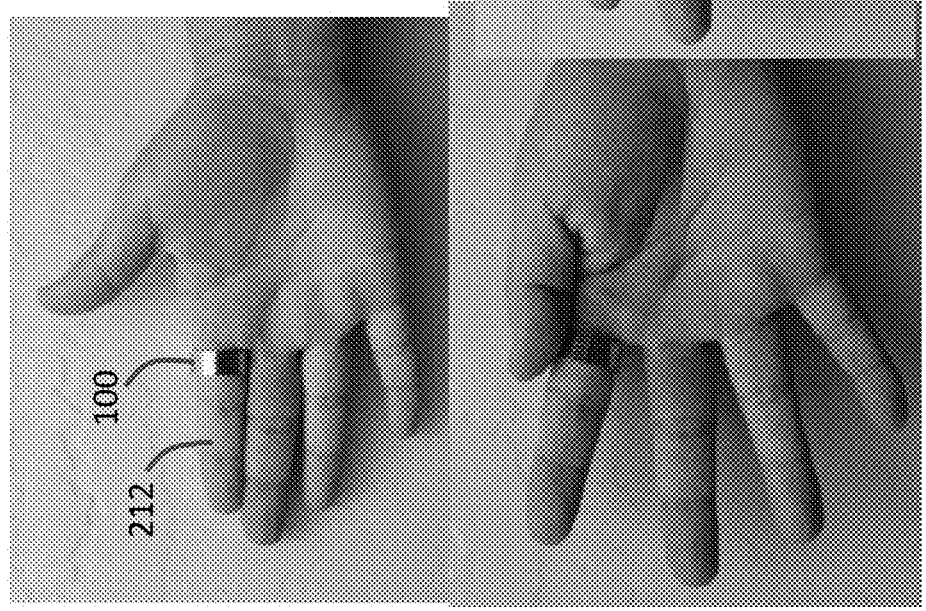
FIG. 28C
FIG. 28D
FIG. 28E

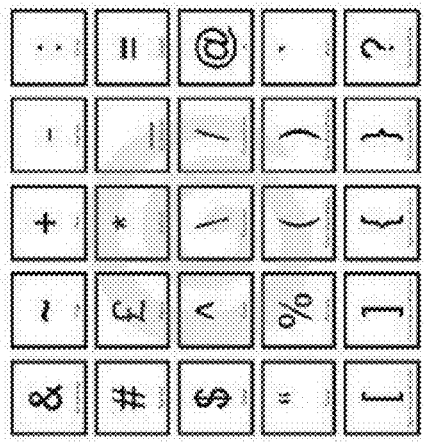
280
This gesture is associated with this keyboard layout (special characters, symbols)
282
FIG. 33

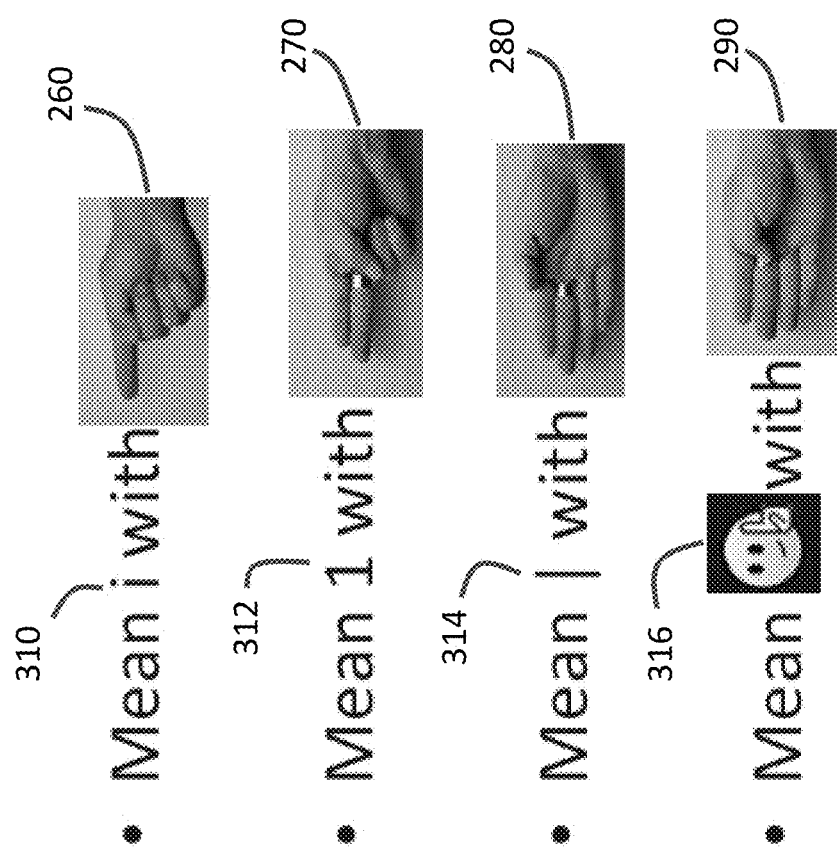

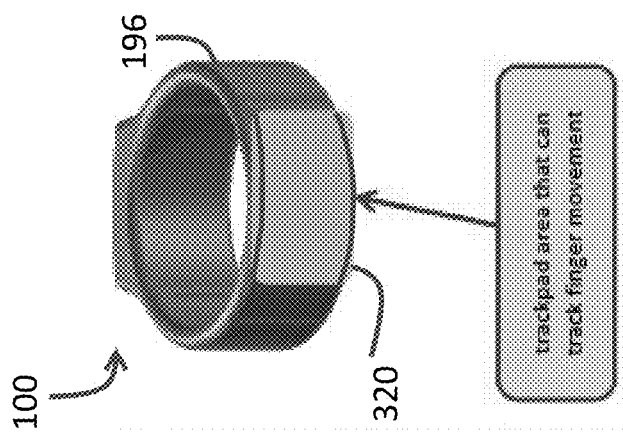
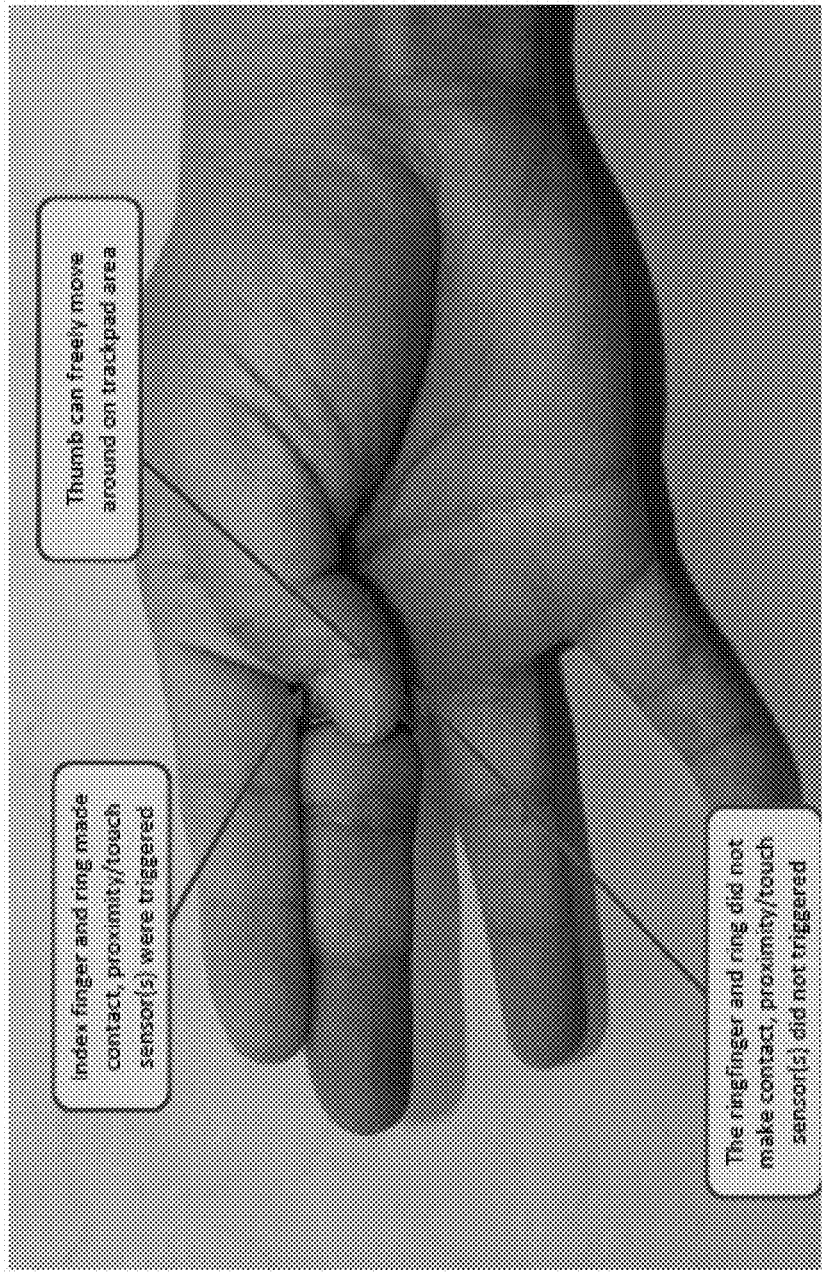
FIG. 38B
FIG. 38A

Zoom out  Zoom in

Move up  Move down

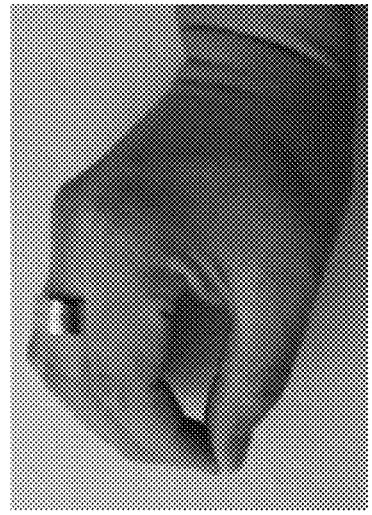
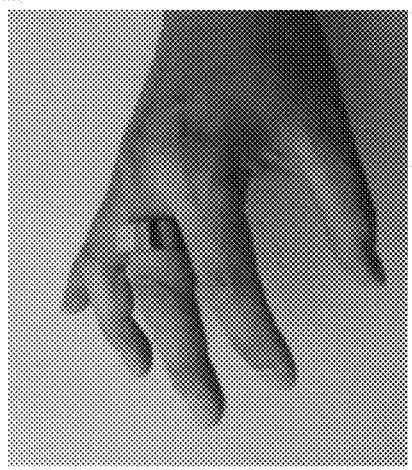
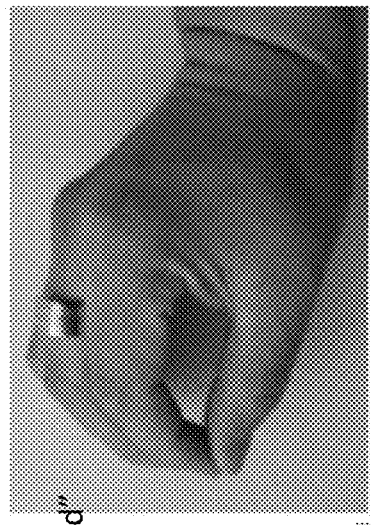
Document is "grabbed"
FIG. 45A

(4) Document is "grabbed"
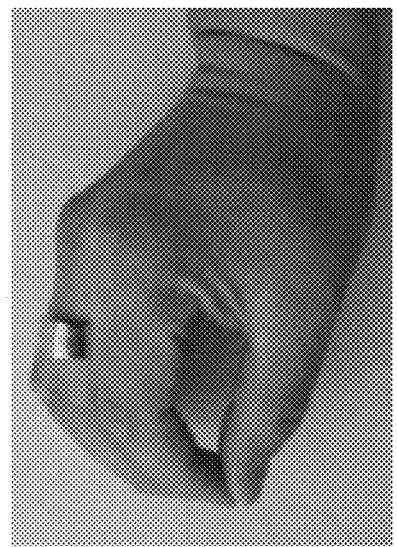
(5) Document is "released"
FIG. 45B

RING HUMAN-MACHINE INTERFACE

CROSS-REFERENCE TO RELATED APPLICATIONS

This application is a Divisional of and claims priority to U.S. application Ser. No. 14/274,602, filed on May 9, 2014, which claims priority to U.S. provisional patent application 61/932,801, filed on Jan. 29, 2014, titled "A wearable ring with built-in touch and/or proximity sensor for hand gesture detection," the contents of which are herein incorporated by reference in their entirety.

TECHNICAL FIELD

This disclosure relates to a ring human-machine interface.

BACKGROUND

Human-machine interfaces enable people to control and interact with machines. For example, keyboards, mice, and touchpads allow users to interact with computers. Game controllers allow users to interact with game consoles. Television remote controls allow users to control televisions from a distance. Voice recognition technology allows users to control machines through voice commands. Some game consoles have cameras that capture images of the users' body movements to enable the game consoles to determine the users' gestures, and may illuminate the users with infrared pointers to improve the accuracy of determining the gestures. Some game controllers have accelerometers to determine users' hand movements. Some devices also have electromyography sensors to measure the electricity activities of users' muscles to determine hand or finger gestures.

SUMMARY

In general, in one aspect, a method of using a ring to identify a gesture is provided. The method includes wearing a ring on a first finger, in which the ring has a first contact region facing a second finger adjacent to the first finger, and a second contact region facing a third finger adjacent to the first finger. The first contact region is configured to detect a touch or proximity input from the second finger, and the second contact region is configured to detect a touch or proximity input from the third finger. Each of the first and second contact regions has one or more touch or proximity sensors. The method includes moving the first, second, and third fingers relative to each other. The method includes detecting a touch or proximity input at the first contact region but not at the second contact region in response to a first finger and hand gesture; detecting a touch or proximity input at the second contact region but not at the first contact region in response to a second finger and hand gesture; and detecting touch or proximity inputs at both the first and second contact regions in response to a third finger and hand gesture.

In general, in another aspect, a method of using a ring to identify a gesture is provided. The method includes wearing a ring on a finger, in which the ring has a first contact region at an edge of the ring to detect a touch or proximity input from a portion of the palm, the contact region having one or more touch or proximity sensors. The method includes moving the finger relative to the palm; detecting a touch or proximity input at the contact region in response to a first finger and hand gesture; and detecting no touch or proximity input at the contact region in response to a second finger and hand gesture.

In general, in another aspect, a method of using a ring to identify a gesture is provided. The method includes wearing a ring on a finger, in which the ring has at least a first contact region and a second contact region, each contact region having one or more touch or proximity sensors. The method includes detecting one or more touch or proximity inputs at one or more of the first and second contact regions in response to a finger and hand gesture.

In general, in another aspect, a method of using a ring to identify a gesture is provided. The method includes identifying a finger and hand gesture based on touch or proximity inputs detected by two or more touch or proximity sensors on a ring worn on a first finger; detecting finger and/or hand movements; selecting one among several devices based on the finger and hand gesture; and controlling the selected device based on the finger and/or hand movements.

In general, in another aspect, an apparatus for human-machine interface is provided. The apparatus includes a ring that has two or more touch and/or proximity sensors, each touch and/or proximity sensor configured to detect touch and/or proximity inputs. The ring has a data processor to process sensed data from the touch and/or proximity sensors; and a communication unit to wirelessly transmit information about the sensed data or information derived from the sensed data to a receiver.

In general, in another aspect, an apparatus for human-machine interface is provided. The apparatus includes a ring that has two or more contact regions, each contact region includes one or more touch and/or proximity sensors configured to detect touch and/or proximity inputs; a data processor to process sensed data from the contact regions; and a communication unit to wirelessly transmit information about the sensed data or information derived from the sensed data to a receiver.

In general, in another aspect, a system for human-machine interface is provided. The system includes a ring that has two or more touch and/or proximity sensors, each sensor to detect touch and/or proximity inputs; and a communication unit to wirelessly transmit signals representing the outputs from the sensors or data derived from the outputs from the sensors. The system includes a controller to receive the signals from the ring and identify a finger gesture based on the received signals.

In general, in another aspect, an apparatus for human-machine interface is provided. The apparatus includes a controller to receive signals from a ring and identify a finger gesture based on the received signals. The controller has a storage storing information about a mapping between finger gestures and devices, in which different finger gestures are associated with different devices. The controller is configured to generate control signals for controlling a device associated with the hand gesture identified based on the received signals.

In general, in another aspect, an apparatus for human-machine interface is provided. The apparatus includes a controller to receive signals from a ring, the signals indicating a touch or proximity input or a combination of touch and/or proximity inputs detected by sensors on the ring; and a table having information about a mapping between a touch or proximity input or a combination of touch and/or proximity inputs and sets of keys, in which different hand gestures are associated with different sets of keys.

Other aspects include other combinations of the features recited above and other features, expressed as methods, apparatus, systems, program products, and in other ways.

Advantages of the aspects and implementations may include one or more of the following. The ring can be used to detect finger gestures so that the user can interact with electronic devices using intuitive and simple hand and finger gestures. By using different finger gestures, the same overall hand movement can be used to generate different commands, such as draw different characters or control different devices. The ring is small and light weight, so the user can carry the ring effortlessly and use it all day wherever the user goes. By using the ring, the user can control electronic devices without the need to hold or grab a controller. Because users are intimately familiar with their own hands and fingers, they can move their hands and fingers in various movements and gestures without looking and the hands and fingers. Such hand and fingers gestures are useful for, e.g., virtual reality or augmented reality applications in which the users need to issue commands to interact with the virtual or augmented reality environments while not being able to see their hands and fingers clearly. Hand and finger gestures are useful for interfacing with wearable head-mounted display to allow the users to focus on viewing the ambient environment and the contents of the displays without the need to look at which keys or buttons the fingers are pressing. Using the ring, commands can be generated discretely by subtle movements of the hands and fingers.

The details of one or more implementations of the ring interface are set forth in the accompanying drawings and the description below. Other features, aspects, and advantages will become apparent from the description, the drawings, and the claims.

DESCRIPTION OF DRAWINGS

FIGS. 2A to 4 show diagrams of an exemplary ring having sensors and controllers.

FIGS. 6A to 26D show photographs of exemplary finger and hand gestures and diagrams of the contact regions of the ring that are triggered.

FIGS. 27A to 30C show photographs of exemplary finger and hand gestures with the ring worn on various fingers.

FIGS. 31 to 34 show photographs of exemplary finger and hand gestures for selecting sets of keys and diagrams for the corresponding keys.

FIGS. 35 to 36 show photographs of examples of different gestures associated with different keys.

FIGS. 37A to 41B show examples of gestures that use a trackpad region on a ring.

FIG. 44A to 45B are photographs of exemplary finger and hand gestures.

Like reference symbols in the various drawings indicate like elements.

DETAILED DESCRIPTION

Figure 1:
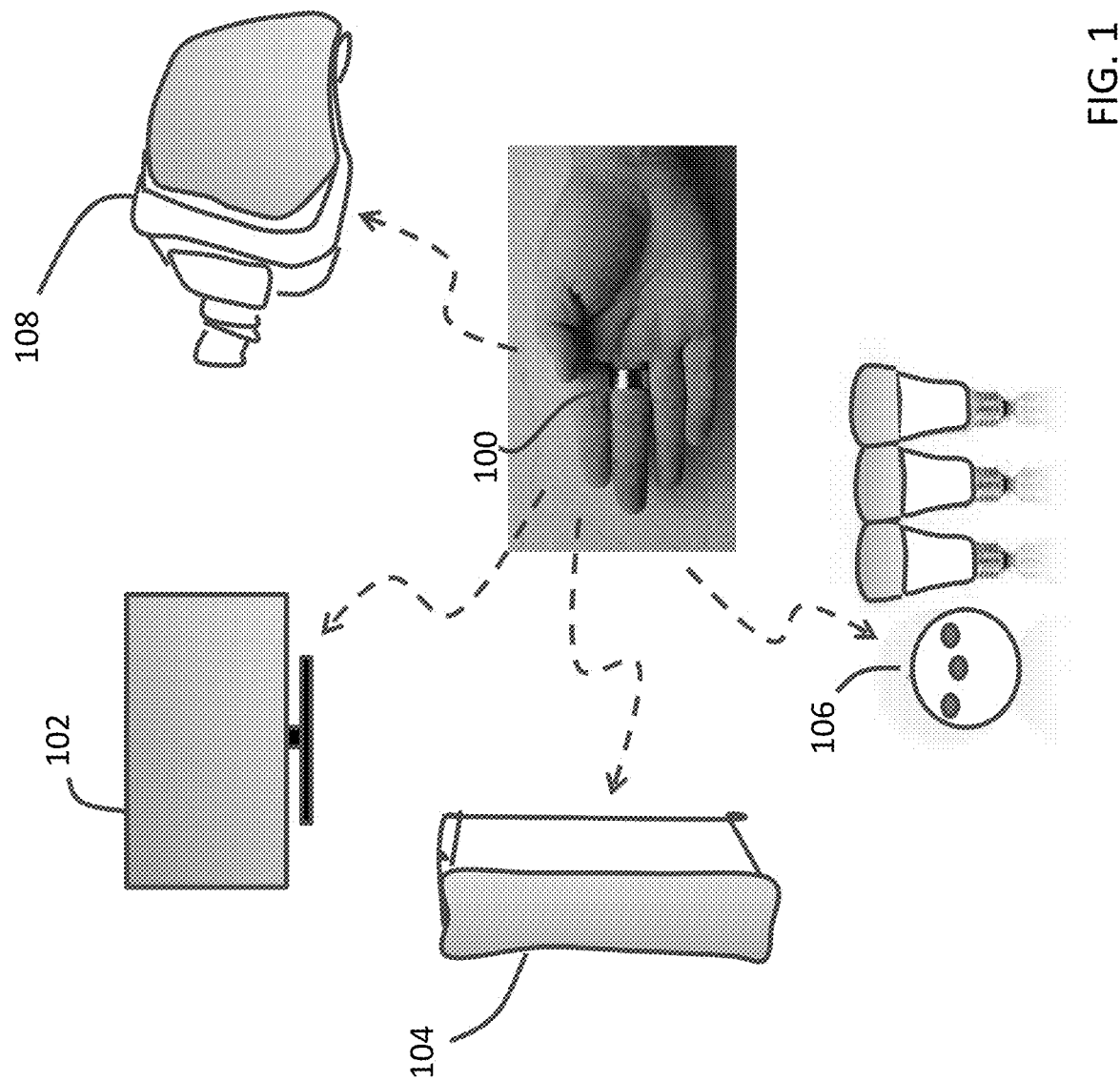
FIG. 1 shows a diagram of an environment for using an exemplary ring to interact with electronic devices.

This disclosure provides a description of a novel ring control device that functions as a human-machine interface. Referring to FIG. 1, in some implementations, a user wears a ring 100 that has built-in motion and touch or proximity sensors to detect both finger and hand gesture commands by sensing the relative locations of the fingers, the fingers' movements, and the hand movements. This disclosure provides a simple, natural, and flexible way to detect the finger and hand gestures that can represent a variety of useful commands. For example, the ring 100 can be used to provide commands to or interact with various devices, including a television 102, a game console 104, a light controller 106, and many other devices that have built-in data processors and/or microcontrollers (e.g., thermostats, TV set top boxes, audio equipment, video equipment, musical instruments, smart phones, desktop computers, laptop computers, tablet computers, or projectors). The ring 100 can be used to provide commands to a controller 108 of a wearable head-mounted display, which can be a virtual reality device or augmented reality device (e.g., eyeglasses, goggles, or helmets that have built-in displays and data processors and/or microcontrollers). The ring 100 can also be used to assist in machine recognition of sign languages. More than one ring can be worn on the user's fingers, either on one hand or both hands, for detecting both finger and hand gestures and movements. The ring 100 provides a portable, simple, and natural human-machine interface that has many applications.

Figure 2B:
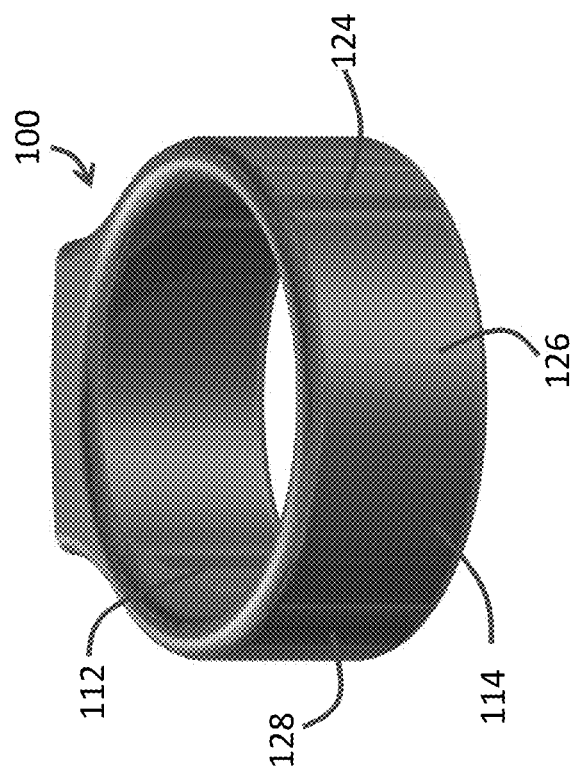
Figure 2A:
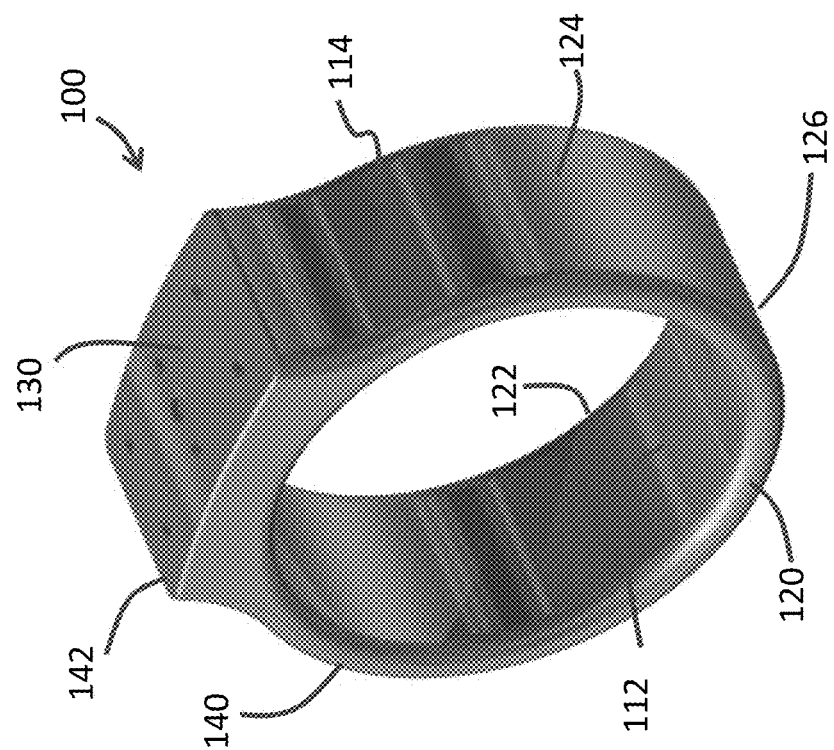

Referring to FIGS. 2A to 2C, in some implementations, the ring 100 has ring-shaped body 140 that defines an opening to allow the ring 100 to fit over a user's finger. The ring 100 has a ring head 142 that accommodates electronic components. The ring 100 has an inner ring surface 112 and an outer ring surface 114. The inner ring surface 112 can be made of a material that is comfortable to the finger, such as metal or plastic. The entire outer ring surface 114 or portions of the outer ring surface 114 are touch and/or proximity sensitive and can receive touch and/or proximity inputs from the user. The touch/proximity sensitive surface can be implemented by one or more touch/proximity sensors. In the example shown in FIG. 2C, two touch/proximity sensors 116 and 118 are used. The touch/proximity sensor 116 wraps around a lower portion of the outer ring surface 114, as well as edges 120, 122 of the ring 100. The touch/proximity sensor 118 covers the outer surface of the ring head. Each of the sensors 116 and 118 has several sensing points, and each sensing point can individually detect a touch or proximity input. For example, the sensing points can be arranged in an array having a resolution of, e.g., 10 to 100 sensing points per inch. A high density of sensing points allows the ring 100 to be sensitive to small movements or light touch inputs from the fingers.

The term "touch/proximity sensor" refers generally to a sensor that is sensitive to touch input, proximity input, or both. The term "touch/proximity sensitive surface" refers generally to a surface that is sensitive to touch input, proximity input, or both. The term "touch/proximity input" refers generally to either a touch input or a proximity input. The touch/proximity sensitive surface 114 can be implemented using various technologies, such as capacitive touch and proximity sensors, inductive proximity sensors, or resistive touch sensors, for enabling detection of object presence, object distance, object orientation, and/or object contact. A resistive touch sensor requires a physical touch to generate a signal, whereas a proximity sensor, such as a capacitive proximity sensor or inductive proximity sensor, does not need a physical touch to generate a signal. The distance of between the ring and its surrounding objects can be calculated based on changes in capacitance or inductance.

In some implementations, the touch/proximity sensitive surface 114 has many sensor points so that it is possible to determine which portions of the ring surface is being touched or in proximity to another finger or palm. The touch/proximity sensitive surface 114 can function as a small trackpad that tracks a movement of a finger across the surface. The touch/proximity sensitive surface 114 can also be divided into regions such that touch/proximity inputs to different regions or different combinations of regions can represent different commands.

For example, the touch/proximity sensitive surface 114 can be divided into a first section 124, a second section 126, a third section 128, and a top section 130 that detect touch or proximity inputs from fingers or hand palm at different regions on the ring surface 114. The touch or proximity sensitive surface 114 can also be divided into a larger or smaller number of sections to detect touch or proximity inputs at more or less regions on the ring surface.

Figure 3B:
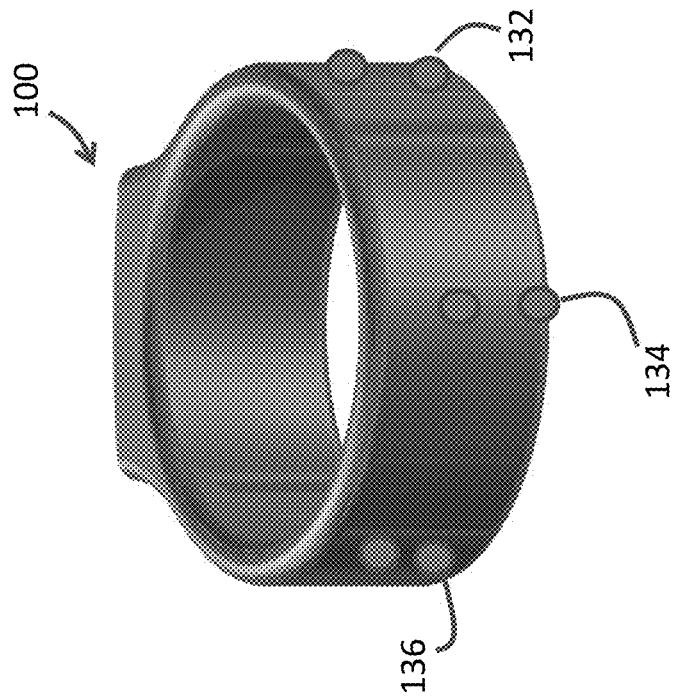
Figure 3A:
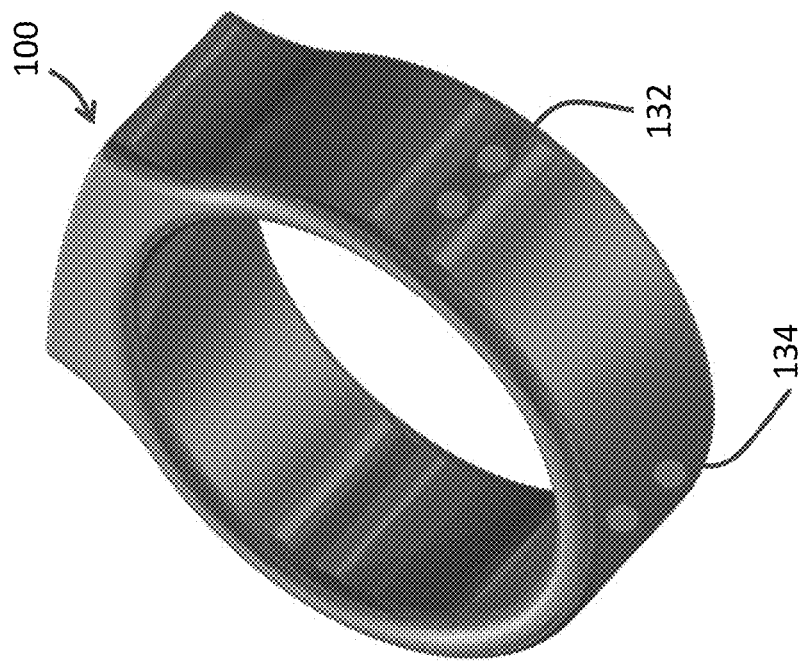

Referring to FIGS. 3A and 3B, in some implementations, the touch or proximity sensitive surface 114 of the ring 100 can be embedded with additional sensors 132, 134, 136, which can be point light proximity sensors (e.g., laser range sensors), infrared sensors, or ambient light sensors, that can detect object presence, object distance, and/or object touch. The laser range sensor, infrared proximity sensor, or ambient light proximity sensor does not need a physical touch to generate a signal. The distance of between the ring and its surrounding objectives can be calculated based on changes in the reflectance of infrared or ambient light, or based on time of flight, e.g., by emitting a light pulse, detecting a reflected pulse, and determining the amount of time between emitting the light pulse and detecting the reflected pulse.

Referring to FIG. 3C, the ring head 142 can be worn either facing an upward direction or a downward direction when the ring 100 is worn on a user's finger with the palm facing downwards. In the examples described in FIGS. 6A to 42, the ring head 142 faces the upward direction when the ring 100 is worn on the user's finger with the palm facing downwards. The ring head 142 can have embedded status indicators 144, which can be, e.g., small LED lights that provide status information. The status indicators may provide various types of information by showing various colors, blink at various rates, or blink at various duty cycles.

In some implementations, the ring head 142 can have one or more embedded microphones 146 to receive voice commands from the user.

Referring to FIG. 4, in some implementations, the ring 100 includes a generally ring-shaped housing 150 that encloses a printed circuit 152 and a battery 154. The ring 100 has a ring head 142 for accommodating various components. The printed circuit 152 can be a flexible printed circuit that bends according to the curvature of the ring 100. Various components can be mounted on the printed circuit 152, such as a central microcontroller 156, a touch or proximity controller 158, a radio frequency controller 160, a charger or power controller 162, one or more integrated accelerometers, gyrometers, magnetometers 164, and one or more other small components 166. Two or more of the above components can be integrated on a chip. The battery 154 can have a ring shape that generally conforms to the interior of the ring-shaped housing 150. Additional controller chips and memory chips can be placed in the interior of the ring-shaped housing 150.

The touch or proximity controller 158 receives signals from the touch or proximity sensors to detect touch or proximity inputs. The radio frequency controller 160 applies radio frequency modulation and transmits/receives radio frequency modulated signals. The central microcontroller 156 processes the input signals and generates output signals indicating what inputs have been detected, and the output signals are transmitted to an external controller through the radio frequency controller 160. For example, the radio frequency controller 160 may comply with Bluetooth protocol and send Bluetooth signals to the external controller. The external controller may be a controller of the device being controlled. For example, the radio frequency controller 160 may communicate with a controller of a television to enable the user to control the television. The central microcontroller 156 may receive firmware update through the radio frequency controller 160 and update the firmware of one or more components of the ring system.

Figure 5A:
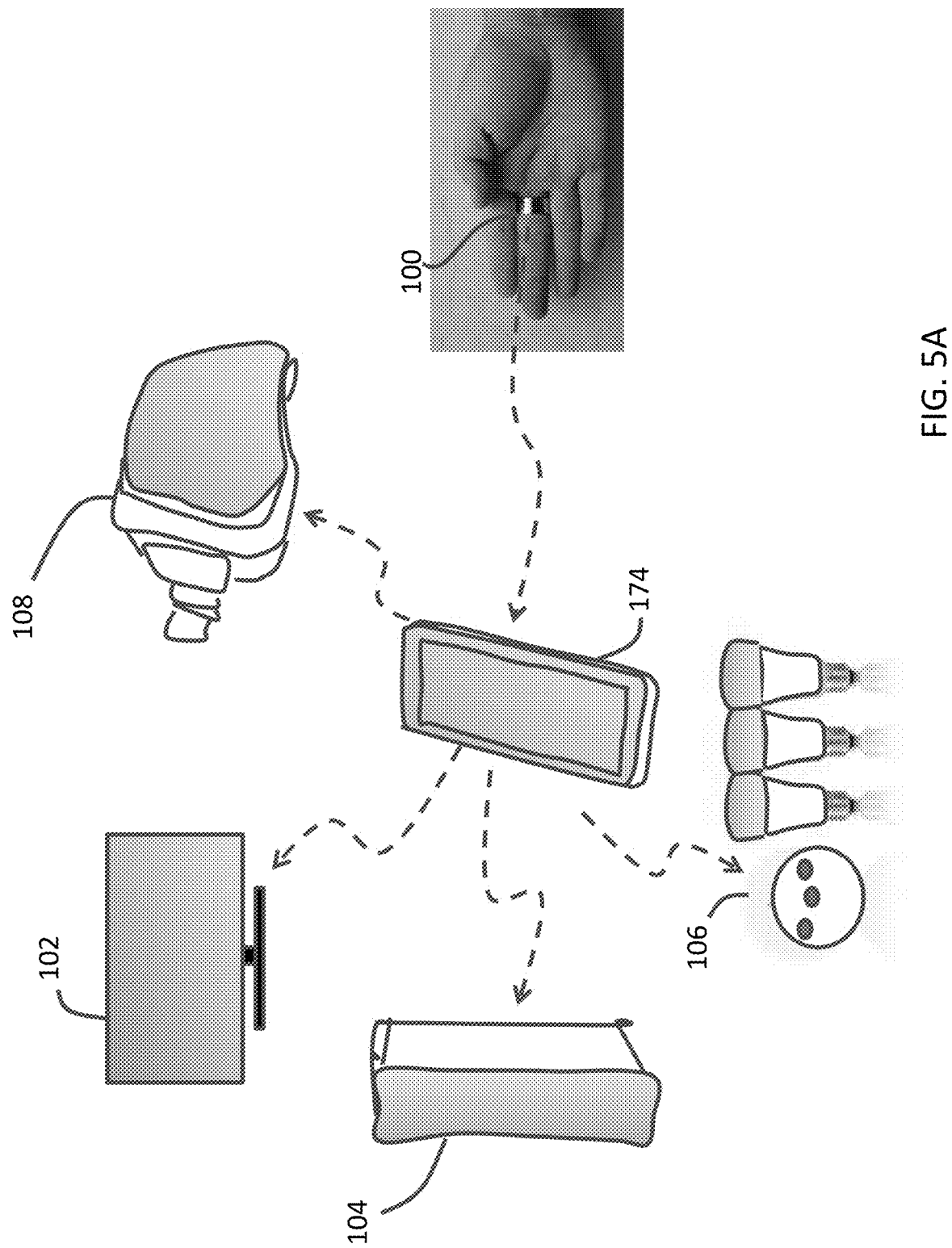
FIG. 5A shows a diagram of an environment for using an exemplary ring to interact with an external controller for interacting with electronic devices.

Referring to FIG. 5A, in some implementations, the external controller may be a portable device 174 of the user, such as a mobile phone, a tablet computer, or a laptop computer, which in turn communicates with the controller of the device to be controlled. For example, the ring 100 may send signals to a mobile phone, and the mobile phone may process the signals and send commands to a controller of a television to enable the user to control the television. For example, the ring 100 may send signals to a remote control of a television, and the remote control may transmit commands (e.g., using infrared or radio frequency signals) to the television.

Figure 5B:
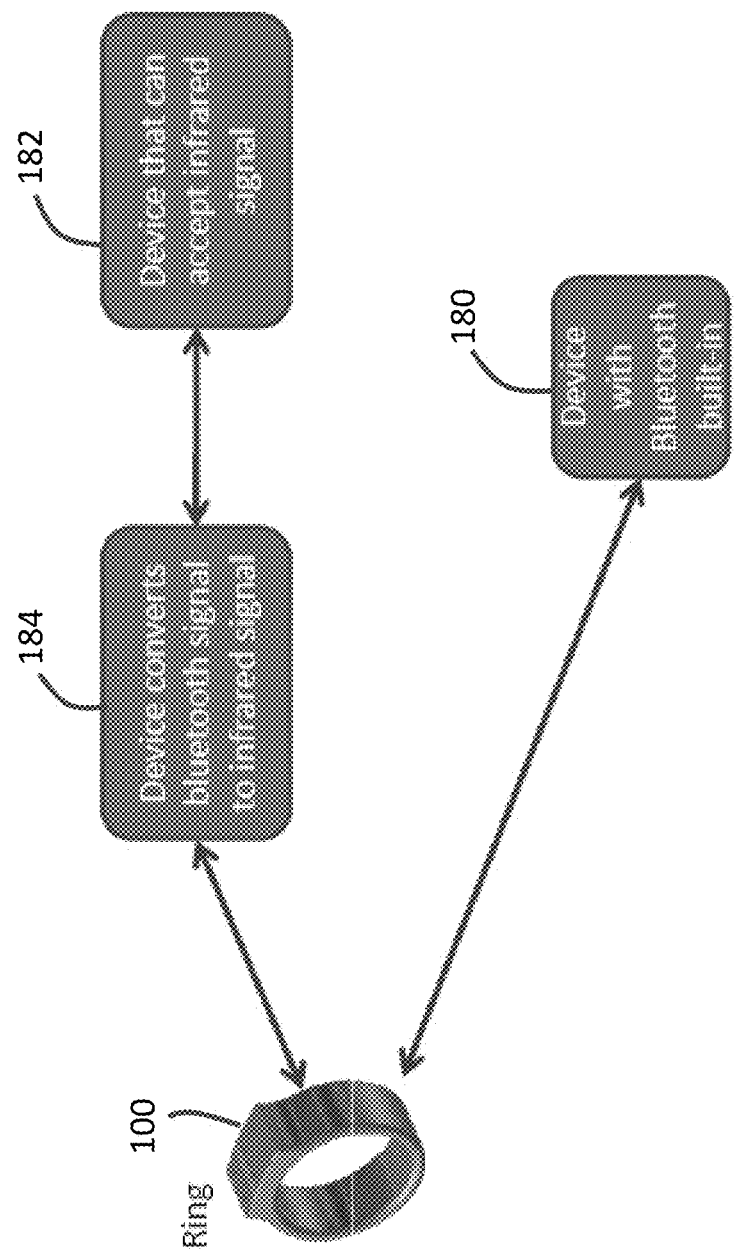
FIG. 5B shows a diagram of an exemplary ring interacting with electronic devices.

Referring to FIG. 5B, in some implementations, the ring 100 can communicate directly with devices 180 that accept Bluetooth signals (or other types of signals generated by the ring 100). For other devices that do not receive Bluetooth signals, a converter can be used to convert the Bluetooth signals to a format that can be accepted by the device. For example, in order for the ring 100 to communicate with devices 182 that accept infrared signals, a converter 184 can be used to convert the Bluetooth signals received from the ring 100 to infrared signals and transmit the infrared signals to the devices 182.

Referring back to FIG. 4, the charger or power controller 162 manages the charging of the battery 154 and performs power management to prolong battery life. The ring 100 can be placed on a charger (not shown in the figure) to charge the battery 154. The central microcontroller 156 manages the operations of the touch or proximity controller 158, the radio frequency controller 160, and the charger or power controller 162. For example, the microcontroller 156 can be an ARM-based microcontroller or x86 based microcontroller.

A feature of the ring 100 is that it has touch or proximity sensors to detect touch or proximity inputs at various portions of the ring surface. FIG. 2C shows an example that uses two touch/proximity sensors 116 and 118 that function as trackpads. FIG. 4 shows portions of the sensor 116, including sensor portions 168, 170, and 180. The sensor portions 168 and 172 are useful to detect touch or proximity inputs from fingers that are adjacent to the finger on which the ring 100 is worn. For example, if the ring 100 is worn on the right middle finger with the middle finger pointing into the figure and the palm facing down, the sensor portion 168 can detect inputs from the index finger, the sensor portion 172 can detect touch or proximity inputs from the ring finger, and the sensor portion 170 can detect touch or proximity inputs from the thumb. Note that the ring 100 when properly sized can also be worn on the thumb, the index finger, the ring finger, or the little finger.

Figure 5C:
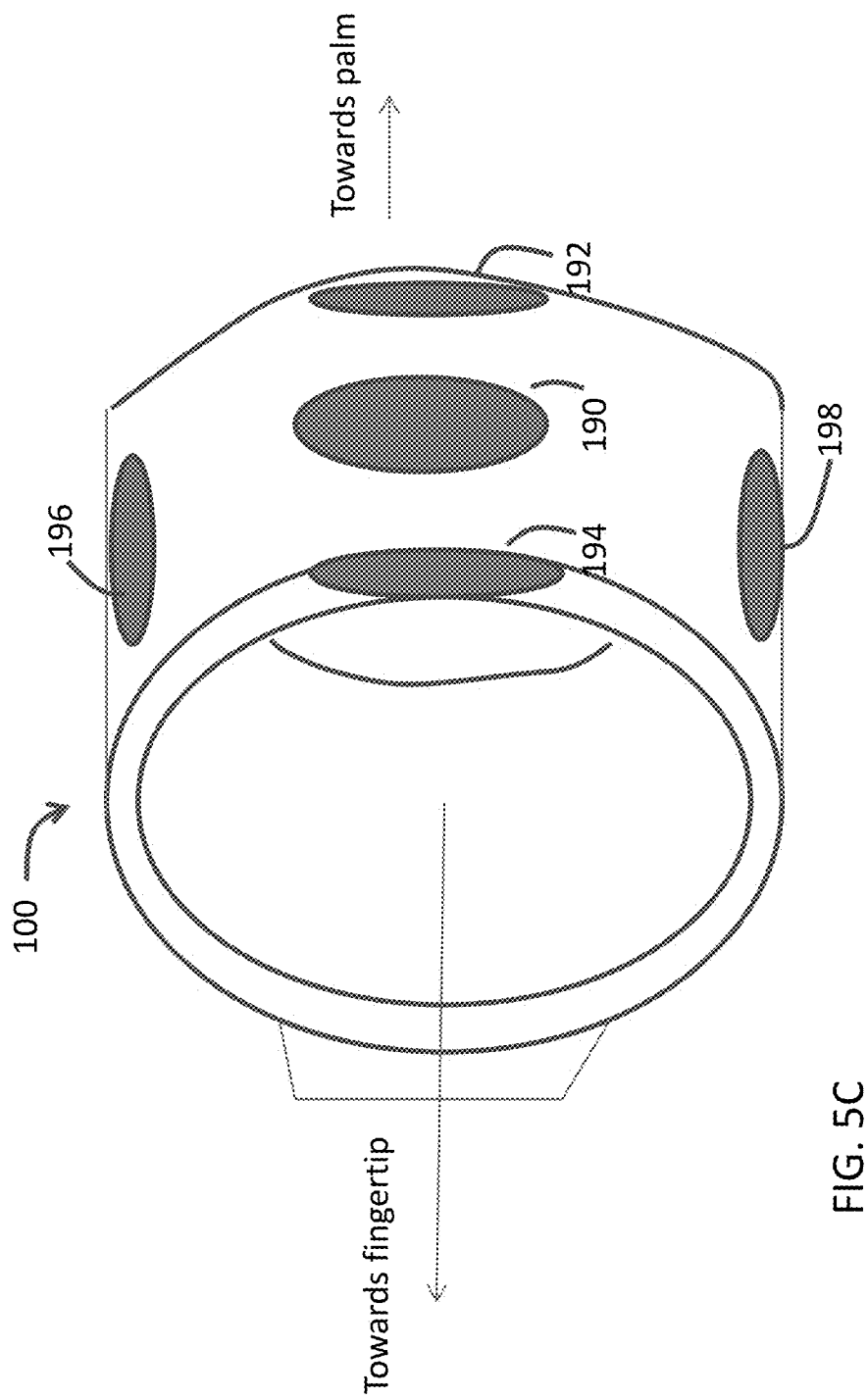
FIGS. 5C and 5D show diagrams of an exemplary ring having contact regions.

The touch/proximity sensitive surface 114 of the ring 100 can detect touch or proximity inputs at different locations along a width of the ring 100, i.e., along the edges 120, 122 of the ring 100. Referring to FIG. 5C, the touch/proximity sensor 116 may be sensitive to touch or proximity inputs at a central region 190 along the width of the ring 100, a first edge 192 of the ring 100 closer to the palm, and a second edge 194 of the ring 100 closer to the tip of the finger. In FIG. 5C, the ring 100 is shown in an orientation in which the palm is to the right of the ring and the fingertip is to the left of the ring. The touch/proximity sensor 116 may be sensitive to touch or proximity inputs at regions 196 and 198 that can detect touch/proximity inputs from adjacent fingers. For example, if the ring 100 is worn on the middle finger, the region 196 can detect touch/proximity inputs from the index finger, and the region 198 can detect touch/proximity inputs from the ring finger.

The regions 190, 192, 194, 196, and 198 can have different distance thresholds for proximity inputs. For example, the range of distances between the index and middle fingers, and between middle and ring ringers, is relatively small, so the distance threshold for regions 196 and 198 is set such that the finger has to touch or be very close to the region 196 or 198 in order to trigger the touch/proximity sensor. The range of distances between a portion of the palm and the region 192 is also small, so the distance threshold for region 192 is set such that the portion of the palm has to touch or be very close to the region 192 in order to trigger the touch/proximity sensor. The region 190 detects inputs from the thumb, and the range of distances between the region 190 and the thumb is relatively large, so the distance threshold for region 190 is set such that the thumb can trigger the touch/proximity sensor at a slightly larger distance compared to the distance needed to trigger the touch/proximity sensors at regions 192, 196, 198.

Figure 5D:
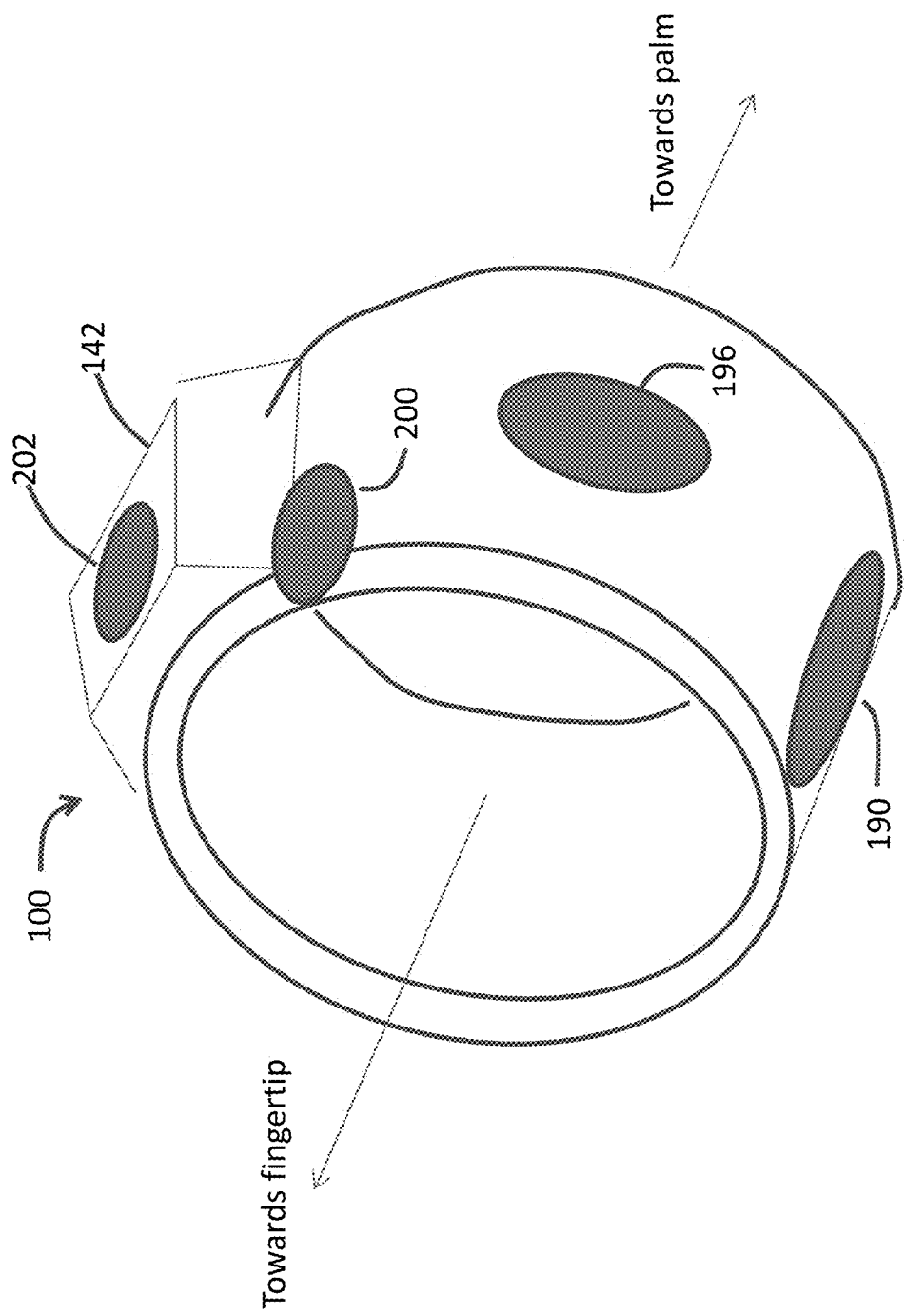

Referring to FIG. 5D, the touch/proximity sensor 116 can detect touch or proximity inputs at a region 200 at the edge 120 of the ring 100 closer to the fingertip and closer to the ring head 142. The region 200 is useful in detecting, e.g., a finger gesture in which the index finger crosses over the middle finger so that the index finger triggers both regions 196 and 200. Here, "triggering a region" means triggering the touch/proximity sensors at the region. The touch/proximity sensor 118 has a region 202 that is sensitive to touch or proximity inputs on the ring head 142.

The following describes several examples of using the ring 100 to detect finger and hand gestures. The user can provide various finger gestures by, e.g., spreading apart fingers, pressing the fingers against each other, curling in the fingers, tilting the fingers, crossing the fingers, or contacting the tips of the thumb and the other fingers. In the examples shown in FIGS. 6A to 26C, the user wears the ring on the middle finger of the right hand, and the entire outer ring surface is touch or proximity sensitive. For example, the outer ring surface can be implemented as a trackpad surface that supports multi-touch with multiple built-in capacitive sensors. The user can also wear the ring on other fingers, or on the left hand.

The ring 100 can be used in many fields, e.g., home automation, remote home appliance control, gaming, health, virtual reality, sign gesture, and human computer interaction. For example, the ring's accelerometer can serve as a pedometer to measure how many steps the user has been walking, how active the user's movements are, and how many calories the user has burned. The ring 100 can track the user's activities during night time to enable the user to keep track of sleeping patterns. The ring 100 can track the user's activities during working hours and provide useful reminders. For example, the ring 100 can track the typing movements of the fingers and remind the user to get up for some exercise when the user has been using the computer non-stop for a long period of time. These features can improve the user's awareness of the user's activities, sleep routine, and working pattern, and help the user reduce fatigue and ergonomic risks, and to develop healthier habits. The ring 100 is small and lightweight, and can be worn wherever the user goes.

Referring to FIGS. 6A and 6B, in some examples, the ring 100 can detect a finger and hand gesture in which the ring 100 is worn on the middle finger 210. The index finger 212 can touch the contact region 196 to trigger the touch/proximity sensors at the contact region 196. The ring finger 214 can touch the contact region 198 to trigger the touch/proximity sensors at the contact region 198. In the description below, triggering a contact region means that the touch or proximity sensors at the contact region is triggered by a touch or proximity input. By sensing touch inputs at the contact regions 196 and 198, the ring 100 can determine that the hand is in an open palm gesture with the index finger, middle finger, and ring finger contacting each other.

Referring to FIGS. 7A and 7B, the ring 100 can detect a finger and hand gesture in which the index finger 212 is pressed against the middle finger 210, and the middle and ring fingers are spread apart, such that the index finger 212 contacts the ring 100 at the contact region 196 but the ring finger 214 does not contact the ring 100. In this example, the touch or proximity sensors at the contact region 196 are triggered.

Figure 8B:
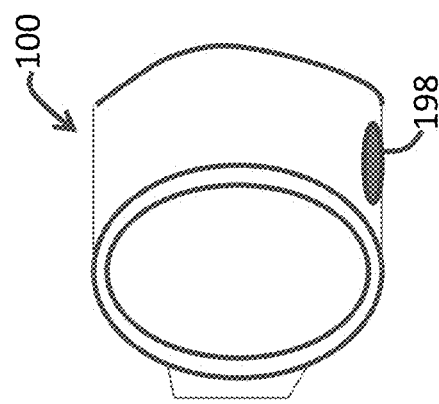
Figure 8A:
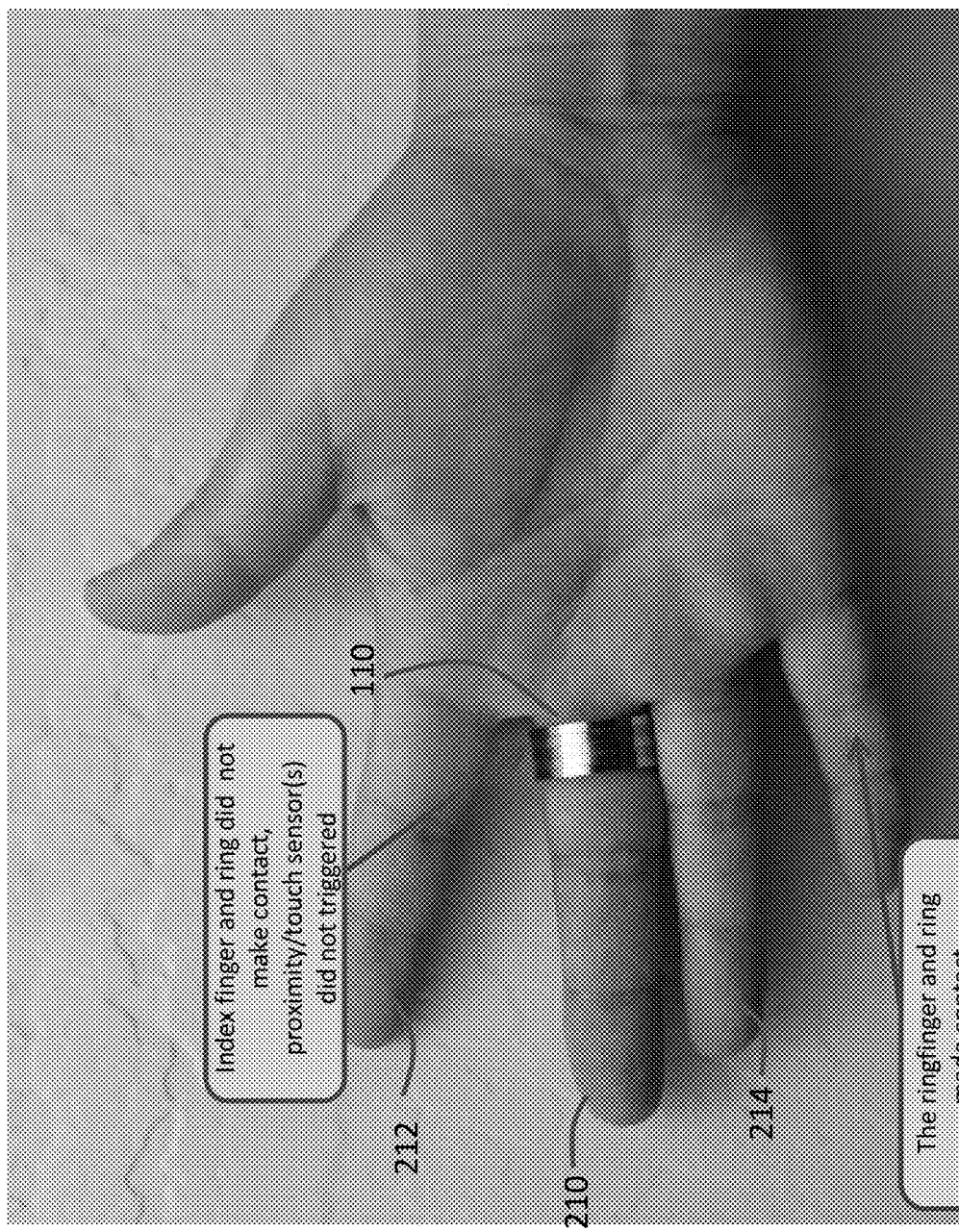

Referring to FIGS. 8A and 8B, the ring 100 can detect a finger and hand gesture in which the user spreads apart the middle and index fingers 210, 212, and the ring finger 214 is pressed against the middle finger 210, such that the ring finger 214 contacts the ring 100 at the contact region 198 but the index finger 212 does not contact the ring 100. In this example, the touch or proximity sensors at the contact region 198 are triggered.

Figure 9B:
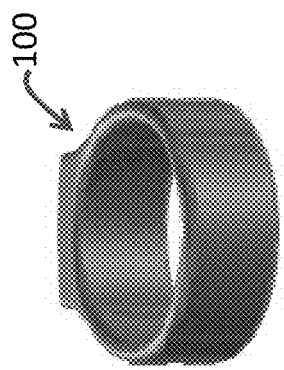
Figure 9A:
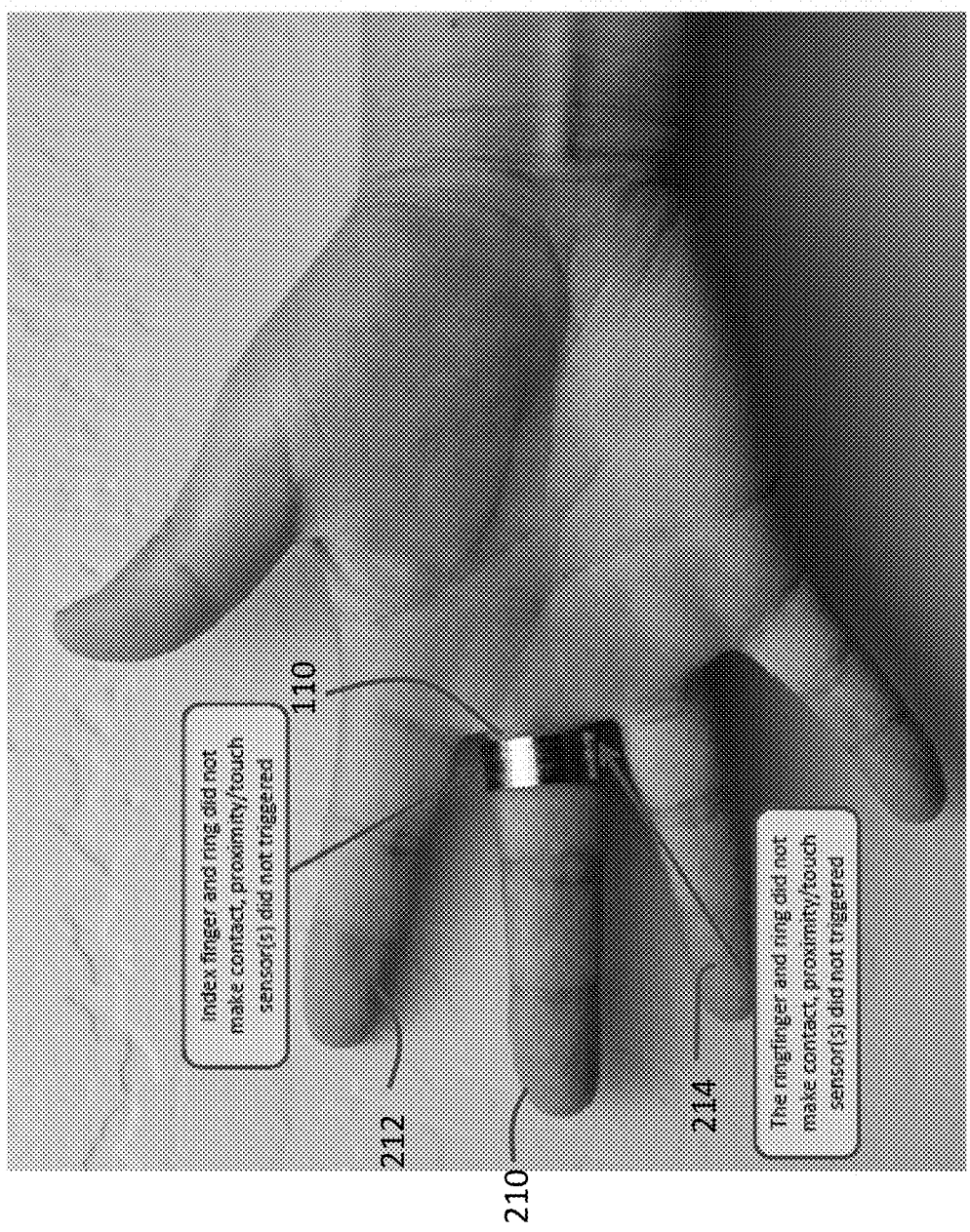

Referring to FIGS. 9A and 9B, the ring 100 can detect a finger and hand gesture in which the user spreads apart the index, middle, and ring fingers 212, 210, 214 such that the touch or proximity sensors are not triggered.

Figure 10B:
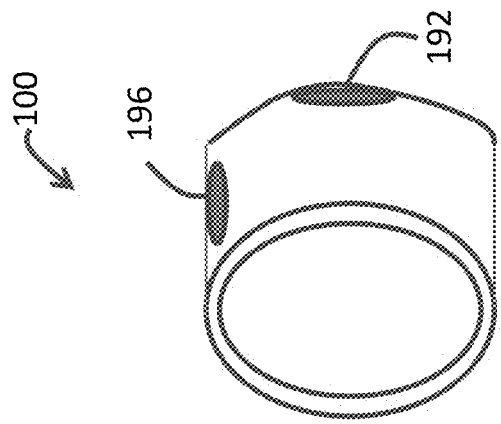
Figure 10A:
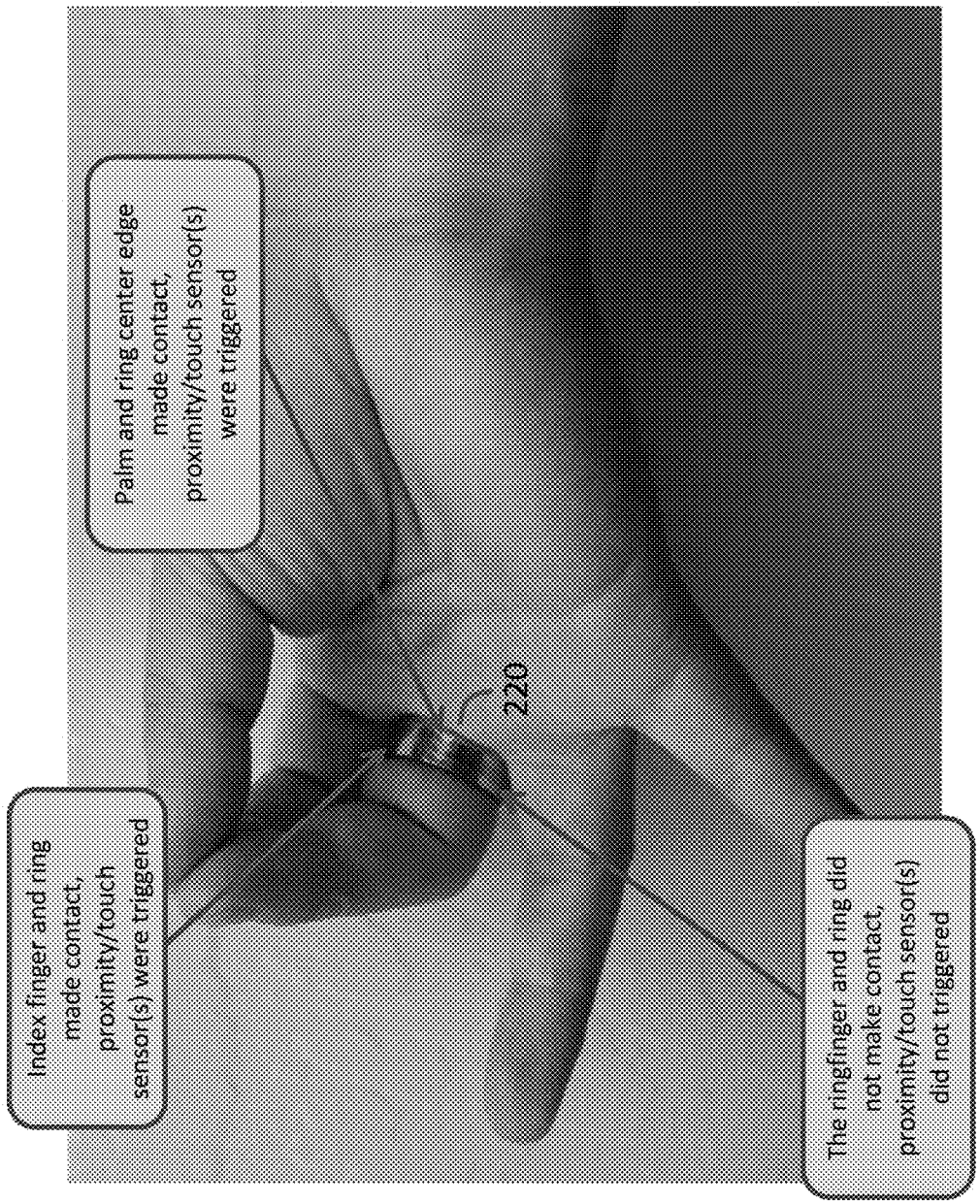

Referring to FIGS. 10A and 10B, the ring 100 can detect a finger and hand gesture in which the index finger is pressed against the middle finger and the tip of the thumb contacts the tip of the middle finger. The index and middle fingers are pressed against each other so the index finger touches the ring 100 at the contact region 196. The middle and ring fingers are spread apart so that the ring finger does not contact the ring 100. Because the middle finger curls inward, a portion of the palm 220 contacts the ring 100 near the edge of the ring at the contact region 192. In this example, the touch or proximity sensors at the contact regions 192 and 196 are triggered.

Referring to FIGS. 11A to 11C, the ring 100 can detect a finger and hand gesture in which the tip of the middle finger contacts the tip of the thumb. Because the middle finger tilts inward, a portion of the palm 220 contacts the ring 100 at the contact region 192. The index and middle fingers are spread apart so that the index finger does not contact the ring 100.

The middle and ring fingers are spread apart so that the ring finger does not contact the ring 100. In this example, the touch or proximity sensors at the contact region 192 are triggered.

Figure 12A:
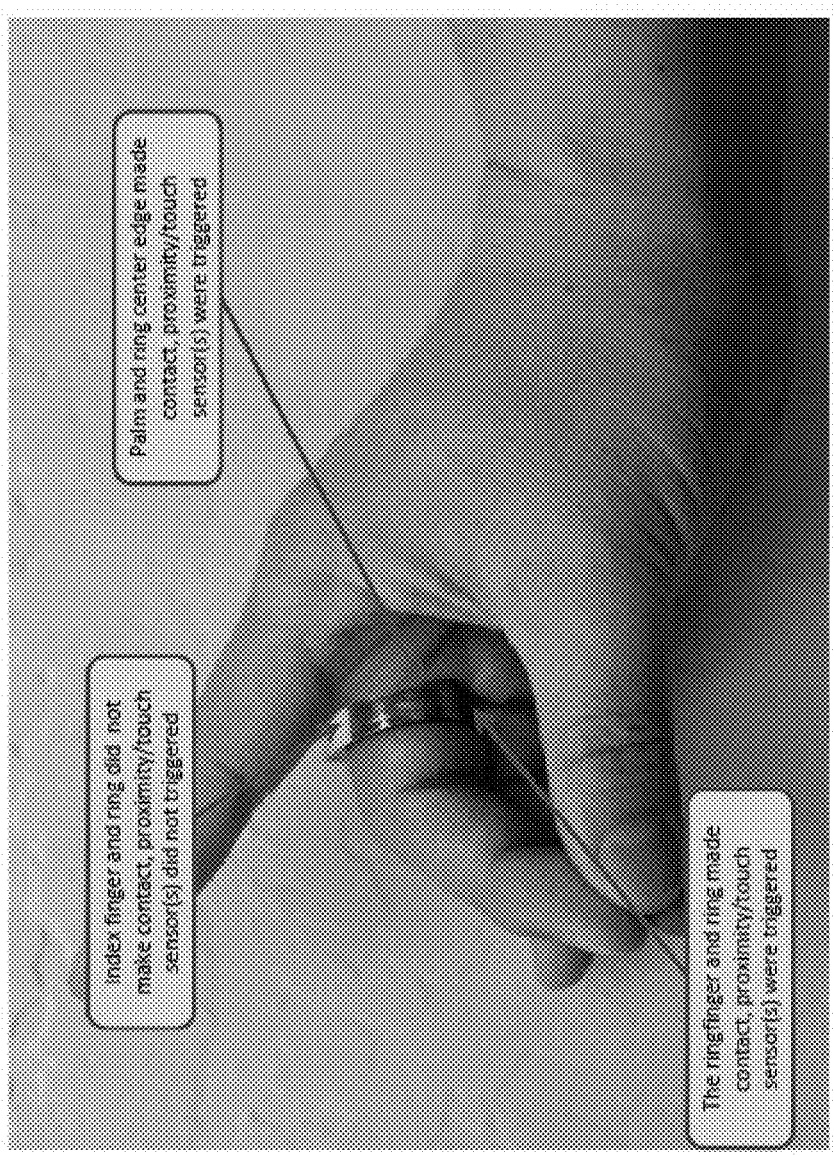
Figure 12B:
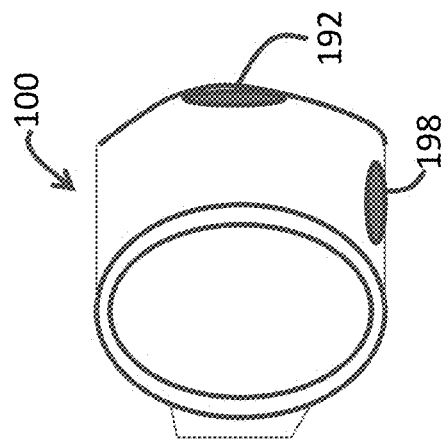

Referring to FIGS. 12A and 12B, the ring 100 can detect a finger and hand gesture in which the tip of the middle finger contacts the tip of the thumb so that a portion of the palm contacts the ring 100 at the contact region 192. The index and middle fingers are spread apart so that the index finger does not contact the ring 100. The ring finger presses against the middle finger so that the ring finger contacts the ring 100 at the contact region 198. In this example, the touch or proximity sensors at the contact regions 192 and 198 are triggered.

Figure 13B:
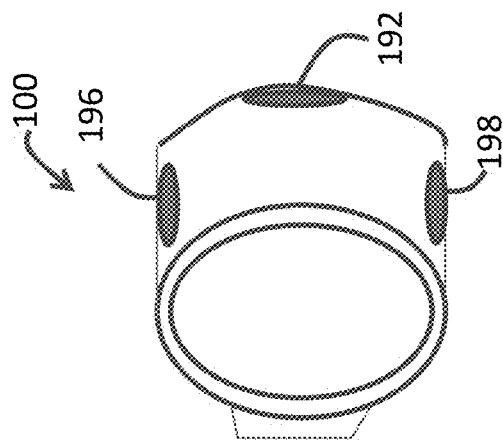
Figure 13A:
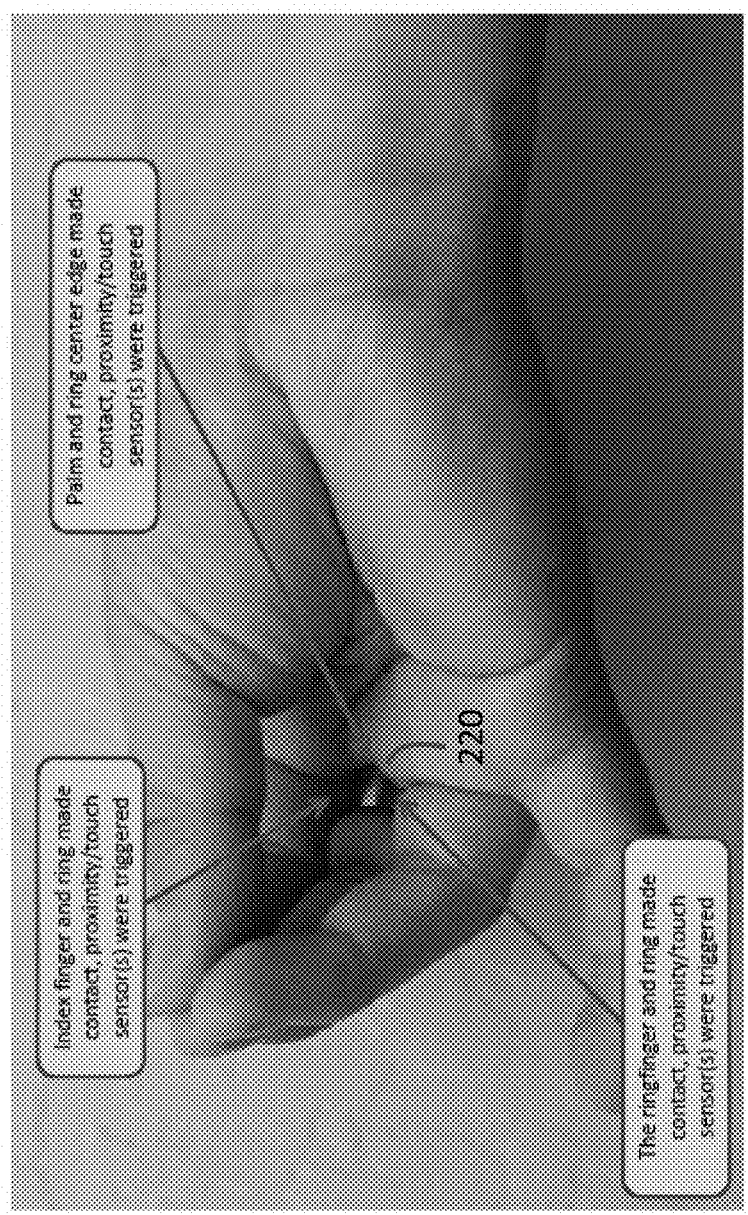

Referring to FIGS. 13A and 13B, the ring 100 can detect a finger and hand gesture in which the tip of the middle finger contacts the tip of the thumb so that a portion of the palm 220 contacts the ring 100 at the contact region 192. The index, middle, and ring fingers are pressed against each other so that the index finger contacts the ring 100 at the contact region 196 and the ring finger contacts the ring 100 at the contact region 198. In this example, the touch or proximity sensors at the contact regions 192, 196, and 198 are triggered.

Referring to FIGS. 14A and 14B, the ring 100 can detect a finger and hand gesture in which the middle finger is curled inwards to cause portions of the palm to contact the ring 100 at the contact regions 190 and 192. The index and middle fingers are spread apart so that the index finger does not contact the ring 100. The ring finger also curls inwards and presses against the middle finger such that the ring finger contacts the ring 100 at the contact region 198. In this example, the touch or proximity sensors at the contact regions 190, 192, and 198 are triggered.

Figure 15B:
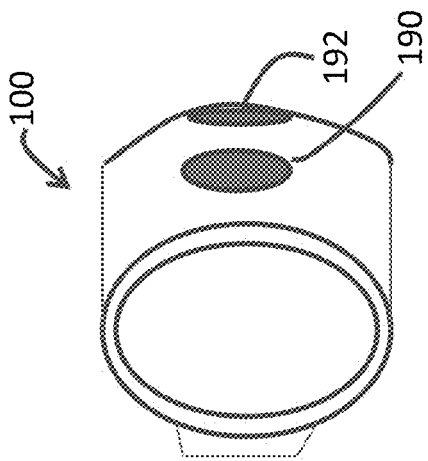
Figure 15A:
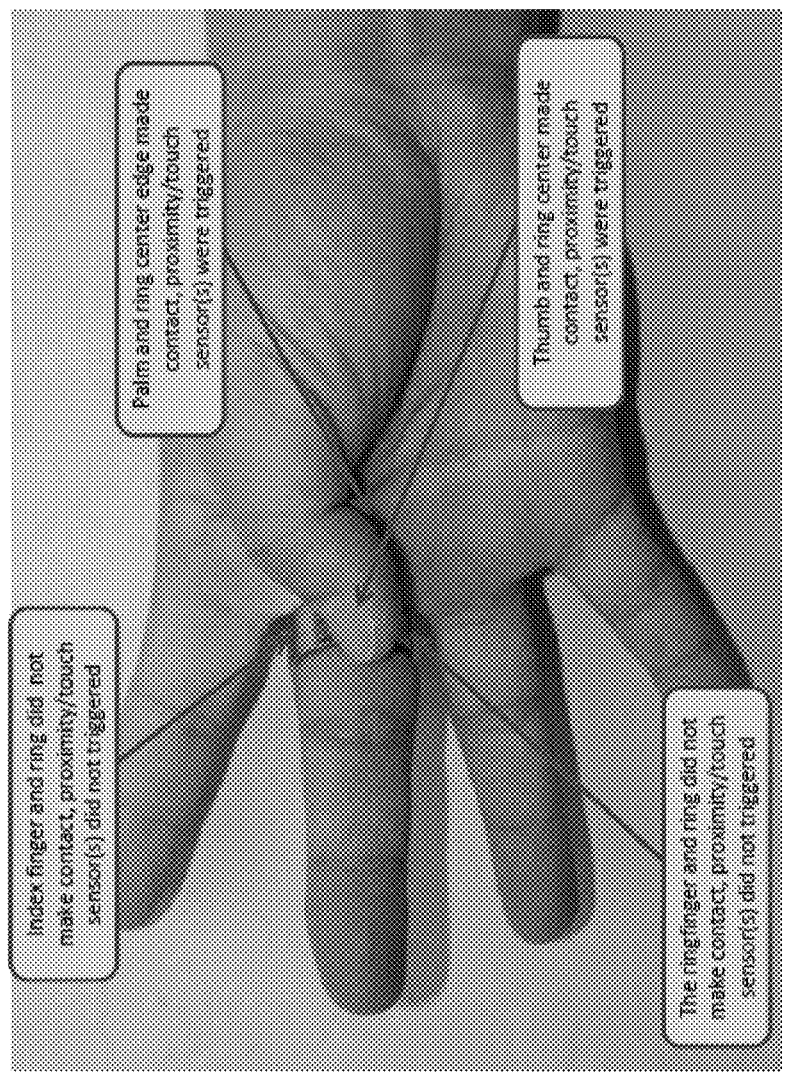

Referring to FIGS. 15A and 15B, the ring 100 can detect a finger and hand gesture in which the middle finger tilts inward so that a portion of the palm contacts the ring 100 at the contact region 192. The thumb reaches over to touch the ring 100 at the contact region 190. The index, middle, and ring fingers are spread apart so that neither the index finger nor the ring finger contacts the ring 100. In this example, the touch or proximity sensors at the contact regions 190 and 192 are triggered.

Figure 16A:
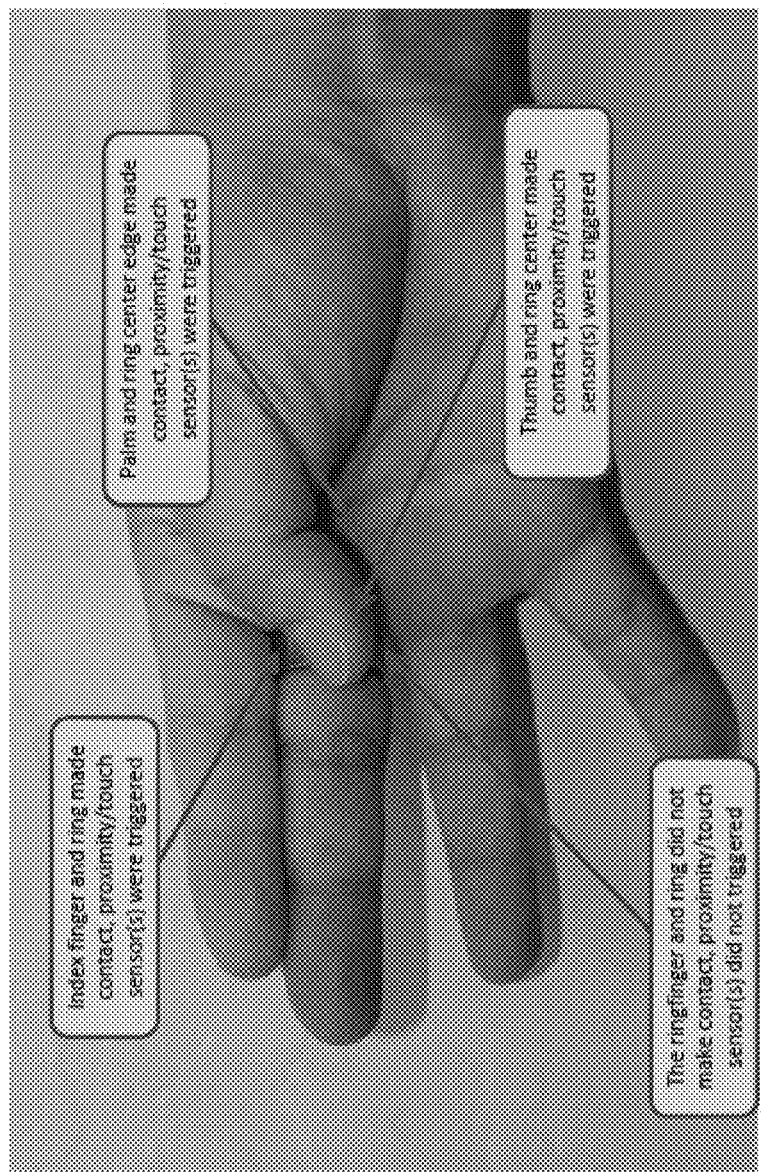
Figure 16B:
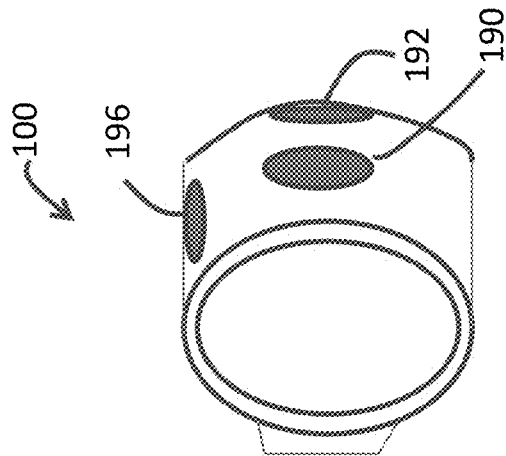

Referring to FIGS. 16A and 16B, the ring 100 can detect a finger and hand gesture in which the middle finger tilts inward so that a portion of the palm contacts the ring 100 at the contact region 192. The thumb reaches over to touch the ring 100 at the contact region 190. The index and middle fingers are pressed against each other so that the index finger contacts the ring 100 at the contact region 196. The middle and ring fingers are spread apart so that the ring finger does not contact the ring 100. In this example, the touch or proximity sensors at the contact regions 190, 192, and 196 are triggered.

Figure 17B:
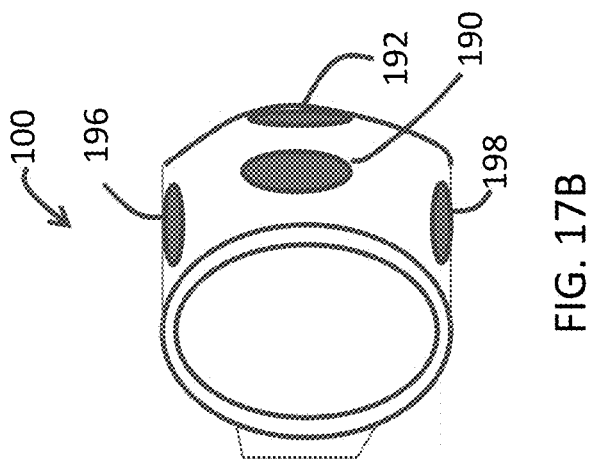
Figure 17A:
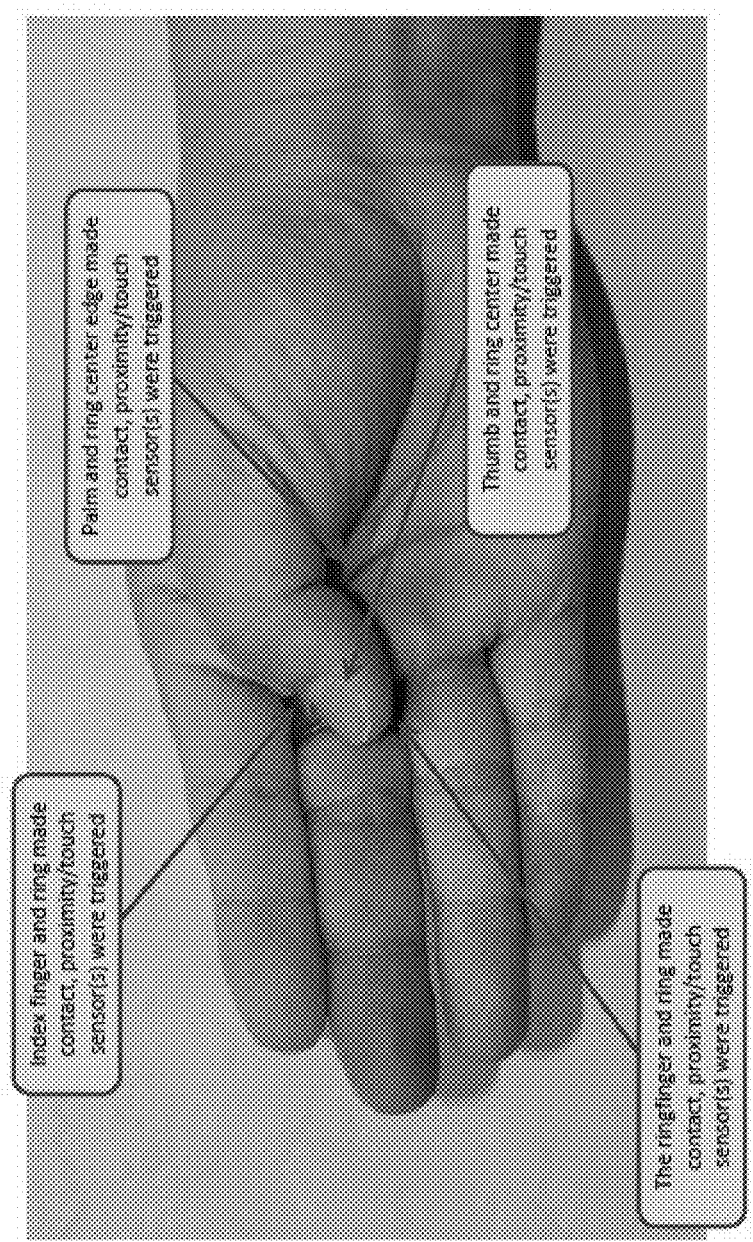

Referring to FIGS. 17A and 17B, the ring 100 can detect a finger and hand gesture in which the middle finger tilts inward so that a portion of the palm contacts the ring 100 at the contact region 192. The thumb reaches over to touch the ring 100 at the contact region 190. The index and middle fingers are pressed against each other so that the index finger contacts the ring 100 at the contact region 196. The middle and ring fingers are pressed against each other so that the ring finger contacts the ring 100 at the contact region 198. In this example, the touch or proximity sensors at the contact regions 190, 192, 196, and 198 are triggered.

Figure 18B:
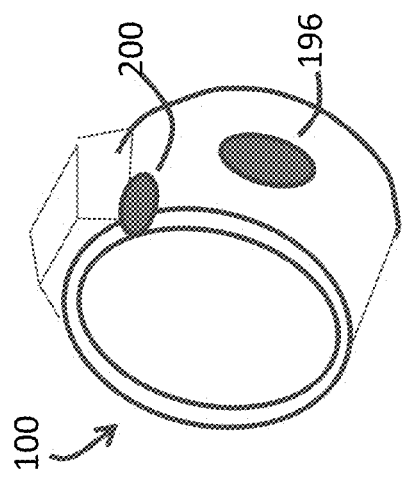
Figure 18A:

Referring to FIGS. 18A and 18B, the ring 100 can detect a finger and hand gesture in which the index finger crosses over the top of the middle finger so that the index finger touches the ring 100 at the contact regions 196 and 200. The middle and ring fingers are spread apart so that the ring finger does not contact the ring 100. In this example, the touch or proximity sensors at the contact regions 196 and 200 are triggered.

Figure 19B:
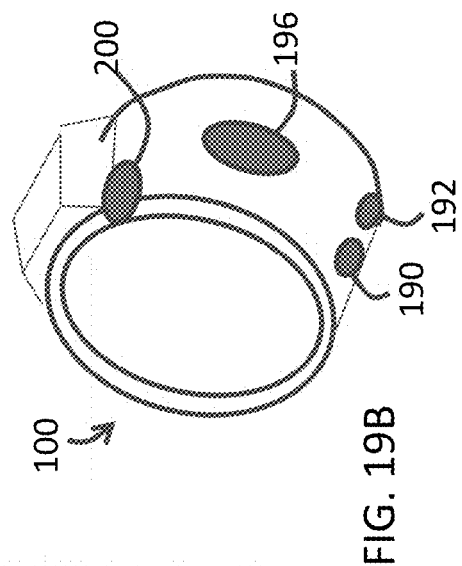
Figure 19A:
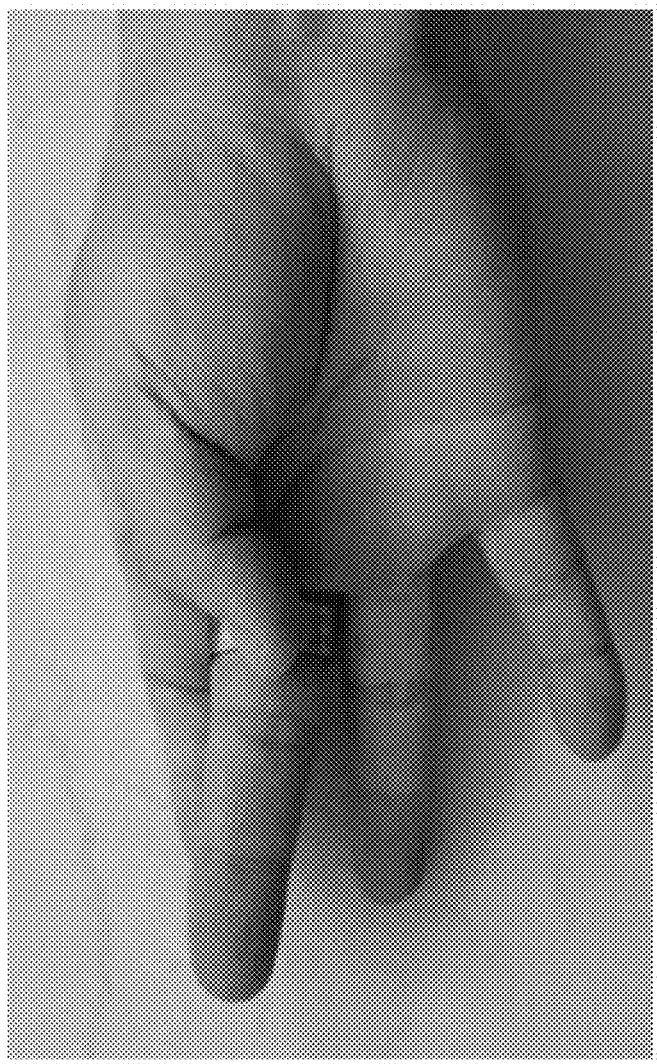

Referring to FIGS. 19A and 19B, the ring 100 can detect a finger and hand gesture in which the index finger crosses over the top of the middle finger so that the index finger touches the ring 100 at the contact regions 196 and 200. The middle finger tilts inward so that a portion of the palm contacts the ring 100 at the contact region 192. The thumb reaches over to touch the ring 100 at the contact region 190. The middle and ring fingers are spread apart so that the ring finger does not contact the ring 100. In this example, the touch or proximity sensors at the contact regions 190, 192, 196, and 200 are triggered.

Referring to FIGS. 20A to 20C, the ring 100 can detect a finger and hand gesture that involves both hands. Here, the index and middle fingers of the right hand press against each other so that the index finger touches the ring 100 at the contact region 196. The ring finger and the little finger of the right hand are curled inwards so that the ring finger does not touch the ring 100. The thumb and index (or middle) finger of the left hand hold the ring 100 so that the thumb of the left hand touches the ring 100 at the contact regions 190 and 192, and the index (or middle) finger of the left hand touches the ring 100 at the contact region 202. In this example, the touch or proximity sensors at the contact regions 190, 192, 196, and 202 are triggered.

Figure 21B:
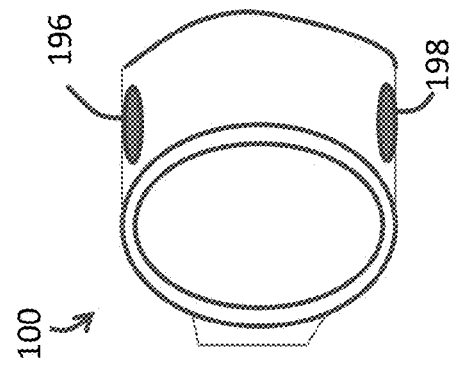
Figure 21A:
Figure 21C:
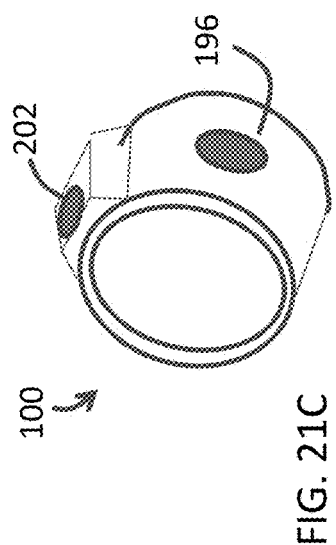

Referring to FIGS. 21A to 21C, the ring 100 can detect a finger and hand gesture that involves both hands in which the index, middle, and ring fingers of the right hand press against each other so that the index finger touches the ring 100 at the contact region 196 and the ring finger touches the ring 100 at the contact region 198. The index (or middle) finger of the left hand touches the ring 100 at the contact region 202. In this example, the touch or proximity sensors at the contact regions 196, 198, and 202 are triggered.

Figure 22A:
Figure 22B:
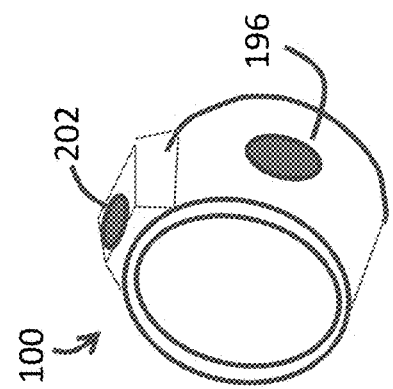

Referring to FIGS. 22A and 22B, the ring 100 can detect a finger and hand gesture that involves both hands in which the index and middle fingers of the right hand press against each other so that the index finger touches the ring 100 at the contact region 196. The ring finger and the little finger of the right hand are curled inward so that the ring finger does not touch the ring 100. The index (or middle) finger of the left hand touches the ring 100 at the contact region 202. In this example, the touch or proximity sensors at the contact regions 196 and 202 are triggered.

Sometimes, more than one finger/hand gesture can cause the same contact region(s) to be triggered.

Figure 23B:
Figure 23A:
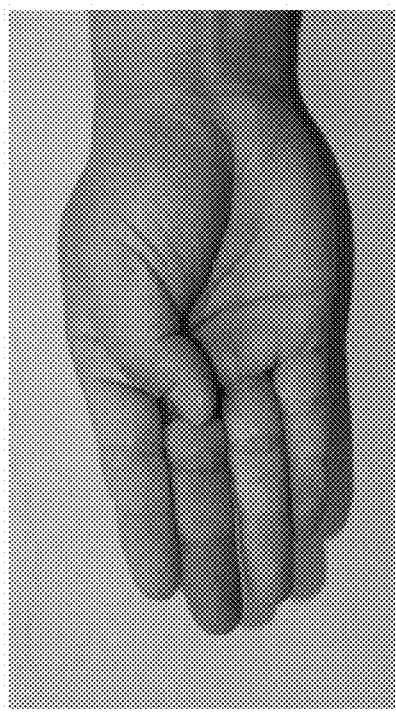
Figure 23D:
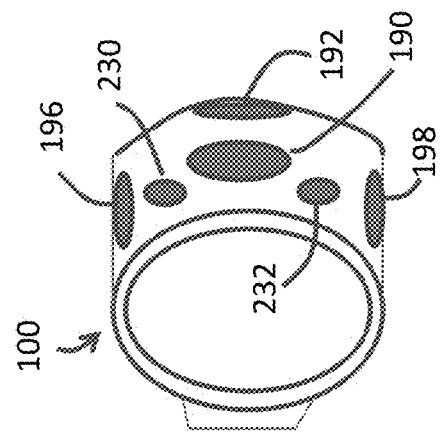
Figure 23C:
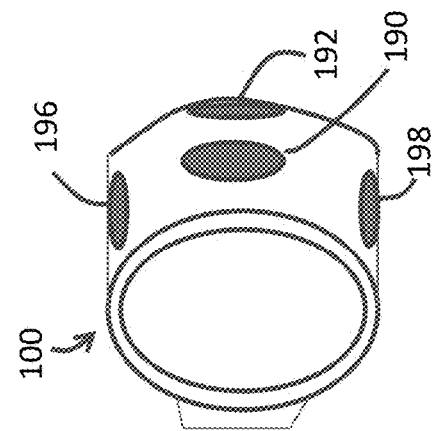

Referring to FIGS. 23A and 23C, the ring 100 can detect a finger and hand gesture in which the index, middle, and ring fingers press against each other so that the index finger touches the ring 100 at the contact region 196 and the ring finger touches the ring 100 at the contact region 198. The index, middle, and ring fingers tilt inward so that a portion of the palm touches the ring 100 at the contact region 192. The thumb touches the ring 100 at the contact region 190. In this example, the touch or proximity sensors at the contact regions 190, 192, 196, and 198 are triggered. The gesture in FIG. 23A is the same as the gesture in FIG. 17A and is repeated here for ease of comparison with the gesture in FIG. 23B.

Referring to FIG. 23B, the touch or proximity sensors at the contact regions 190, 192, 196, and 198 can also be triggered by a finger and hand gesture in which the fingers are curled into a first shape so that the fingers touch the contact regions 190, 192, 196, and 198.

If the touch/proximity surface 116 of the ring 100 is divided into more contact regions (and each contact region has one or more independent touch/proximity sensors), or the user wears more than one ring on one hand so that there are additional signals, it is possible to differentiate between the gestures in FIGS. 23A and 23B. For example, referring to FIG. 23D, touch/proximity sensors at contact regions 230 and 232 may be used to differentiate between the gestures in FIGS. 23A and 23B. In the gesture of FIG. 23A, the touch/proximity sensors at the contact regions 230 and 232 are not triggered. In the gesture of FIG. 23B, the touch/proximity sensors at the contact regions 230 and 232 are triggered.

Figure 24A:
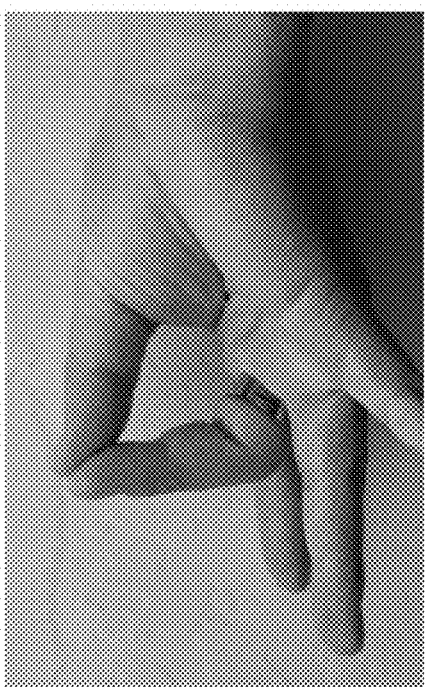
Figure 24B:
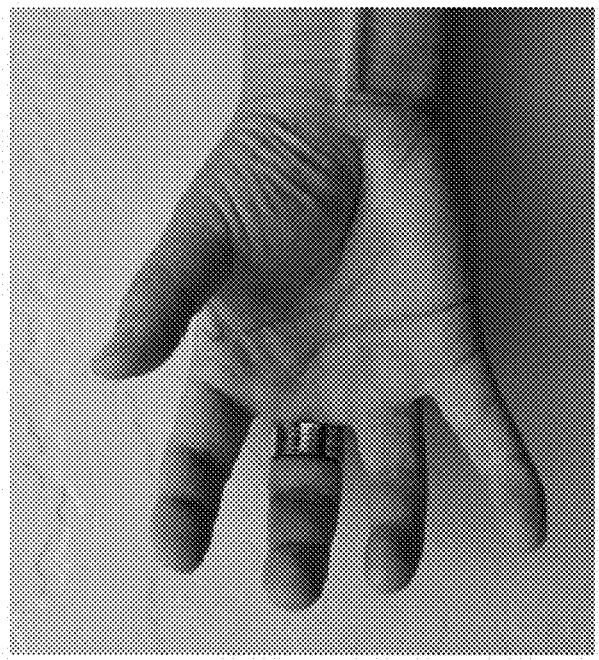
Figure 24C:
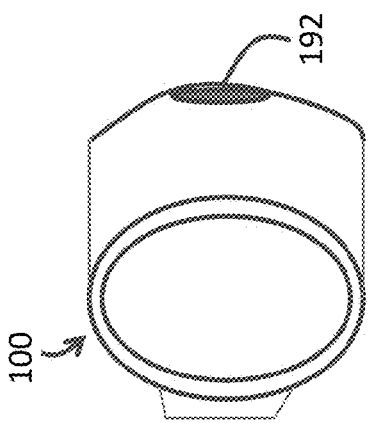

Referring to FIGS. 24A and 24C, the ring 100 can detect a finger and hand gesture in which the tip of the thumb touches the tip of the middle finger so that a portion of the palm touches the ring 100 at the contact region 192. The index, middle, and ring fingers are spread apart so that neither the index finger nor the ring finger touches the ring 100. In this example, the touch or proximity sensor at the contact region 192 is triggered. The gesture of FIG. 24A is the same as that shown in FIGS. 11A and 11B and is repeated here for ease of comparison with the gesture in FIG. 24B.

Referring to FIG. 24B, the touch or proximity sensors at the contact region 192 can also be triggered by a finger and hand gesture in which the fingers are spread apart and also slightly curled inward so that a portion of the palm contacts the ring at the contact region 192 but the index and ring fingers do not touch the ring 100.

If the touch/proximity surface 116 of the ring 100 is divided into more contact regions (and each contact region has one or more independent touch/proximity sensors), or the user wears more than one ring on one hand so that there are additional signals, it is possible to differentiate between the gestures in FIGS. 24A and 24B.

Referring to FIGS. 25A and 25C, the ring 100 can detect a finger and hand gesture in which only the touch/proximity sensors at the contact region 196 is triggered. This can be achieved by keeping the index and middle fingers pointing straight while curling the little and ring fingers and using the thumb to hold the little and ring fingers in the curled position. The index finger is pressed against the middle finger so that the index finger contacts the ring 100 at the contact region 196.

Referring to FIG. 25B, the touch/proximity sensors at the contact region 196 can also be triggered by a finger and hand gesture in which the index and middle fingers are extended straight, and the index finger presses against the middle finger so that the index finger contacts the ring at the contact region 196. The little and ring fingers are extended straight, and the ring finger is spread apart from the middle finger so that the ring finger does not contact the ring 100. The little and ring fingers can either be separated apart or pressed together. The gesture of FIG. 25B is the same as that shown in FIG. 7A and is repeated here for ease of comparison with the gesture in FIG. 25A.

If the touch/proximity surface 116 of the ring 100 is divided into more contact regions (and each contact region has one or more independent touch/proximity sensors, or if the user wears more than one ring on one hand so that there are additional signals, it is possible to differentiate between the gestures in FIGS. 25A and 25B.

Figure 26A:
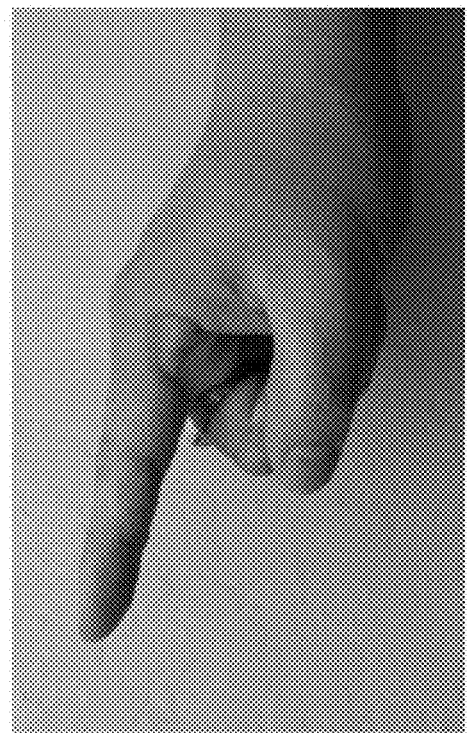
Figure 26B:
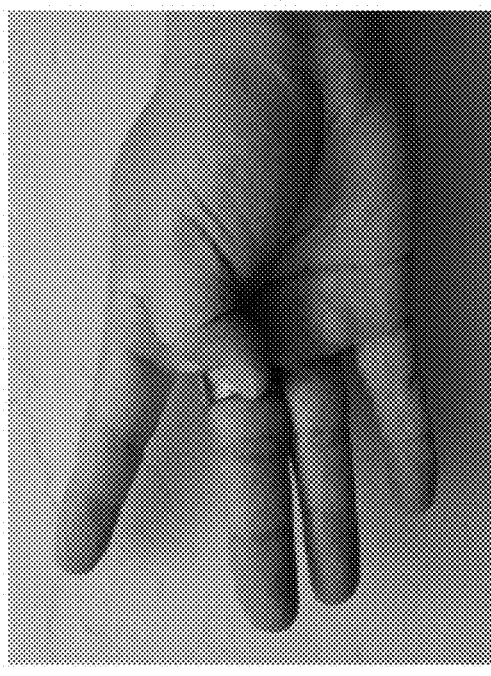
Figure 26C:
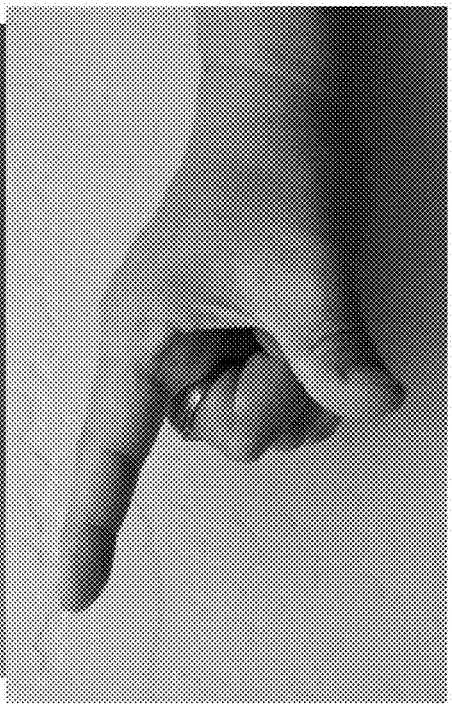
Figure 26D:
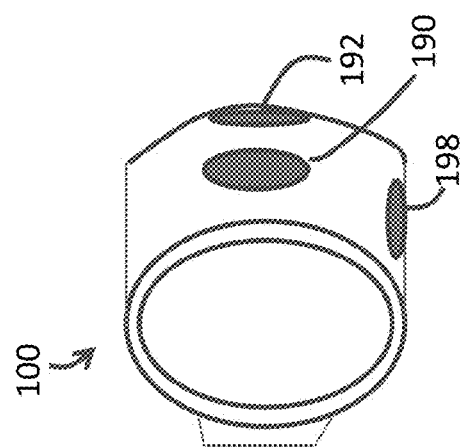
Figure 27A:
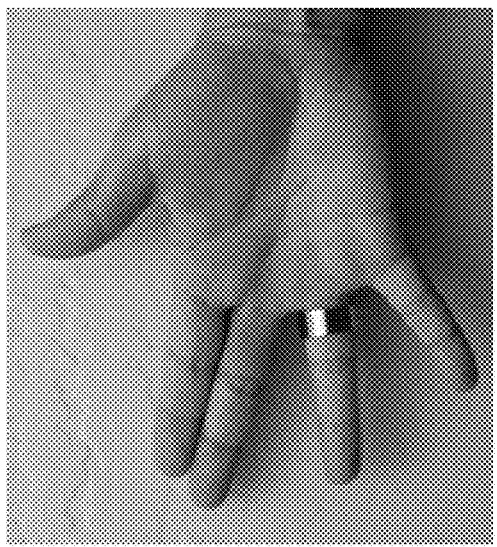
Figure 27B:
Figure 27C:
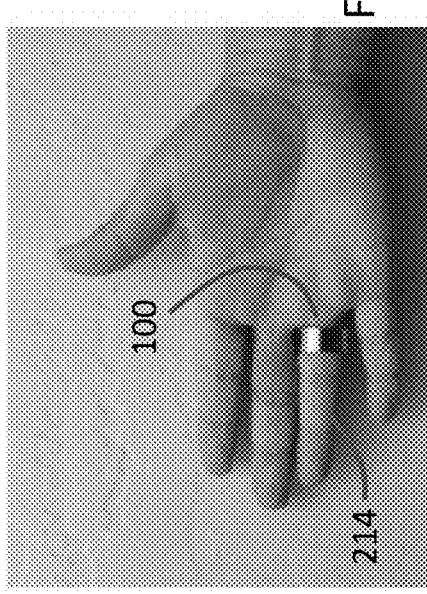
Figure 27D:

Referring to FIGS. 26A, 26C, and 26D, the ring 100 can detect a finger and hand gesture in which the touch/proximity sensors at contact regions 190, 192, and 198 are triggered. This can be achieved by pointing the index finger straight while curling the middle, little, and ring fingers inward. The thumb can either press against the middle finger, as shown in FIG. 26A, or spread apart from the middle finger, as shown in FIG. 26C. The index finger does not contact the ring 100. The ring finger is pressed against the middle finger so that the ring finger touches the ring 100 at the contact region 198. Because the middle finger is curled inward, portions of the palm contact the ring 100 at the contact regions 190 and 192. The gesture of FIG. 26A is the same as that shown in FIG. 14A and is repeated here for ease of comparison with the gesture in FIGS. 26B and 26C.

Referring to FIG. 26B, the touch or proximity sensors at the contact regions 190, 192, and 198 can also be triggered by a finger and hand gesture in which the index, middle, little, and ring fingers are extended straight, and the index finger is spread apart from the middle finger so that the index finger does not contact the ring 100. The ring finger presses against the middle finger so that the ring finger contacts the ring 100 at the contact region 198. The middle finger is tilted inward so that a portion of the palm contacts the ring 100 at the contact region 192. The thumb touches the ring 100 at the contact region 190.

If the touch/proximity surface 116 of the ring 100 is divided into more contact regions (and each contact region has one or more independent touch/proximity sensors), or the user wears more than one ring on one hand so that there are additional signals, it is possible to differentiate between the gestures in FIGS. 26A and 26B.

Referring to FIGS. 27A to 27D, in some examples, the ring 100 can be worn on the ring finger 214. The ring 100 can detect a number of finger and hand gestures based on whether the middle finger contacts the ring 100, whether the little finger contacts the ring 100, and whether a portion of the palm contacts the ring 100.

Referring to FIGS. 28A to 28E, in some examples, the ring 100 can be worn on the index finger 211. The ring 100 can detect a number of finger and hand gestures based on whether the thumb contacts the ring 100, whether the middle finger contacts the ring 100, whether a portion of the palm or thumb contacts the ring 100.

Figure 29B:
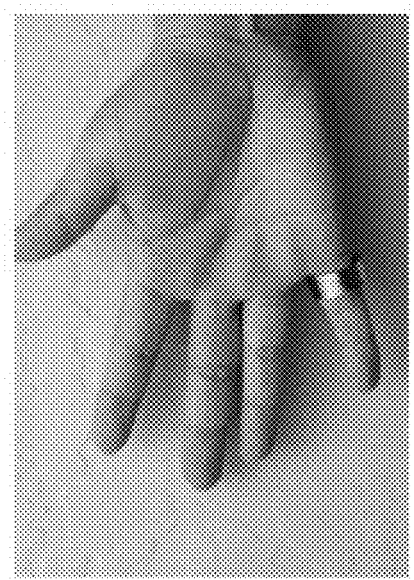
Figure 29A:
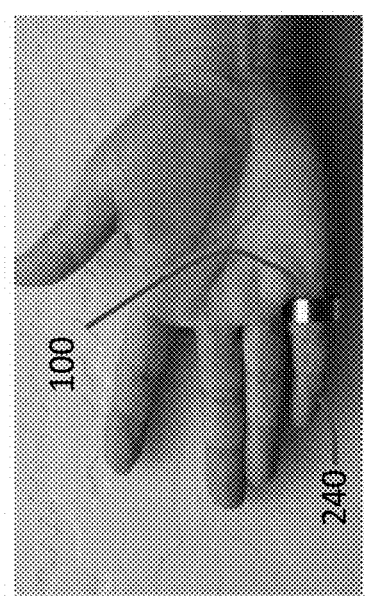
Figure 29C:

Referring to FIGS. 29A to 29C, in some examples, the ring 100 can be worn on the little finger 240. The ring 100 can detect a number of finger and hand gestures based on whether the ring finger contacts the ring 100 and whether a portion of the palm or other fingers contact the ring 100.

Figure 30B:
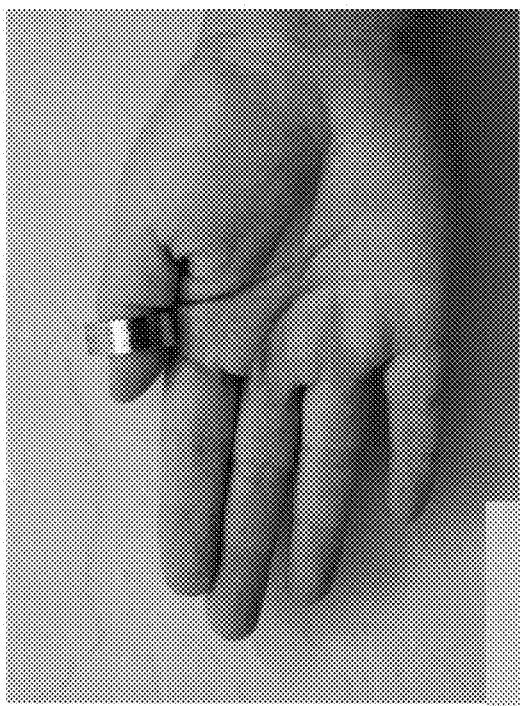
Figure 30C:
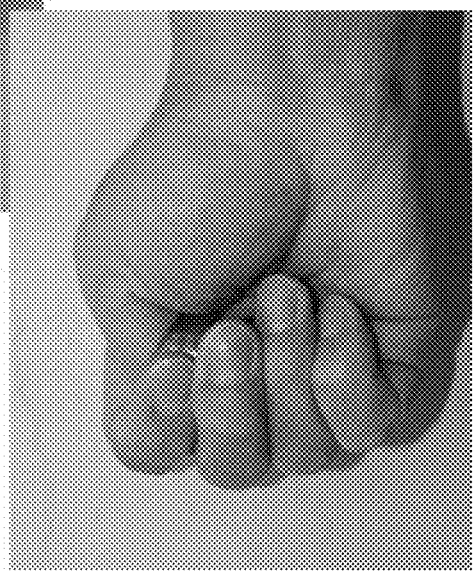
Figure 30A:
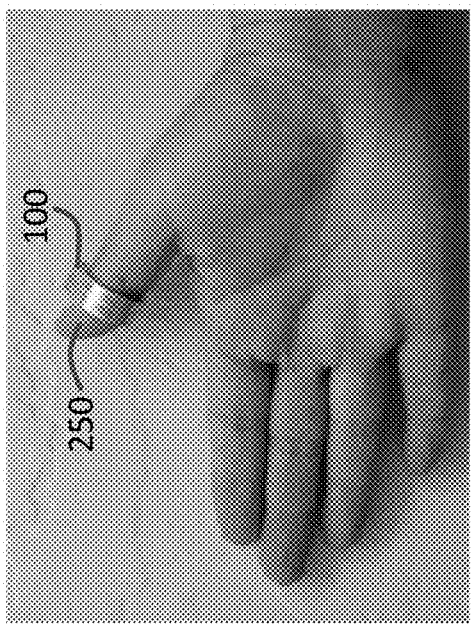

Referring to FIGS. 30A to 30C, in some examples, the ring 100 can be worn on the thumb 250. The ring 100 can detect a number of finger and hand gestures based on whether the index finger contacts the ring 100 and whether a portion of the palm contacts the ring 100.

In the examples shown in FIGS. 6A to 30C, the ring 100 was worn on one of the fingers of the right hand. In some examples, the ring can be worn on the left hand. Additional gestures not shown in the figures are also possible. With built-in touch or proximity sensors, the disclosure provides a method for detecting detailed finger and hand gestures because one ring can detect the relative locations and orientations of at least three fingers. By integrating built-in accelerometers, gyrometers, and magnetometers, the ring 100 can enable a greater variety of commands compared to just detecting hand or arm movements. To switch between different devices controlled by the ring 100, the user only needs to change finger gesture. For example, the user can control the television audio volume by using a hand and finger gesture in which one finger is pointing out, and waving the hand up and down. The user can control the light system to make it brighter or dimmer by switching to another hand and finger gesture in which two fingers are pointing out, and using the same hand waving up and down movements. The user can control a fan to increase or decrease the fan speed by switching to a third hand and finger gesture in which three fingers are pointing out, and use the same hand waving up and down movements.

In some examples, rings can be worn on the fingers of both hands. In some examples, rings can be worn on multiple fingers of the same hand. In some examples, both hands can have multiple rings.

In some implementations, the user can wave the hand and draw in the air. The ring 100 has built in accelerometer(s), magnetometer(s) and gyrometer(s) to detect the movements of the hand. As the user draws in the air, the ring 100 detects a trace of the hand movements and sends the detected movements to the ring's central controller. The controller recognizes the alphabet characters, numbers, special characters, or symbols drawn by the user based on the trace. The controller can also be part of the portable device 174 of FIG. 5A.

An advantage of the ring 100 is that by using different finger gestures while drawing in the air, the user can generate different commands or select different characters with similar hand movements. For example, when the user draws in the air the shape of the character 'O,' it may be unclear whether the user is drawing a capital letter 'O', a small letter 'o', or a number '0.' Different finger gestures can be associated with different sets of keys. This way, it is possible to differentiate similar or same drawing movements by determining what finger gesture is used to perform the drawing.

FIGS. 31 to 34 illustrate an example of using the ring 120 to detect finger and hand gestures to improve the accuracy of character recognition when the user draws in air.

Figure 31:

Referring to FIG. 31, a finger gesture 260 can be associated with a set of keys 262. When the user draws in the air with the fingers oriented according to the gesture 260, the controller receiving the hand movement signals from the ring 100 will interpret the movements according to the set of keys 262.

Figure 32:
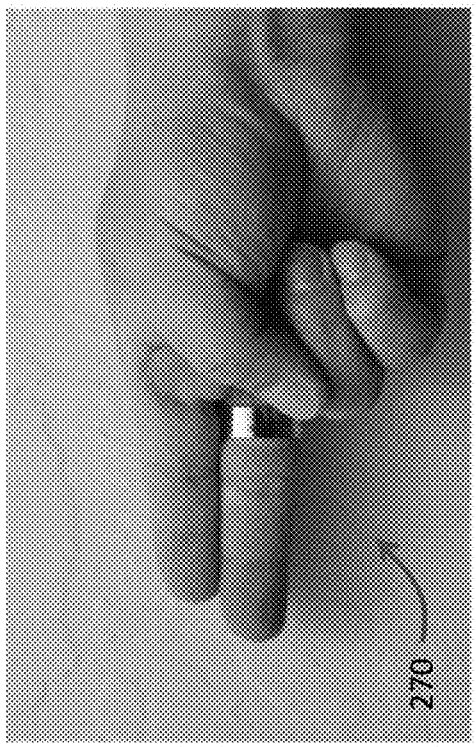

Referring to FIG. 32, a finger gesture 270 can be associated with a set of keys 272. When the user draws in the air with the fingers oriented according to the gesture 270, the controller receiving the hand movement signals from the ring 100 will interpret the movements according to the set of keys 272.

Referring to FIG. 33, a finger gesture 280 can be associated with a set of keys 282. When the user draws in the air with the fingers oriented according to the gesture 280, the controller receiving the hand movement signals from the ring 100 will interpret the movements based on the set of keys 282.

Figure 34:
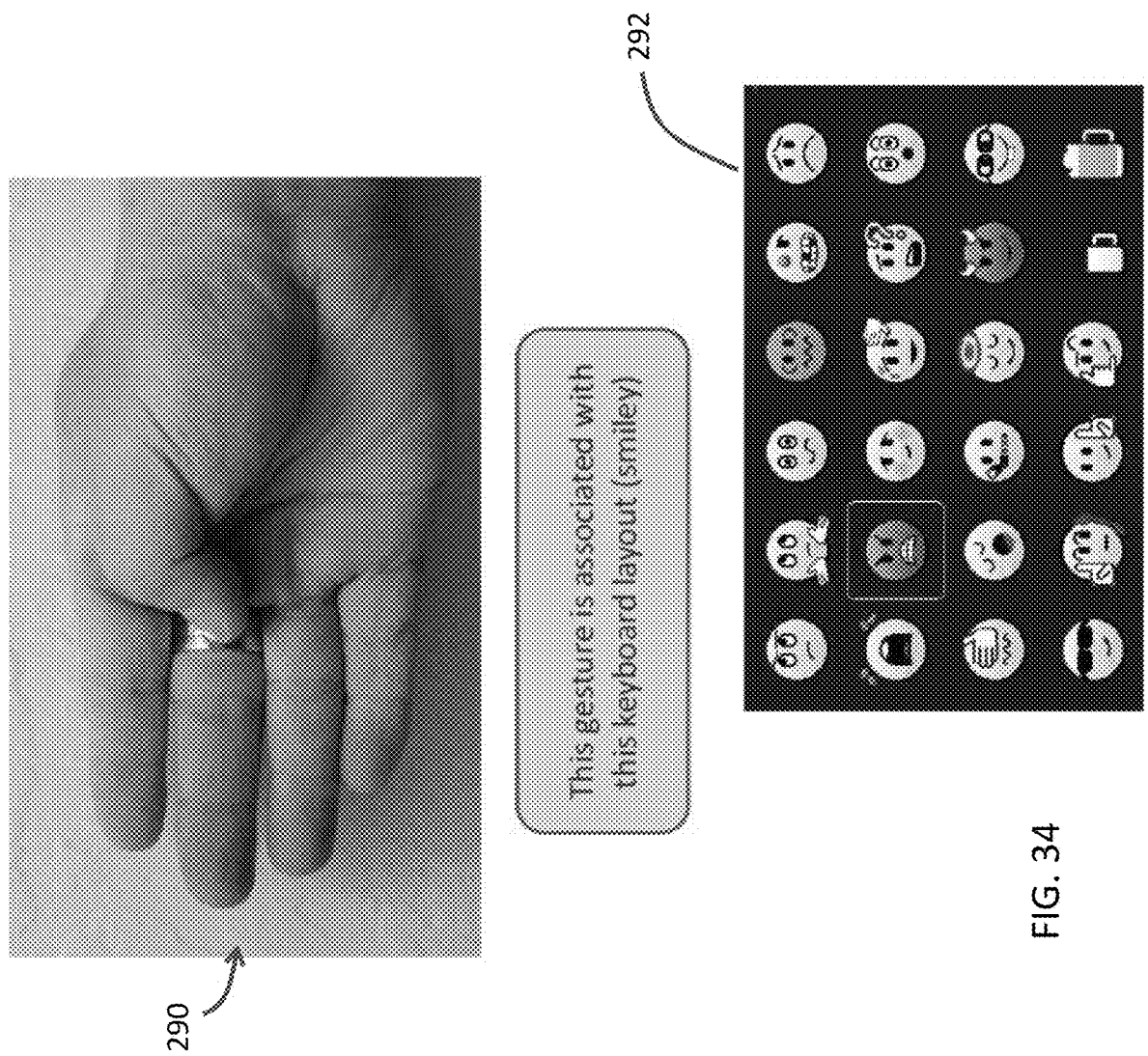

Referring to FIG. 34, a finger gesture 290 can be associated with a set of keys 292. When the user draws in the air with the fingers oriented according to the gesture 290, the controller receiving the hand movement signals from the ring 100 will interpret the movements based on the set of keys 292.

Figure 35:
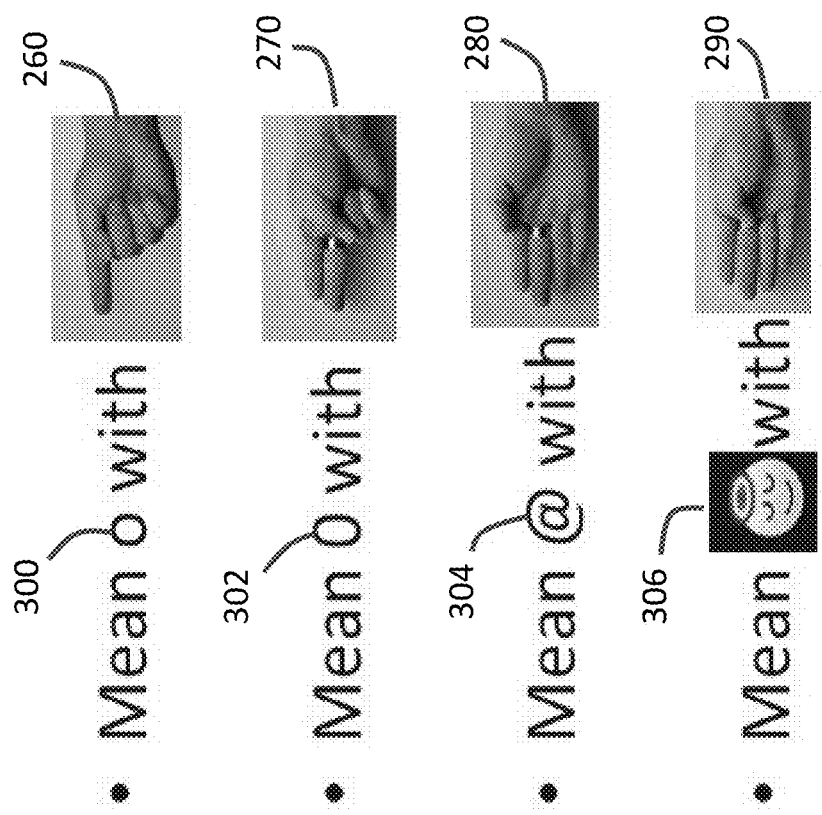

Referring to FIG. 35, in some examples, the controller can associate the finger gestures 260, 270, 280, and 290 with different sets of keys. When the user draws a circle or an oval in the air, the controller will interpret the hand movement depending on which finger gesture is used when the drawing is performed. For example, if the user applies the finger gesture 260 while drawing an oval, the controller interprets the hand movement as drawing a small letter 'o' 300. Similarly, if the user applies the finger gesture 270, 280, or 290 while drawing the oval, the controller interprets the hand movement as drawing a number '0' 302, a symbol '@' 304, or an emoticon 306, respectively.

Referring to FIG. 36, when the user draws a vertical line segment in the air, the controller will interpret the hand movement depending on which finger gesture is used when the drawing is performed. For example, if the user applies the finger gesture 260 while drawing the vertical line segment, the controller interprets the hand movement as drawing a small letter T 310. Similarly, if the user applies the finger gesture 270, 280, or 290 while drawing the vertical line segment, the controller interprets the hand movement as drawing a number '1' 312, a symbol '|' 314, or an emoticon 316, respectively.

Figure 37B:
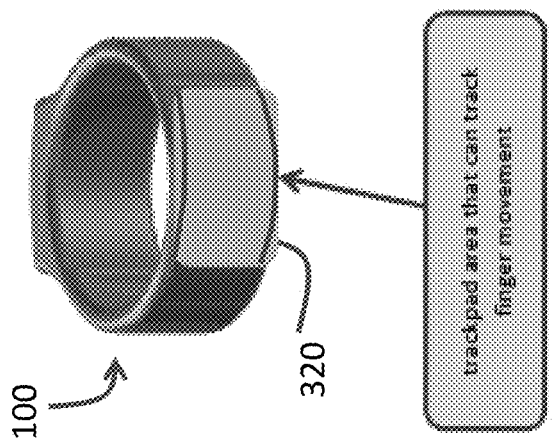
Figure 37A:
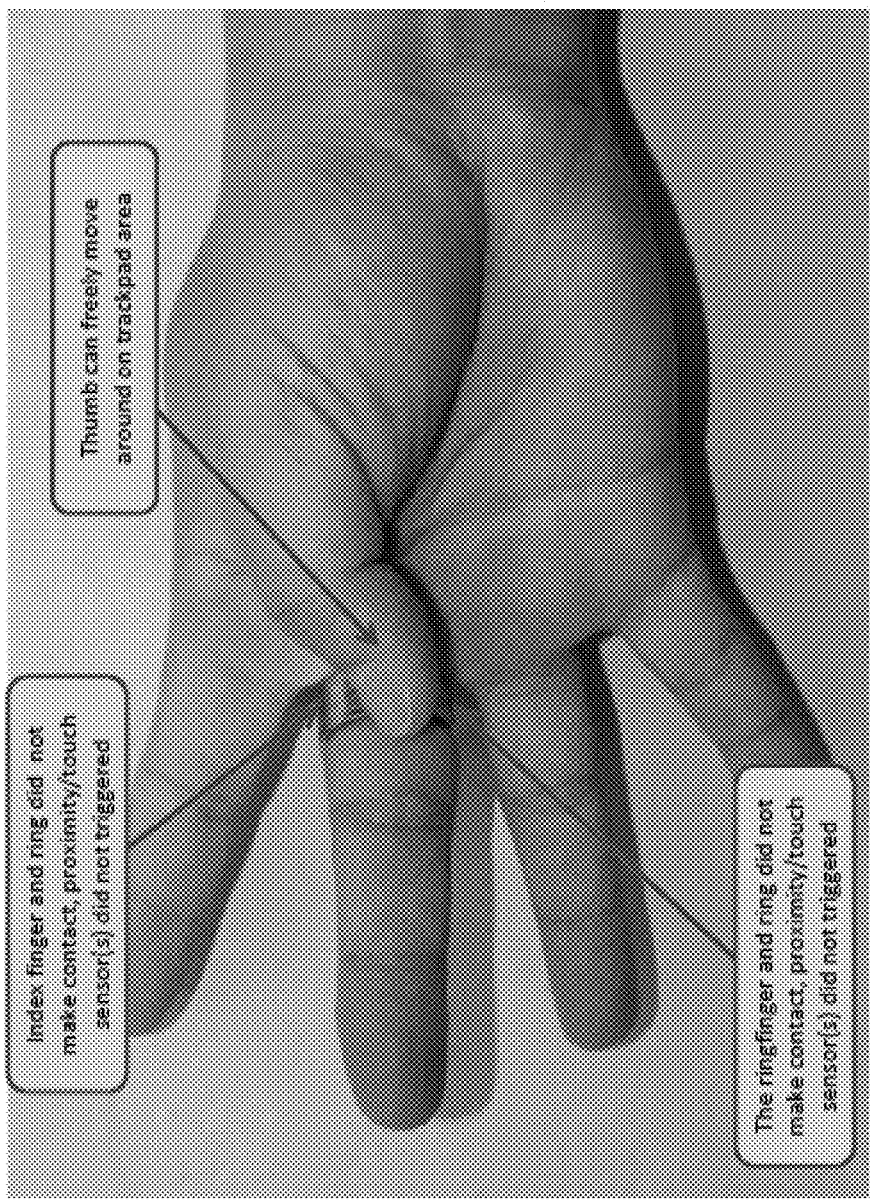

Referring to FIGS. 37A and 37B, in some implementations, a portion of the touch/proximity sensor 116 is used as a small trackpad that tracks finger movements across the surface of the trackpad. The trackpad can detect different fingertip movements, for example, left to right movement, right to left movement, top to bottom movement, bottom to top movement, circular clockwise movement, circular counterclockwise movement, tap, double taps, and triple taps, etc.

Here, when the ring is worn on the middle finger, the left to right movement refers to a movement in a direction from the ring finger towards the index finger, and the right to left movement refers to a movement in a direction from the index finger toward the ring finger. The up to down movement refers to a movement in a direction from the fingertip towards the palm, and the down to up movement refers to a movement in a direction from the palm towards the fingertip.

The small trackpad can also have multi-touch capability to detect two or more touch or proximity inputs or movements. The trackpad can be used in combination with other touch or proximity sensors of the ring so that the same movement on the trackpad can be interpreted differently for different finger and hand gestures that trigger different touch or proximity sensors on the ring.

In the example of FIG. 37B, a portion 320 of the touch/proximity surface 116 functions as a trackpad. The other contact regions 196 and 198 of the touch/proximity surface 116 detect touch/proximity inputs from the index and ring fingers. In the example of FIG. 37A, the user applies a finger gesture in which the index and ring fingers do not contact the ring 100 so that the index and ring fingers do not activate touch or proximity sensors. The thumb can move freely on the trackpad area 320.

Referring to FIGS. 38A and 38B, the user may apply a finger gesture in which the index finger is pressed against the middle finger so that the index finger contacts the ring 100 to activate the touch/proximity sensors of the contact region 196. The ring finger does not contact the ring 100 so that the ring finger does not activate touch/proximity sensors. The thumb can move on the trackpad area 320, which can detect whether the thumb is, e.g., swiping up, down, left, or right.

Figure 39A:
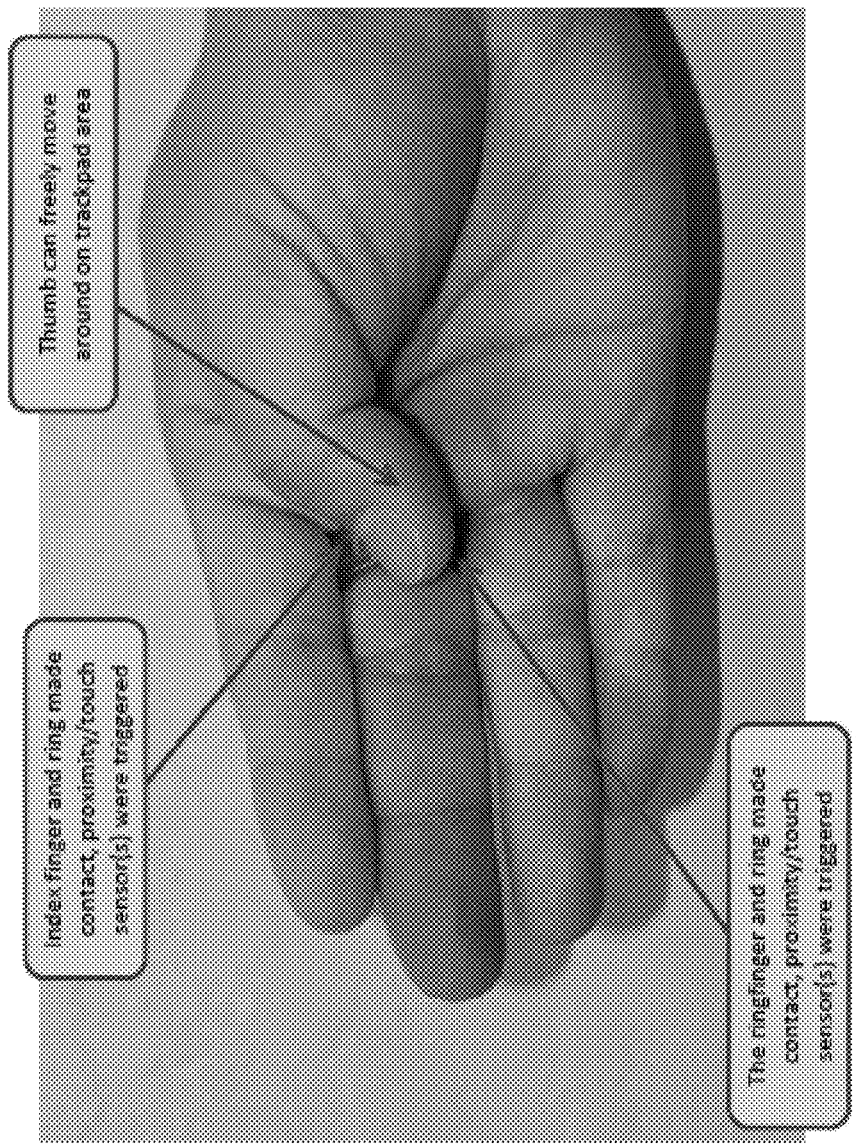
Figure 39B:
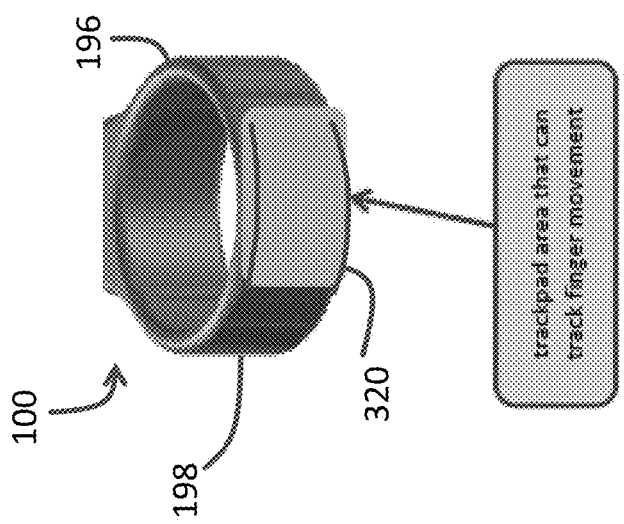

Referring to FIGS. 39A and 39B, the user may apply a finger gesture in which the index and ring fingers are pressed against the middle finger so that the index and ring fingers contact the ring 100 to activate the touch/proximity sensors of the contact regions 196 and 198. The thumb can move freely on the trackpad area 320.

Figure 40B:
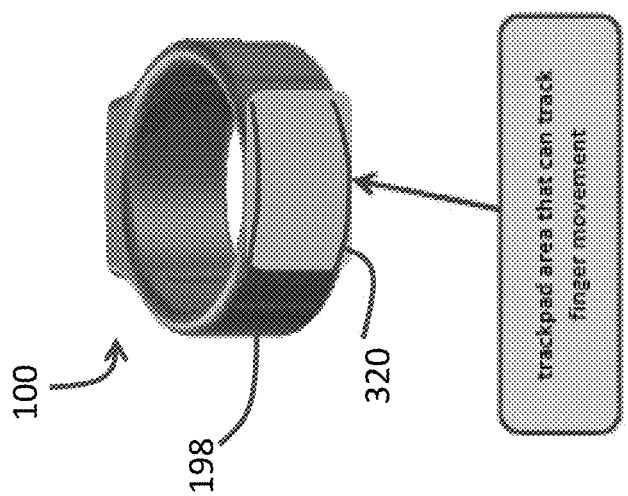
Figure 40A:
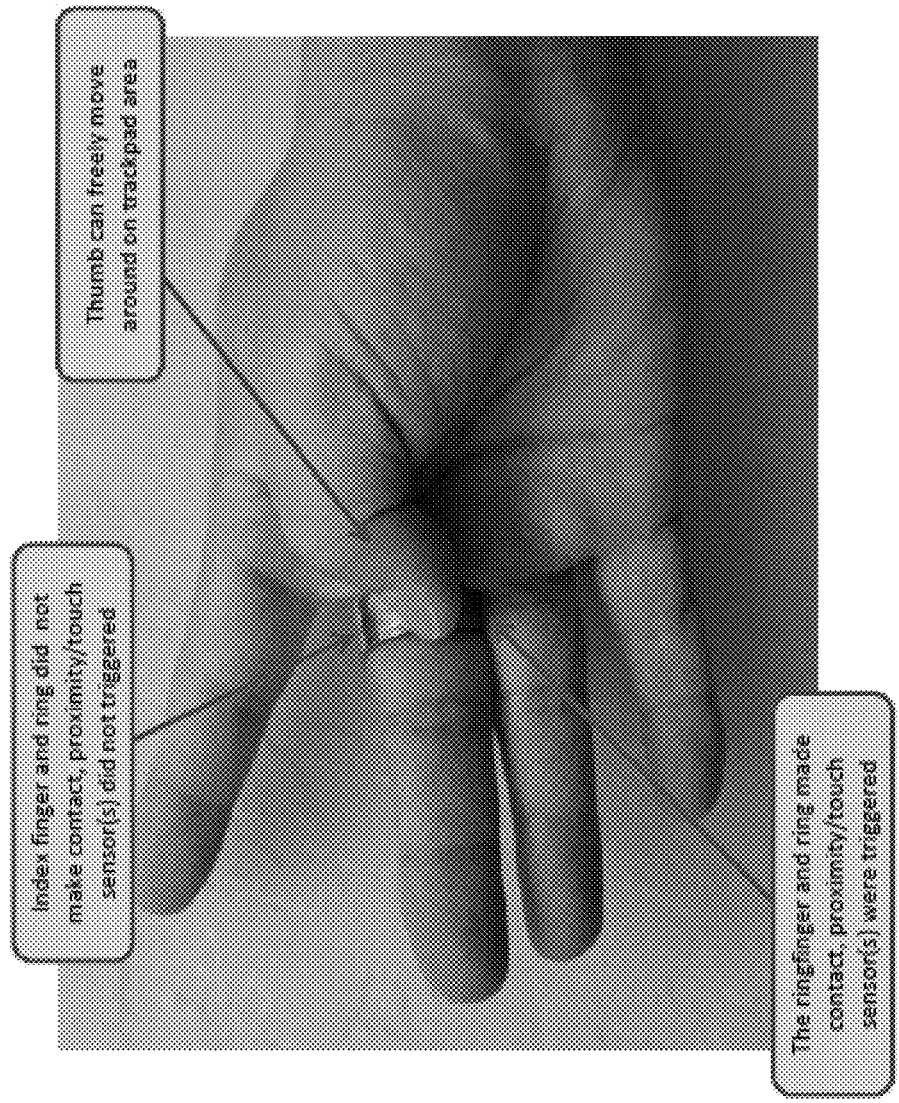

Referring to FIGS. 40A and 40B, the user may apply a finger gesture in which the ring finger is pressed against the middle finger so that the ring finger contacts the ring 100 to activate the touch/proximity sensors of the contact region 198. The index finger does not contact the ring 100 so that the index finger does not activate touch/proximity sensors. The thumb can move freely on the trackpad area 320.

Figure 41B:
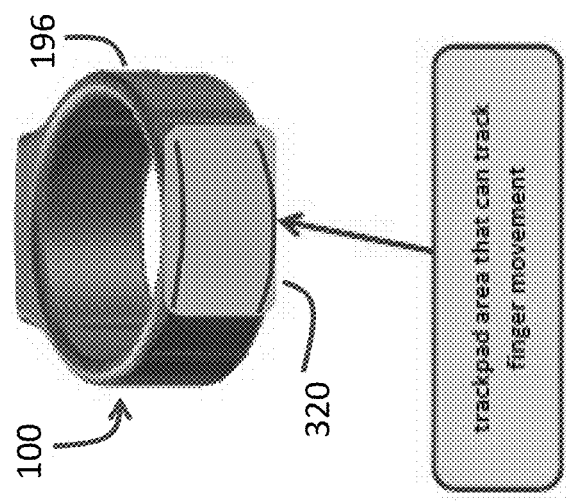
Figure 41A:
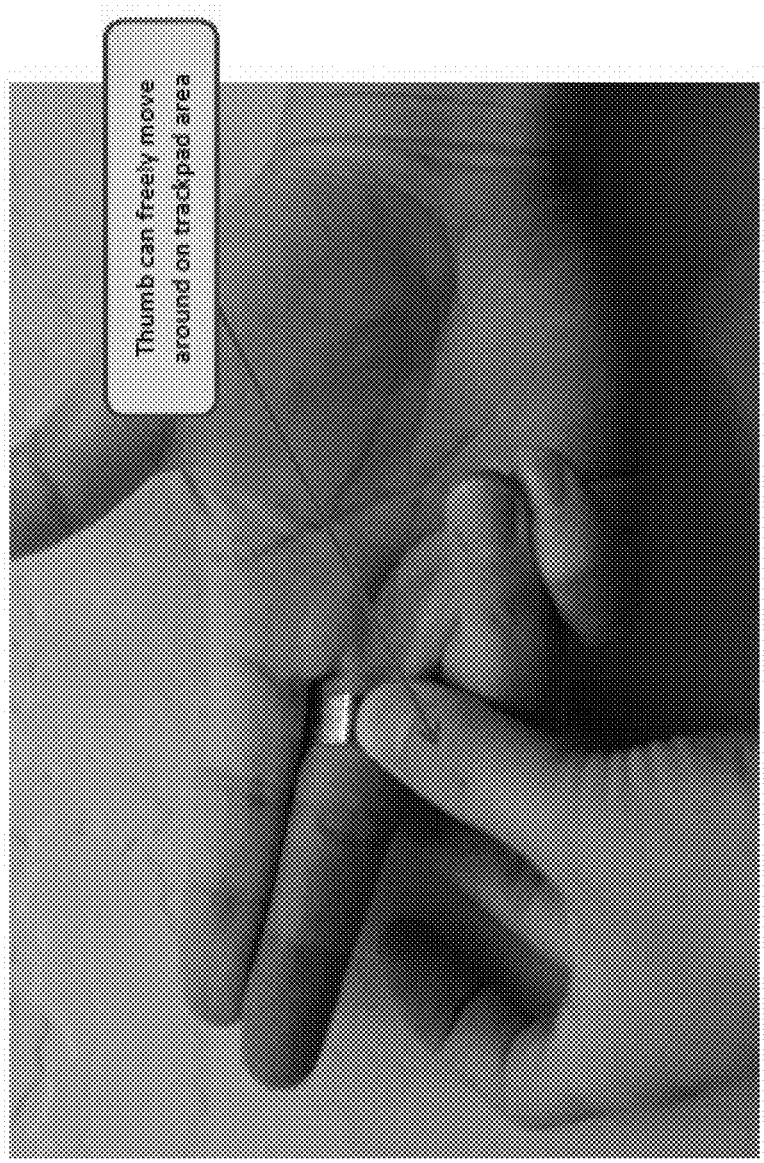

Referring to FIGS. 41A and 41B, the user may apply a finger and hand gesture in which the index finger is pressed against the middle finger so that the index finger contacts the ring 100 to activate the touch/proximity sensors of the contact region 196. The little and ring fingers are curled inward so that the ring finger does not activate a touch or proximity sensor. The ring 100 is worn on the right hand, and the thumb on the left hand can move freely across the trackpad area 320.

For example, the same left to right swipe movement on the trackpad area 320 may be interpreted differently depending on whether the finger and hand gesture shown in FIG. 37A, 38A, 39A, 40A, or 41A is applied. Additional combinations of trackpad movements and finger and hand gestures can be used.

The following describes examples of using the ring 100 to detect finger and hand gestures to control devices in a home.

Use Case 1

Figure 42:
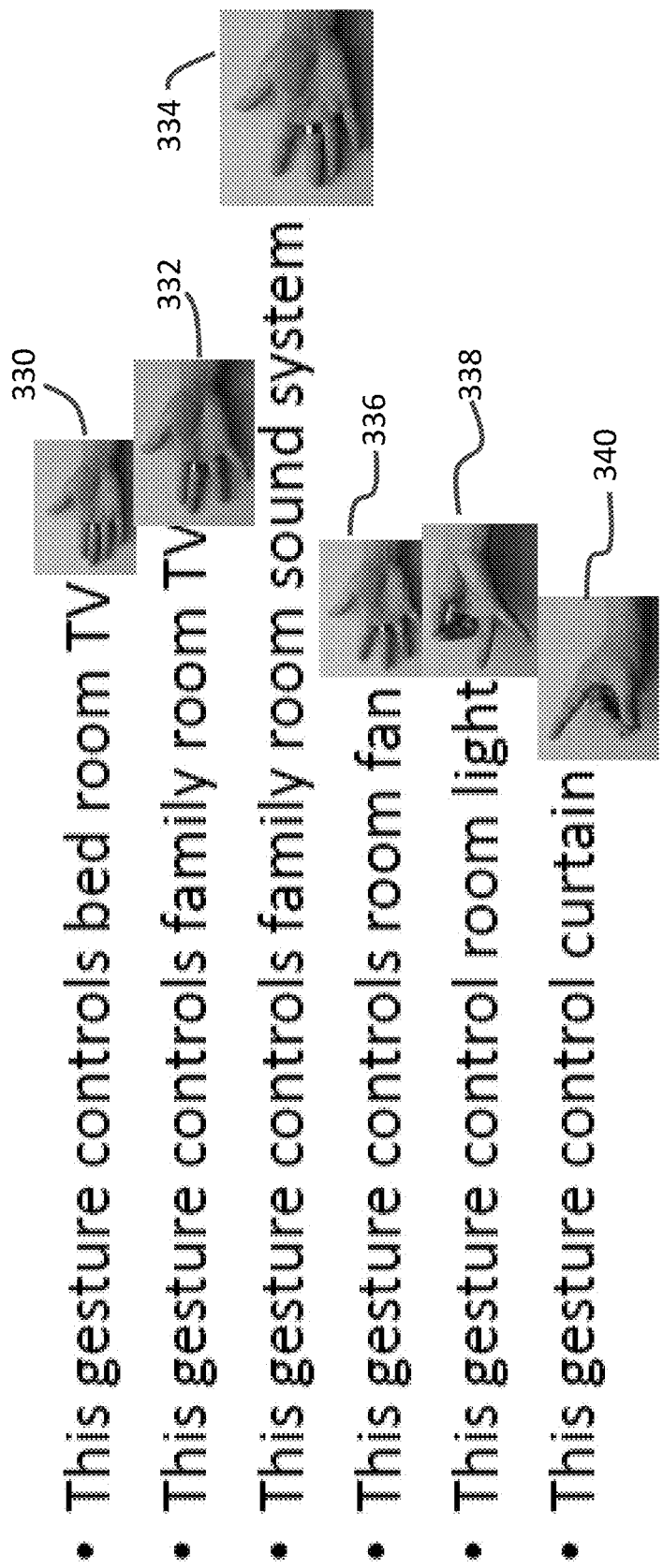
FIG. 42 shows examples of associating different gestures with different devices.

Referring to FIG. 42, in some implementations, different finger gestures can be associated with different devices to allow the same hand movement to control different devices. For example, the user can apply a finger gesture 330 so that subsequent hand movements are interpreted as commands for controlling a bed room television. Similarly, finger gestures 332, 334, 336, 338, and 340 can be associated with a family room television, a family room sound system, a room fan, a room light, and a curtain, respectively. The user can apply the finger gesture 332, 334, 336, 338, or 340, so that subsequent hand movements are interpreted as commands for controlling the family room television, the family room sound system, the room fan, the room light, or the curtain, respectively. Assignment of finger gestures to devices can be different from the above. An advantage of using the ring 100 is that the user can control multiple devices without using multiple remote controls and switching control between different devices only need to switch between different finger gestures Use Case 2

In some implementations, while applying a finger gesture, different hand movements can be used to indicate different commands. For example, assume that the user applies the finger gesture 330 to indicate that the hand movements should be interpreted as commands for controlling the bed room television. While maintaining the finger gesture, the user can swing the hand up or down to increase or decrease, respectively, the television audio volume. The user can swing the hand left or right to decrease or increase, respectively, the channel number. If the user wants to jump to a different channel, the user can apply a finger gesture and movement to bring up a numeric keypad, and then draw in the air to indicate the channel number. For example, the user can draw 234 in the air indicate channel 234.

Use Case 3

In some implementations, touch or proximity inputs on the trackpad 320 can be used in combination with finger gestures. For example, to control a television, the user can apply one of the gestures (e.g., a gesture shown in FIGS. 37A to 41A) and swipe a fingertip on the ring trackpad 320 up or down to increase or decrease, respectively, the volume. The user can swipe the fingertip left or right to decrease or increase, respectively, the channel number. To jump to a different channel, the user can apply a finger gesture and movement to bring up the numeric keypad, then draw in the air the channel number. For example, the user can draw 234 in the air indicate channel 234.

Use Case 4

The ring control device can facilitate recognition of hand sign language by a machine. For example, the user can wear two rings on each hand. The user can "speak" sign language with both finger and hand movements and the rings capture both hand movements and finger gestures. The captured data can be processed by ring's central controller or are transmitted to an external device, such as a smart phone, which translates the sign language to text or speech. This way, sign language can be entered into a machine or translated into voice by a text to voice program directly.

In some implementations, the rings can be used with other systems to enhance the accuracy of sign language interpretation. For example, a system may use a camera to capture a video of the hand movements, and the hand movements are analyzed to determine the words represented by the hand movements. The data on finger gesture detected by the rings can be used to increase the accuracy of the video analysis of the sign language.

Use Case 5

In some implementations, when the user plays video games, the user can issue commands in the game by applying both finger and hand gestures and use the ring 100 to detect the gestures. For example, in a combat game, the user can switch weapons by changing the finger gestures, or the user can reload the gun with new ammunition by bumping the weapon-holding hand with another hand, mimicking real world gun fighting, the ring's accelerometer will pick up the bump signal and reload the weapons. The ring 100 can be used in many types of games, including sports games, shooting games, and fighting games.

In some implementations, the ring 100 can be used in virtual reality applications. For example, the user may wear a pair of goggles that has built-in displays and motion sensors for providing a virtual reality experience. The user may use the ring 100 to detect various finger and hand gestures to issue commands, such as move forward or backward, move up or down, or zoom in or out.

Figure 43:
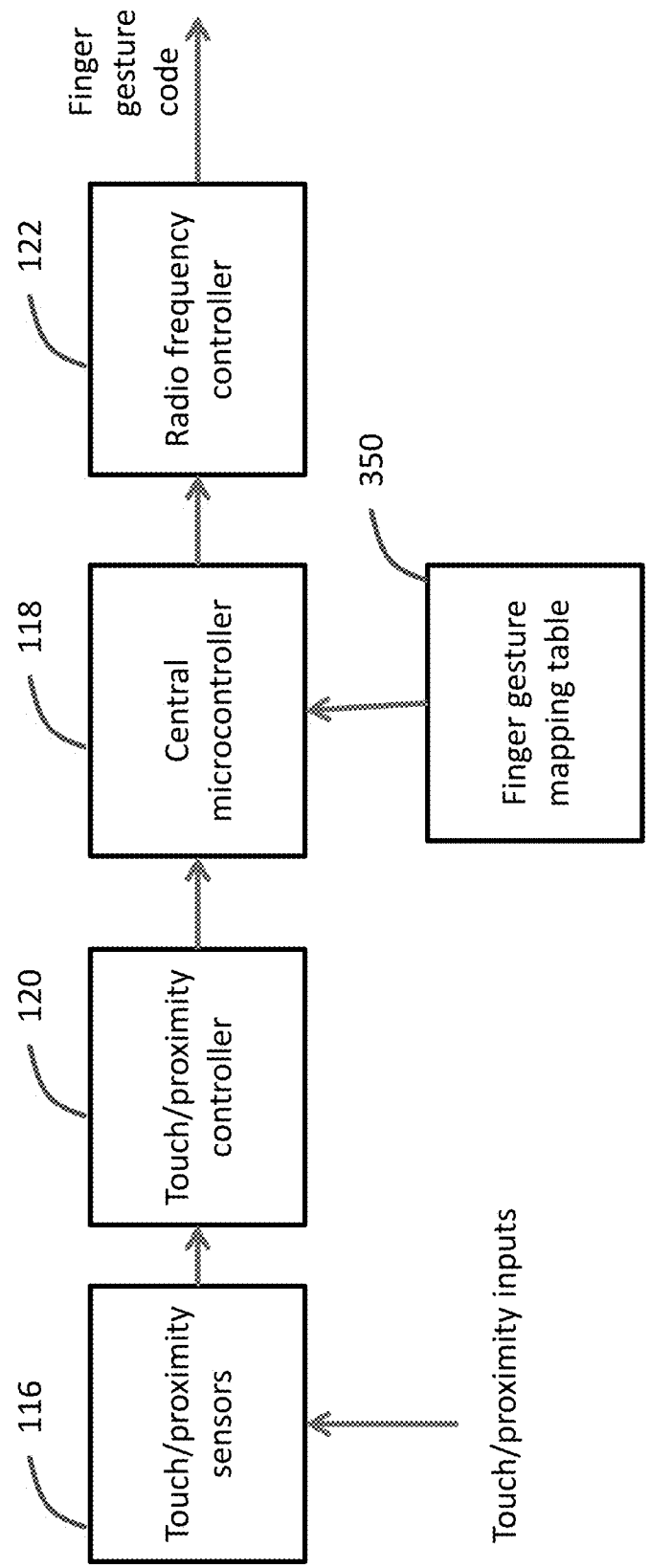
FIG. 43 shows a block diagram of an exemplary ring that can detect finger gestures.

Referring to FIG. 43, in some implementations, the ring 100 includes a flash memory that stores a table 350 having information about a mapping between finger gestures, and the contact regions that are triggered. When the user's fingers touch the contact regions (e.g., 190, 192, 196, 198), the sensing points of the touch/proximity sensor 116 or 118 detect the touch/proximity inputs, and sends the sensor data to the touch/proximity controller 120. The touch/proximity controller 120 processes the sensor data to the central microcontroller 118, which determines which of the contact regions (e.g., 190, 192, 196, 198, 200, 202) have been triggered. Based on information from the finger gesture mapping table 350, the central microcontroller 118 identifies a finger gesture. The central microcontroller 118 provides a gesture code representing the finger gesture to the radio frequency controller 122, which sends the gesture code to an external controller.

Table 1 show below is an example of the finger gesture mapping table 350 that can be used to detect the finger and hand gestures shown in FIGS. 6A to 26A.

TABLE 1

| Finger/hand gesture code | Contact regions that are triggered |
| --- | --- |
| 1 | 196, 198 |
| 2 | 196 |
| 3 | 198 |
| 4 | None |

TABLE 1-continued

| Finger/hand gesture code | Contact regions that are triggered |
| --- | --- |
| 5 | 192, 196 |
| 6 | 192 |
| 7 | 192, 198 |
| 8 | 192, 196, 198 |
| 9 | 190, 192, 198 |
| 10 | 190, 192 |
| 11 | 190, 192, 196 |
| 12 | 190, 192, 196, 198 |
| 13 | 196, 200 |
| 14 | 190, 192, 196, 200 |
| 15 | 190, 192, 196, 202 |
| 16 | 196, 198, 202 |
| 17 | 196, 202 |
| 18 | 190, 192, 196, 198, 230, 232 |

In some implementations, a variety of finger gestures can be formed by tapping various fingers together in various sequences. The ring 100 is useful in detecting these gestures and converting them into commands for interacting with machines. The following examples assume that the ring 100 is worn on the middle finger. For example, a gesture input can be associated with a single tap on the contact region 196. A gesture input can be associated with a single tap on the contact region 198. A gesture input can be associated with a double-tap on the contact region 196. A gesture input can be associated with a double-tap on the contact region 198. A gesture input can be associated with a triple-tap on the contact region 196. A gesture input can be associated with a triple-tap on the contact region 198. A gesture input can be associated with simultaneously single-taps on the contact regions 196 and 198. This gesture input can be provided by tapping the index, middle, and ring fingers together once. A gesture input can be associated with simultaneously double-taps on the contact regions 196 and 198. This gesture input can be provided by tapping the index, middle, and ring fingers together twice in quick succession. A gesture input can be associated with simultaneously triple-taps on the contact regions 196 and 198. This gesture input can be provided by tapping the index, middle, and ring fingers together three times in quick succession. Thus, a variety of gesture inputs can be provided by varying the number of taps at the contact regions 196 and 198, either separately or simultaneously.

For example, a gesture input can be associated with a tap on the contact region 196 followed by a tap on the contact region 198. This can be achieved by tapping the index and middle fingers together once followed by tapping the middle and ring fingers together once. A gesture input can be associated with a tap on the contact region 198 followed by a tap on the contact region 196. This can be achieved by tapping the middle and ring fingers together once followed by tapping the index and middle fingers together once. A gesture input can be associated with three-tap sequence: a tap on the contact region 196 followed by a tap on the contact region 198 followed by a tap on the contact region 196. A gesture input can be associated with a three-tap sequence: a tap on the contact region 198 followed by a tap on the contact region 196 followed by a tap on the contact region 198.

A gesture input can be associated with a four-tap sequence in which the contact regions 196, 198, 196, and 198 are tapped in sequence. A gesture input can be associated with a four-tap sequence in which the contact regions 198, 196, 198, and 196 are tapped in sequence. A gesture input can be associated with a double-tap on the contact region 196 followed by a double-tap on the contact region 198. A gesture input can be associated with a double-tap on the contact region 198 followed by a double-tap on the contact region 196. A gesture input can be associated with a tap on the contact region 196 followed by a triple-tap on the contact region 198. A gesture input can be associated with a tap on the contact region 198 followed by a triple-tap on the contact region 196. A gesture input can be associated with a triple-tap on the contact region 196 followed by a single tap on the contact region 198. A gesture input can be associated with a triple-tap on the contact region 198 followed by a single-tap on the contact region 196.

A gesture input can be associated with a five-tap sequence in which a double-tap on the contact region 196 is followed by a triple-tap on the contact region 198. A gesture input can be associated with a double-tap on the contact region 198 followed by a triple-tap on the contact region 196. A gesture input can be associated with a triple-tap on the contact region 196 followed by a double-tap on the contact region 198. A gesture input can be associated with a triple-tap on the contact region 198 followed by a double-tap on the contact region 196.

A gesture input can be associated with a sequence in which a tap on the contact region 196 is followed by simultaneous taps on both contact regions 196 and 198. A gesture input can be associated with a sequence in which a tap on the contact region 198 is followed by simultaneous taps on both contact regions 196 and 198. A gesture input can be associated with a sequence in which simultaneous taps on the contact regions 196 and 198 are followed by a tap on the contact region 196. A gesture input can be associated with a sequence in which simultaneous taps on both contact regions 196 and 198 are followed by a tap on the contact region 198. Thus, a variety of gesture inputs can be provided by varying the sequence and types of taps at the contact regions 196 and 198, either separately or simultaneously.

If each tap (on either contact region 196 or 198, or both) is considered one step, the user can (with some practice) perform a gesture input that involves four steps within about one second. There are three one-step gesture inputs: single-tap on contact region 196, single-tap on contact region 198, and simultaneously single-taps on contact regions 196 and 198. There are 3×3=9 two-step gesture inputs. An example of a two-step gesture input is a double-tap on the contact region 196. Another example of a two-step gesture input is a single-tap on the contact region 196 followed by a single-tap on the contact region 198. There are 3×3×3=27 three-step gesture inputs. An example of a three-step gesture input is a single-tap on contact region 196 followed by a single-tap on contact region 198, followed by a single-tap on contact region 196. There are 3×3×3×3=81 four-step gesture inputs. An example of a four-step gesture input is a single-tap on contact region 196 followed by a single-tap on contact region 198, followed by a single-tap on contact region 196, followed by a single-tap on contact region 198. Another example of a four-step gesture input is a single-tap on contact region 196 followed by a single-tap on contact region 198, followed by a single-tap on contact region 196, followed by a single-tap on contact region 198. Thus, by using either one-step, two-step, three-step, or four-step gesture inputs, there can be 3+9+27+81=120 different gesture inputs.

If the number of steps is increased to five, there can be $120+3^5=363$ different gesture inputs. If the number of steps is increased to six, there can be $363+3^6=1092$ different gesture inputs. For example, the multi-step gesture input can be used as a passcode. The passcode can be used to unlock, e.g., television channels that were restricted using parental control settings. Using the ring 100 to provide a multi-step gesture input as passcode can be more convenient than selecting alphabets or numerals on a television using arrow keys of a TV remote control.

Table 2 below shows examples of gesture inputs that can be generated by using tap sequences at the contact regions 196 and 198, either separately or simultaneously. For example, the notation "single-tap 196→double-tap 198→single-taps 196, 198" means that the gesture input is associated with a sequence in which a single tap on contact region 196 is followed by a double-tap on contact region 198, followed by simultaneous single taps on contact regions 196 and 198. The notation "double-taps 196, 198→single-taps 196, 198" means that the gesture input is associated with a sequence in which simultaneous double-taps on contact regions 196, 198 are followed by simultaneous single-taps on contact regions 196, 198.

TABLE 2

| Gesture code | Finger gesture |
|---|---|
| 101 | Single-tap 196 |
| 102 | Single-tap 198 |
| 103 | Single-taps 196, 198 |
| 104 | Double-tap 196 |
| 105 | Double-tap 198 |
| 106 | Double-taps 196, 198 |
| 107 | Single-tap 196 → single-tap 198 |
| 108 | Single-tap 198 → single-tap 196 |
| 109 | Single-tap 196 → single-taps 196, 198 |
| 110 | Single-tap 198 → single-taps 196, 198 |
| 111 | Single-taps 196, 198 → single-tap 196 |
| 112 | Single-taps 196, 198 → single-tap 198 |
| 113 | Triple-tap 196 |
| 114 | Triple-tap 198 |
| 115 | Triple-taps 196, 198 |
| 116 | Single-tap 196 → double-tap 198 |
| 117 | Double-tap 198 → single-tap 196 |
| 118 | Single-tap 198 → double-tap 196 |
| 119 | Double-tap 196 → single-tap 198 |
| 120 | Single-tap 196 → double-taps 196, 198 |
| 121 | Single-tap 198 → double-taps 196, 198 |
| 122 | Double-tap 196 → single-taps 196, 198 |
| 123 | Double-tap 198 → single-taps 196, 198 |
| 124 | Double-tap 196 → double-tap 198 |
| 125 | Double-tap 198 → double-tap 196 |
| 126 | Single-tap 196 → triple-taps 196, 198 |
| 127 | Single-tap 198 → triple-taps 196, 198 |
| 128 | Double-tap 196 → double-taps 196, 198 |
| 129 | Double-tap 196 → triple-taps 196, 198 |
| 130 | Double-tap 198 → double-taps 196, 198 |
| 131 | Double-tap 198 → triple-taps 196, 198 |
| 132 | Triple-tap 196 → single-taps 196, 198 |
| 133 | Triple-tap 196 → double-taps 196, 198 |
| 134 | Triple-tap 196 → triple-taps 196, 198 |
| 135 | Triple-tap 198 → single-taps 196, 198 |
| 136 | Triple-tap 198 → double-taps 196, 198 |
| 137 | Triple-tap 198 → triple-taps 196, 198 |

Table 2 shows a portion of the possible gesture inputs that can be provided using taps on the contact regions 196 and 198 of the ring 100. In some examples, the contact region 190 (which can be touched by the thumb) can also be used in combination with the contact regions 196 and 198, increasing the number of gesture inputs that can be provided using a sequence of taps.

The gesture inputs shown in Table 2 can be used in combination with the gesture inputs shown in Table 1 and other finger/hand gesture inputs described above.

Example 1

A virtual reality application may allow a user wearing a virtual reality goggle or helmet to experience traveling to a distant land, such as the Amazon forest, or a distant planet, such as Mars. While the user is wearing the goggle or helmet and viewing scenes in the virtual reality environment, it is difficult for the user to type on a keyboard since it is difficult (or not possible) for the user to see the keys on the keyboard. The user may use a game controller having selection buttons and arrow buttons. However, the user may need considerable practice in order to be able to memorize the locations of the various buttons and be able to accurately press the correct buttons on the game controller without actually seeing the buttons. The ring 100 allows the user to interact with the virtual reality system using intuitive finger and hand gestures without the need to see the ring 100.

For example, in the virtual reality application, the "triple-taps 196, 198" gesture may be associated with a command that invokes a top-level menu, which may provide menu items such as "Start Navigation," "Save Location," "Change Location," and "Exit Program." Invoking the top-level menu means that the top-level menu is shown within the virtual reality environment. By swiping right or left on trackpad 320, the user can scroll up or down the menu. Upon reaching the desired menu item, the user may double tap on the trackpad 320 to select the menu item. The user may then use the "triple-taps 196, 198" gesture to cancel the top-level menu and continue to be immersed in the virtual reality environment.

When in navigation mode, the user can turn his/her head (and body) to change direction. The user can use the gesture in FIG. 39A and swipe the trackpad region 320 to move forward or backward in the virtual reality environment. When the user swipes the thumb from left to right and lifts the thumb from the trackpad region 320 at the end of the swipe movement, the user moves forward in the virtual reality environment, and the amount of movement is proportional to the amount of swipe movement while the thumb engages the trackpad region 320. When the user swipes the thumb from right to left and lifts the thumb from the trackpad region 320 at the end of the swipe movement, the user moves backward in the virtual reality environment, and the amount of movement is proportional to the amount of swipe movement while the thumb engages the trackpad region 320. When the user swipes the thumb from left to right and keeps the thumb on the trackpad region 320 at the end of the swipe movement, the user continues to move forward in the virtual reality environment for as long as the thumb remains on the trackpad region 320. When the user swipes the thumb from right to left and keeps the thumb on the trackpad region 320 at the end of the swipe movement, the user continues to move backward in the virtual reality environment for as long as the thumb remains on the trackpad region 320.

The user can use the gesture in FIG. 37A and swipe the trackpad region 320 to zoom in or out in the virtual reality environment. The effect of "zooming in" is similar to using a telephoto lens, which causes objects to be magnified and the field of view to be narrower. The effect of "zooming out" is similar to using a wide angle lens, which causes objects to reduce in size and the field of view to be wider. When the user swipes the thumb from left to right and lifts the thumb from the trackpad region 320 at the end of the swipe movement, the user zooms in within the virtual reality environment, and the amount of zooming is proportional to the amount of swipe movement while the thumb engages the trackpad region 320. When the user swipes the thumb from right to left and lifts the thumb from the trackpad region 320 at the end of the swipe movement, the user zooms out within the virtual reality environment, and the amount of zooming out is proportional to the amount of swipe movement while the thumb engages the trackpad region 320. When the user swipes the thumb from left to right and keeps the thumb on the trackpad region 320 at the end of the swipe movement, the user continues to zoom in within the virtual reality environment for as long as the thumb remains on the trackpad region 320. When the user swipes the thumb from right to left and keeps the thumb on the trackpad region 320 at the end of the swipe movement, the user continues to zoom out in the virtual reality environment for as long as the thumb remains on the trackpad region 320.

Example 2

The user wears a virtual reality goggle or helmet and sits on a chair to enjoy a virtual reality tour of a distant land. When the user turns his/her head left, right, up, or down, he/she can see to the left, right, up, or down within the virtual reality environment. However, the user may also wish to be able to navigate the virtual reality environment without turning his/her head. For example, the user may sit on a couch and would like to see the scene behind him in the virtual reality environment without actually turning his/her head to look backwards. The ring 100 can be used to provide navigation commands to allow the user to navigate in the virtual reality environment using simple finger and hand movements.

For example, the user uses "double-tap 196" gesture to indicate the start of using finger hand gestures for navigation. The following are examples of finger/hand gestures for turning left or right, moving position left or right, moving position forward or backward, tilting head up or down, and position moving up or down. These are merely examples; the user can assign any finger/hand gesture to any command according to his/her preferences.

Figure 44B:
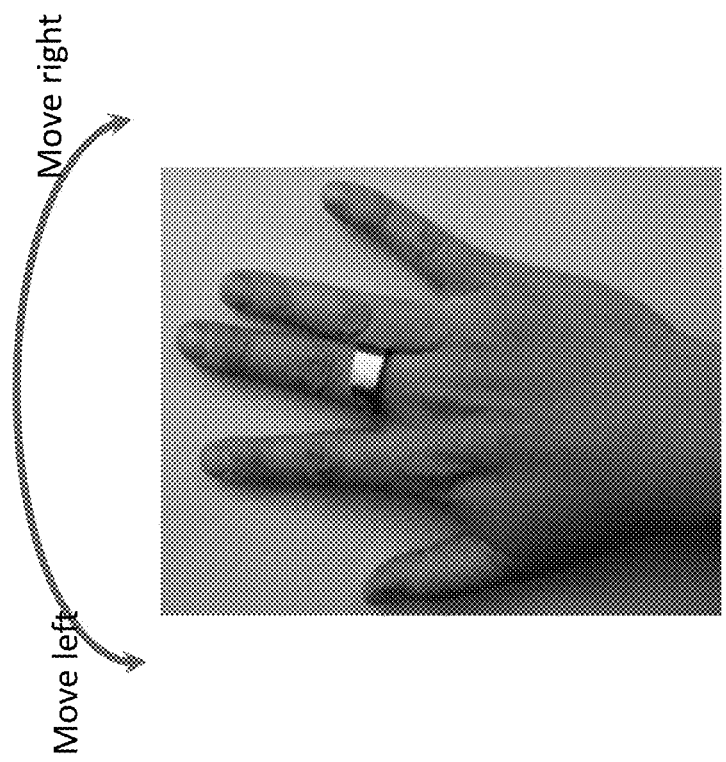
Figure 44A:
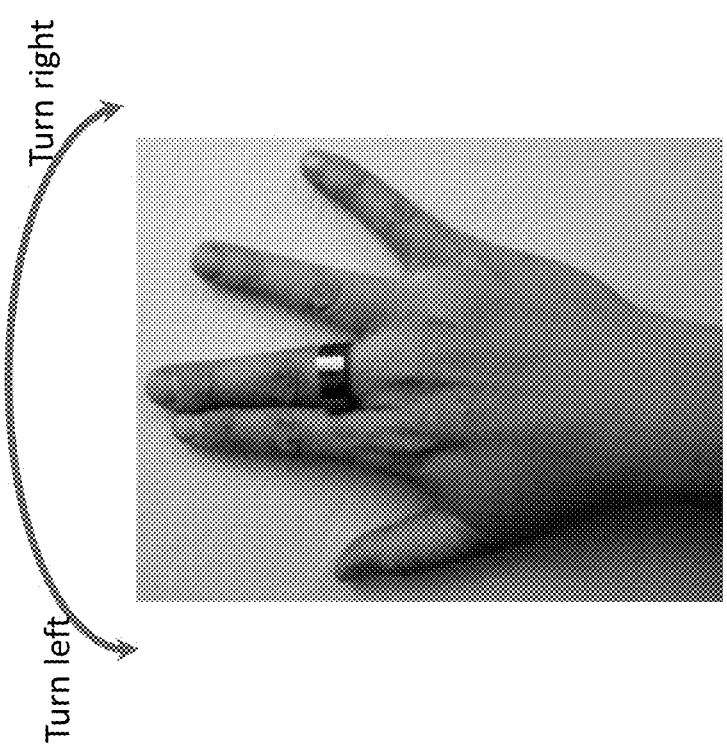

Referring to FIG. 44A, the user positions the hand with the palm facing down, and uses the gesture in FIG. 7A (corresponding to finger/hand gesture code 2 in Table 1, in which the contact region 196 is triggered) while moving the hand left or right to indicate rotating left or right, respectively, in the virtual reality environment. The accelerometers in the ring 100 can detect the left or right movements.

Referring to FIG. 44B, the user positions the hand with the palm facing down, and uses the gesture in FIG. 8A (corresponding to finger/hand gesture code 3 in Table 1, in which the contact region 198 is triggered) while moving the hand left or right to indicate moving left or right, respectively, in the virtual reality environment.

Figure 44D:
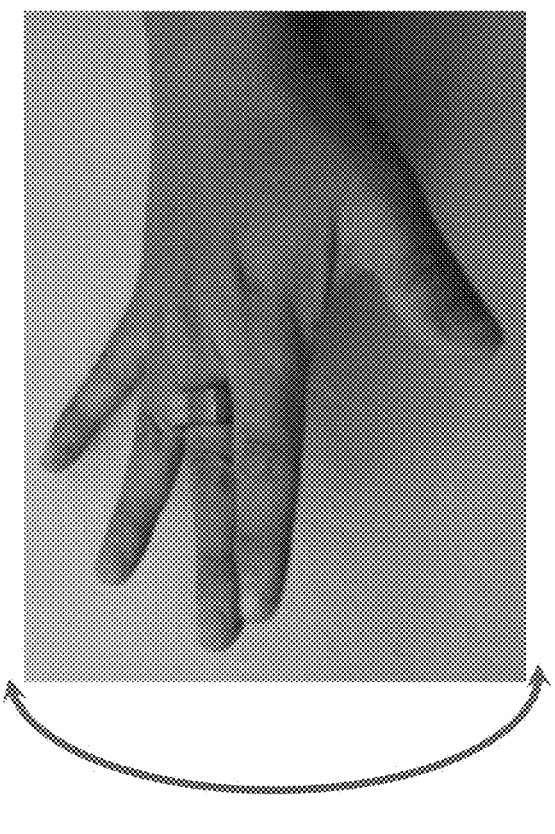
Figure 44C:
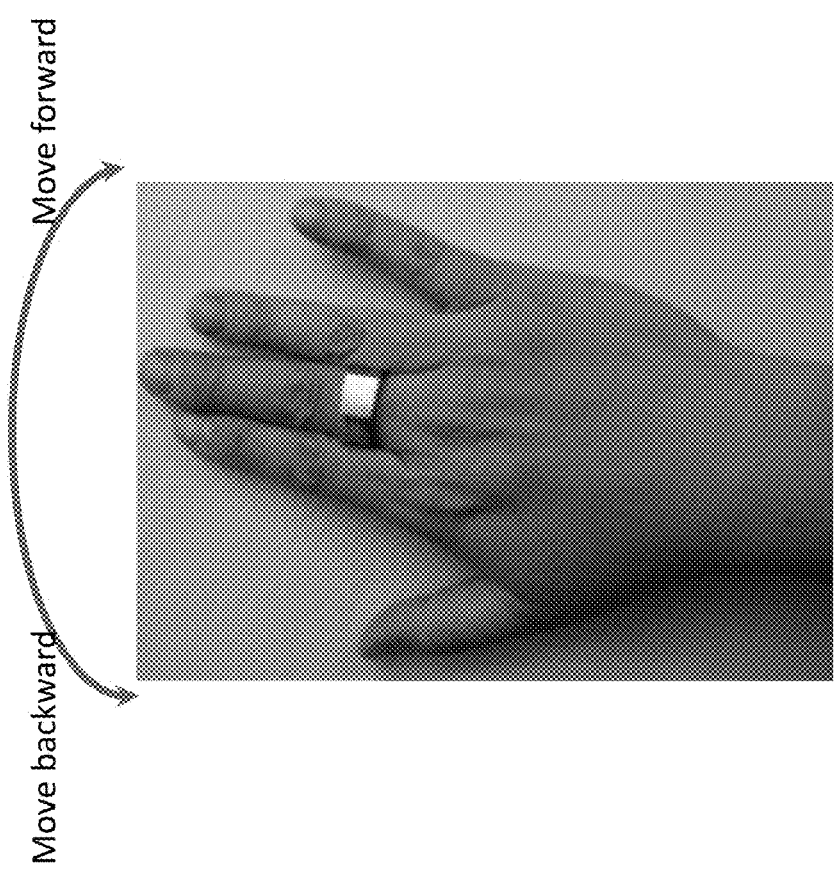

Referring to FIG. 44C, the user positions the hand with the palm facing down, and uses the gesture in FIG. 6A (corresponding to finger/hand gesture code 1 in Table 1, in which the contact regions 196, 198 are triggered) while moving the hand left or right to indicate moving backwards or forwards, respectively, in the virtual reality environment.

Referring to FIG. 44D, the user positions the hand with the palm facing down, and uses the gesture in FIG. 7A (corresponding to finger/hand gesture code 2 in Table 1, in which the contact region 196 is triggered) while moving the hand up or down to indicate tilting the head up or down, respectively, in the virtual reality environment. The accelerometers in the ring 100 can detect the up or down movements.

Figure 44F:
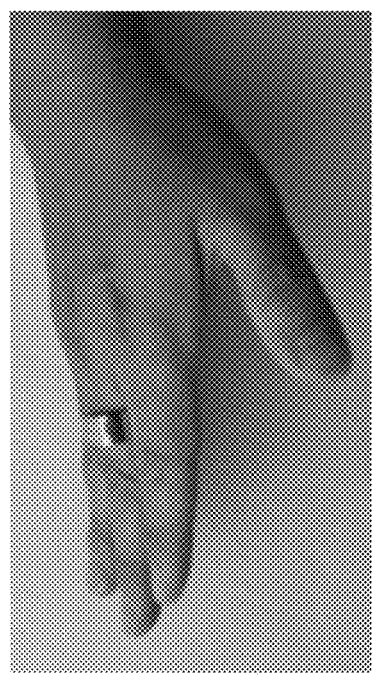
Figure 44E:
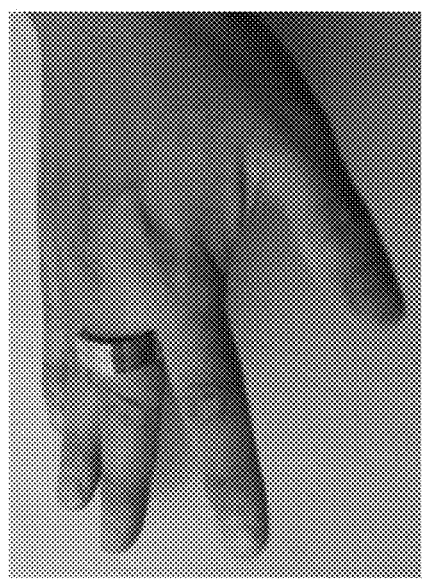

Referring to FIG. 44E, the user positions the hand with the palm facing down, and uses the gesture in FIG. 8A (corresponding to finger/hand gesture code 3 in Table 1, in which the contact region 198 is triggered) while moving the hand up or down to indicate moving up or down, respectively, in the virtual reality environment.

Referring to FIG. 44F, the user positions the hand with the palm facing down, and uses the gesture in FIG. 6A (corresponding to finger/hand gesture code 1 in Table 1, in which the contact regions 196 and 198 are triggered) while moving the hand up or down to indicate zooming out or in, respectively, in the virtual reality environment.

In the examples of FIGS. 44A to 44F, the user navigates in the virtual reality environment by simply waving the hand left, right, up, or down, with reduced movement in the forearm. This causes less fatigue in the hand, compared to using hand gestures that require more movement of the forearm. The left or right hand movement can have three different functions, depending on whether the contact region 196 or 198, or both, are contacted while making the hand movements. Similarly, the up and down movement can have three different functions, depending on whether the contact region 196 or 198, or both, are contacted while making the hand movements.

The ring 100 enables the user to use intuitive finger and hand gestures to control movements in the virtual reality environment. The example above requires the use of only one ring 100. If multiple rings are used, on the same hand or both hands, additional finger and hand gestures can be recognized and be associated with additional commands.

Example 3

The user wears a virtual reality goggle or helmet and plays a fighter jet combat game. The user can use finger and hand gestures to control both the direction of flight and fire weapons. For example, the user uses the finger/hand gesture in FIG. 6A with the palm facing down, and uses the "triple-taps 196, 198" gesture to indicate calibration. The sensors in the ring 100 detect the position of the ring, and associate that position as controlling the jet to maintain a level and straight flight direction. The user uses the finger/hand gesture in FIG. 6A and moves the hand left or right to control the heading of the jet in the virtual reality environment. The user uses the finger/hand gesture in FIG. 6A and moves the hand up or down to cause the jet to pitch up or down, respectively, in the virtual reality environment. The user tilts the hand by using a wrist movement to rotate the hand clockwise or counterclockwise (as seem in a direction from the wrist to the fingertip) to cause the jet to bank right or left in the virtual reality environment. The user uses the gesture in FIG. 39A and swipes on the trackpad region 320 left or right to decrease or increase, respectively, the throttle.

While controlling the roll, pitch, and yaw angles of the jet using hand movements, the user can use the index finger to tap on the contact region 196 to fire machine guns, or use the ring finger to tap the contact region 198 to fire missiles. The user taps the contact region 196 by separating the index and middle fingers briefly, then quickly pressing the index and middle fingers together. To repeatedly fire machine guns, the user repeatedly separating the index and middle fingers and then pressing the fingers together. The user taps the contact region 198 by separating the middle and ring fingers briefly, then quickly pressing the middle and ring fingers together.

The ring 100 enables the user to use intuitive finger and hand gestures to control movements of the jet and fire weapons in the virtual reality game. The example above requires the use of only one ring 100. If multiple rings are used, on the same hand or both hands, additional finger and hand gestures can be recognized and be associated with additional commands.

Example 4

For example, the ring 100 can be worn by a pianist for controlling flipping of pages of score sheets shown on a display. For example, a double-tap on the contact region 196 may indicate "flip to next page," and a double-tap on the contact region 198 may indicate "flip to previous page." As another example, a double-tap on the contact region 196 may indicate "flip to next page," and a triple-tap on the contact region 196 may indicate "flip to previous page." The ring 100 can be made light-weight by reducing the size of the battery and using a kinetic motion charger. As the pianist plays the piano, the finger wearing the ring is constantly moving and charging the battery.

Example 5

In some implementations, each of the contact regions 196 and 198 functions as a trackpad that can detect swiping movements. The user can brush the index finger up or down across the contact region 196, similar to moving a fingertip across a trackpad. The user can brush the ring finger up or down across the contact region 198, similar to moving a fingertip across a trackpad. For example, the ring 100 can be used to control selection of menu items that are shown on a wearable head-mounted display (e.g., a small screen of a pair of smart eyeglasses). The "triple-taps 196, 198" gesture can be used to invoke a menu bar. Brushing the ring finger up or down against the contact region 198 causes an active item on the menu bar to shift right or left, respectively. Tapping the index finger on the contact region 196 causes a drop-down menu to appear. Brushing the index finger up or down against the contact region 196 causes an active item on the menu to shift up or down, respectively, in the drop-down menu. Double-tapping the index finger on the contact region 196 selects a menu item.

Example 6

In some implementations, the user wears a smart goggle or helmet having a built-in display and video camera for implementing a virtual reality environment. Several documents are shown floating in front of the user in the virtual reality environment. The user moves one of the documents by grabbing and moving the document. The video camera of the smart goggle or helmet captures a video of the user's hand, and the smart goggle or helmet operating system performs video analysis to determine which document the user intends to grab, and where the user wants to place the document. The ring 100 can assist the smart goggle or helmet operating system in accurately detect the grabbing and moving motion.

For example, referring to FIG. 45A, the grabbing motion starts with the index, middle, ring, and little fingers contacting each other and curved inward, and the tip of the thumb contacts the tip of the index finger. This is indicated by (1) in the figure. The hand then moves forward, and the fingers are opened. This is indicated by (2) in the figure. As the hand reaches the document, the fingers come together again such that the index, middle, ring, and little fingers contact each other and curve inward, and the tip of the thumb contacts the tip of the index finger. This is indicated by (3) in the figure. The ring 100 can detect the grabbing movement described above by detecting contacts at the regions 196 and 198 initially, detecting no contacts at the regions 196 and 198 and detecting forward movements using accelerometers, and then detecting stopping of the forward movement and detecting contacts at the regions 196 and 198 again.

Referring to FIG. 45B, once a document is "grabbed" (as indicated by (4) in the figure), the user can move the hand to a new position while maintaining the hand gesture in which both contact regions 196 and 198 are triggered. When the document reaches its destination location, the user can "release" the document by opening the hand and spreading out the fingers so that the contact regions 196 and 198 are not triggered.

Figure 46:
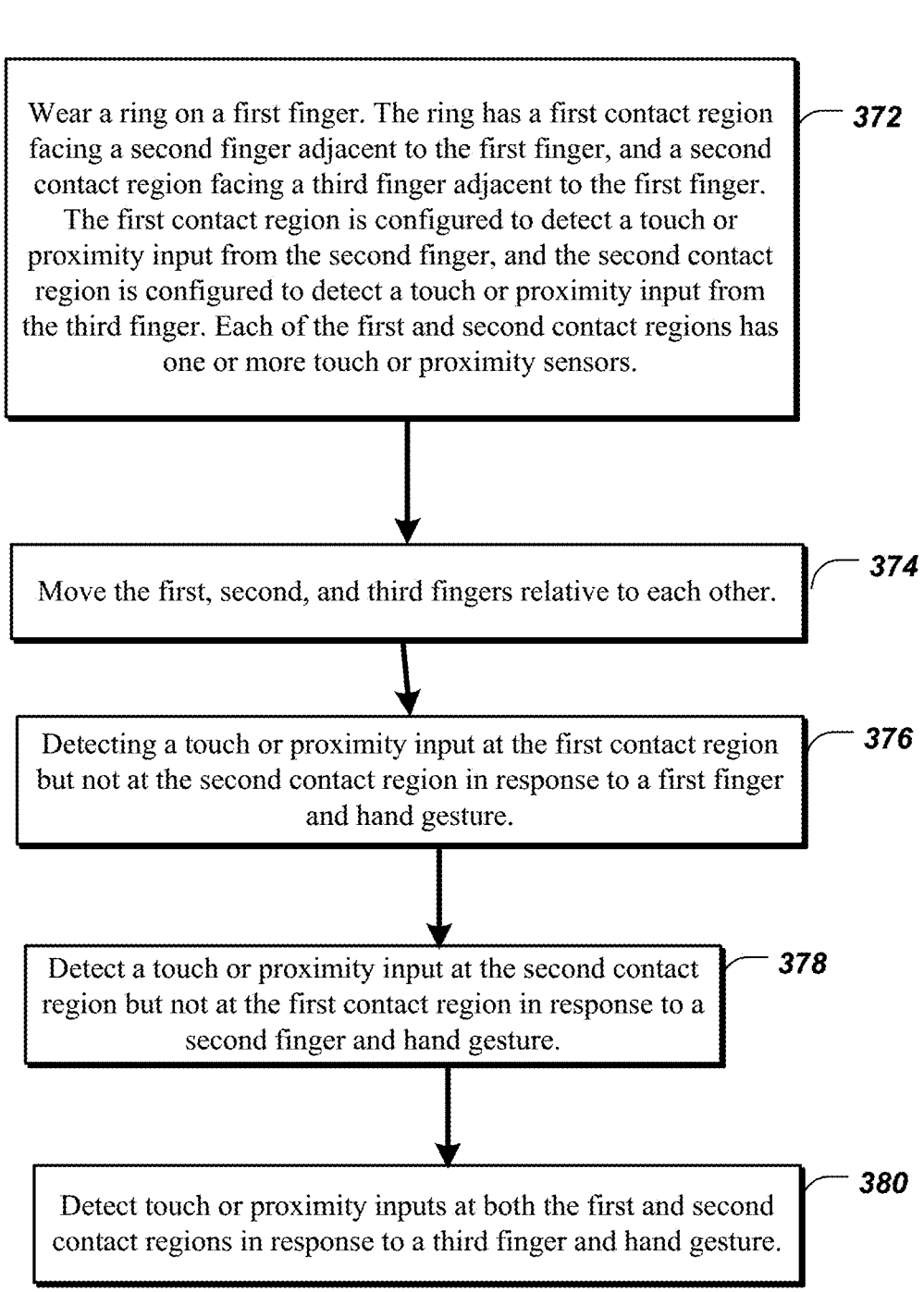
FIGS. 46-48 are flow diagrams of exemplary processes for identifying finger and hand gestures.

Referring to FIG. 46, a process 370 for identifying finger and hand gestures is provided. The process 370 includes wearing a ring on a first finger (372), in which the ring has a first contact region facing a second finger adjacent to the first finger, and a second contact region facing a third finger adjacent to the first finger. The first contact region is configured to detect a touch or proximity input from the second finger, and the second contact region is configured to detect a touch or proximity input from the third finger. Each of the first and second contact regions has one or more touch or proximity sensors.

For example, the ring can be the ring 100 of FIGS. 1 to 45B. The first contact region can be the contact region 196, and the second contact region can be the contact region 198.

The process 370 includes moving the first, second, and third fingers relative to each other (374), detecting a touch or proximity input at the first contact region but not at the second contact region in response to a first finger and hand gesture (376), detecting a touch or proximity input at the second contact region but not at the first contact region in response to a second finger and hand gesture (378), and detecting touch or proximity inputs at both the first and second contact regions in response to a third finger and hand gesture (380).

For example, the first, second, and third fingers can be the middle, index, and ring fingers, respectively. The first finger and hand gesture can be the gesture shown in FIG. 7A, the second finger and hand gesture can be the gesture shown in FIG. 8A, and the third finger and hand gesture can be the gesture shown in FIG. 6A.

For example, the first, second, and third fingers can be the index, thumb, and middle fingers, respectively. The first finger and hand gesture can be the gesture shown in FIG. 28C, the second finger and hand gesture can be the gesture shown in FIG. 28A, and the third finger and hand gesture can be the gesture shown in FIG. 28B.

For example, the first, second, and third fingers can be the ring, middle, and little fingers, respectively. The first finger and hand gesture can be the gesture shown in FIG. 27A, the second finger and hand gesture can be the gesture shown in FIG. 27D, and the third finger and hand gesture can be the gesture shown in FIG. 27C.

Figure 47:
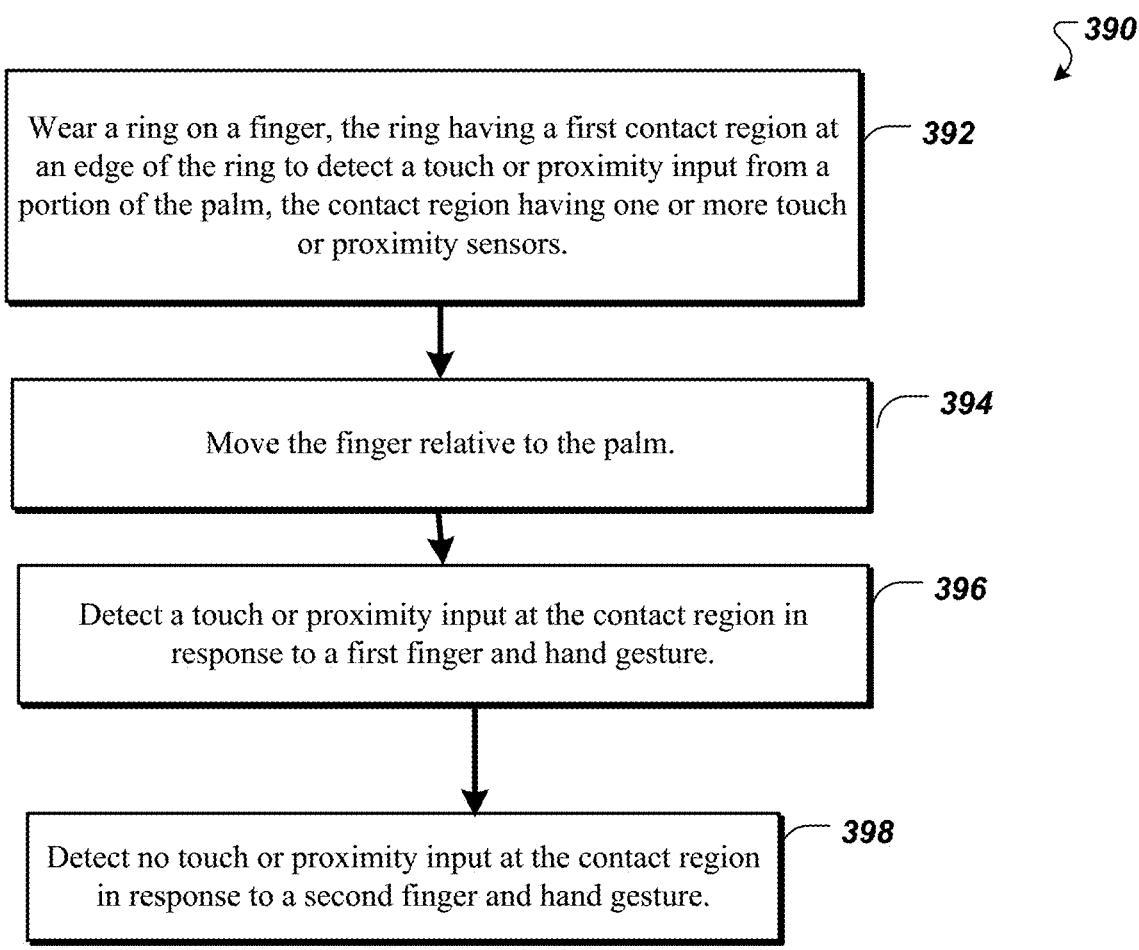

Referring to FIG. 47, a process 390 for identifying finger and hand gestures is provided. The process 390 includes wearing a ring on a finger (392). The ring has a first contact region at an edge of the ring to detect a touch or proximity input from a portion of the palm, and the contact region has one or more touch or proximity sensors. For example, the ring can be the ring 100 of FIGS. 1 to 45B. The first contact region can be the contact region 192.

The process 390 includes moving the finger relative to the palm (394), detecting a touch or proximity input at the contact region in response to a first finger and hand gesture (396), and detecting no touch or proximity input at the contact region in response to a second finger and hand gesture (398).

For example, the finger can be the middle finger, the first finger and hand gesture can be the gesture of FIG. 10A, 11A, 12A, 13A, 14A, 15A, 16A, or 17A, and the second finger and hand gesture can be the gesture of FIG. 6A, 7A, 8A, or 9A.

Figure 48:
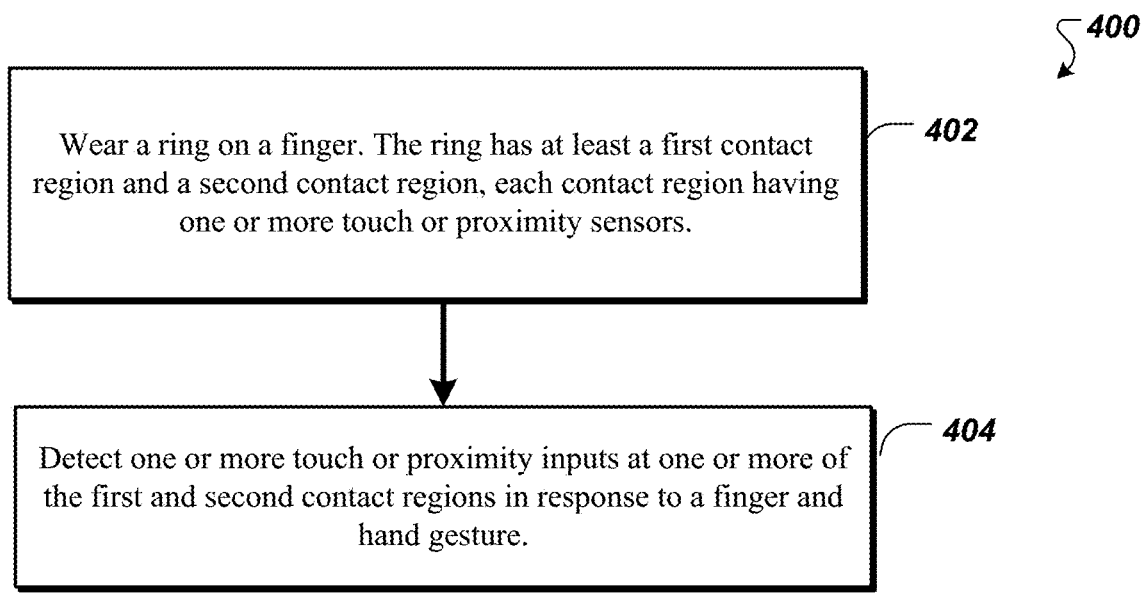

Referring to FIG. 48, a process 400 for identifying finger and hand gestures is provided. The process 400 includes wearing a ring on a finger (402). The ring has at least a first contact region and a second contact region, each contact region having one or more touch or proximity sensors.

For example, the ring can be the ring 100 of FIGS. 1 to 45B. The first and second contact regions can be any two of the contact regions 190, 192, 196, 198, 230, 232, and 320.

The process 400 includes detecting one or more touch or proximity inputs at one or more of the first and second contact regions in response to a finger and hand gesture (404). For example, The finger and hand gesture can be any of the gestures shown in FIGS. 6A to 30C and 37A to 42.

Figure 49:
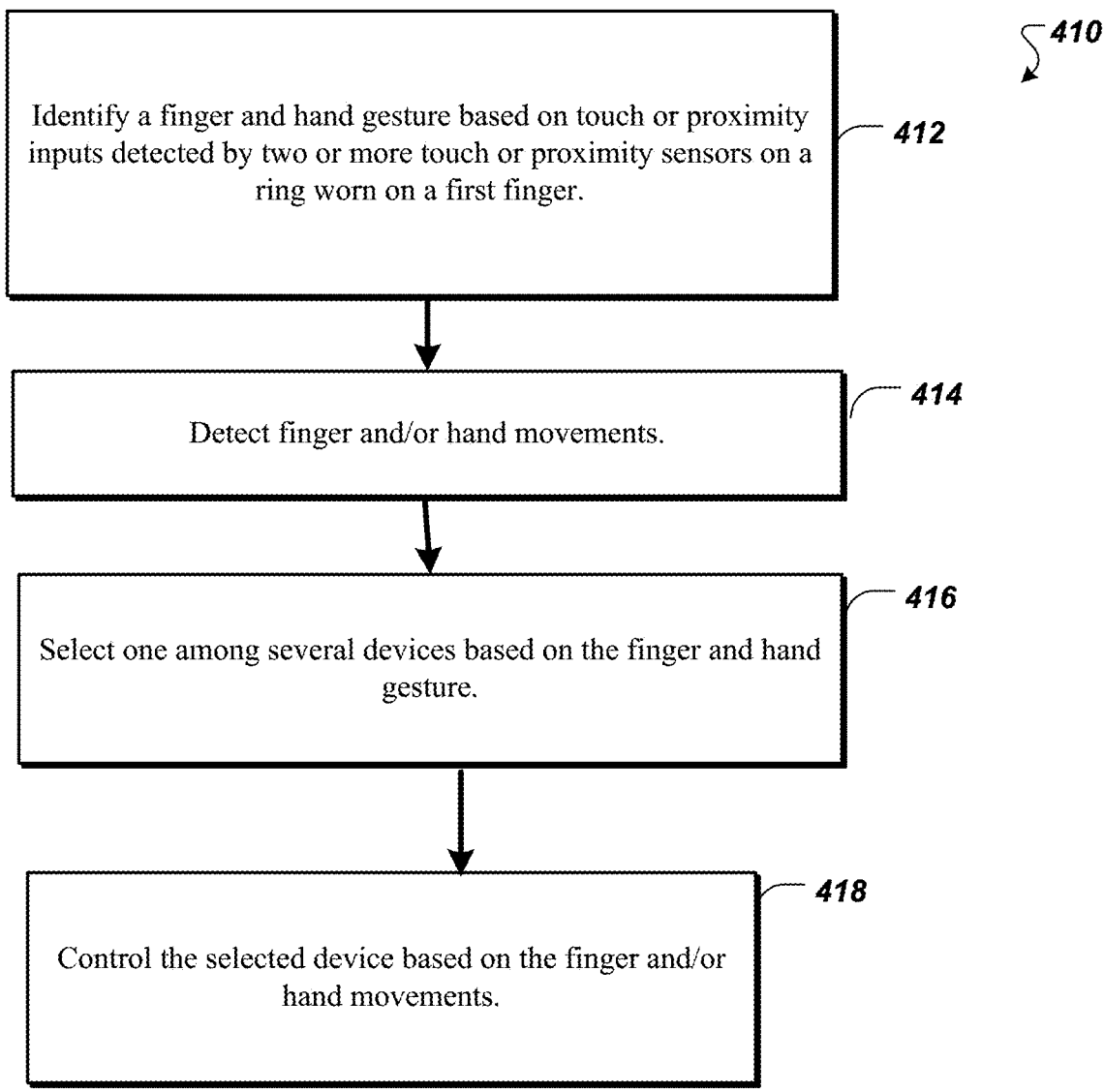
FIG. 49 is a flow diagram of an exemplary process for controlling devices.
Figure 50:
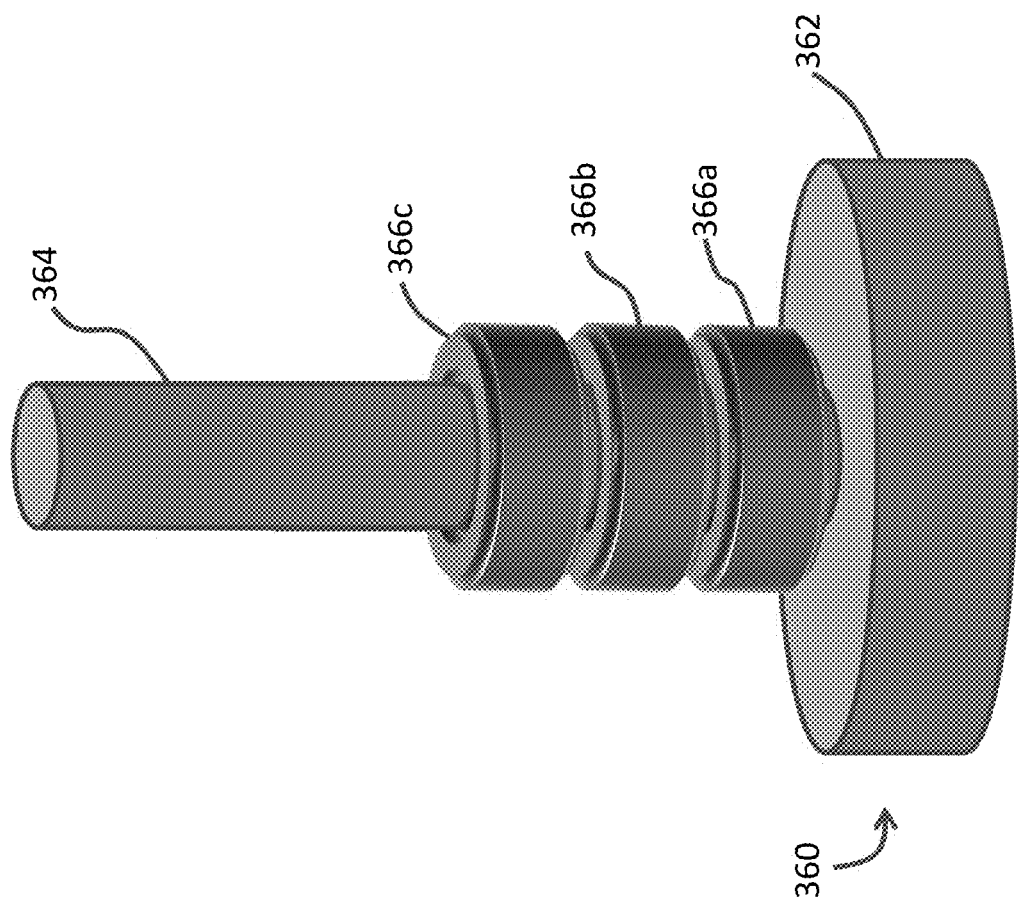
FIG. 50 is a diagram of an exemplary ring battery charger.

Referring to FIG. 49, a process 410 for controlling devices is provided. The process 410 includes identify a finger and hand gesture based on touch or proximity inputs detected by two or more touch or proximity sensors on a ring worn on a first finger (412). The process 410 includes detecting finger and/or hand movements (414), selecting one among several devices based on the finger and hand gesture (416), and controlling the selected device based on the finger and/or hand movements (418).

For example, the ring can be the ring 100 of FIGS. 1 to 45B. For example, the finger and hand gesture can be any gesture shown in FIG. 42, the finger and/or hand movements can be any finger and/or hand movements shown in FIGS. 35 and 36, and the devices can be any device shown in FIG. 42.

For example, the first finger and hand gesture can be a gesture in which a second finger contacts the ring and a third finger does not contact the ring. In some examples, the first, second, and third finger are the middle, index, and ring finger, respectively. In some examples, the first, second, and third finger are the middle, ring, and index finger, respectively. In some examples, the first, second, and third finger are the index finger, the thumb, and the middle finger, respectively. In some examples, the first, second, and third finger are the index finger, middle finger, and thumb, respectively. In some examples, the first, second, and third finger are the ring, middle, and little finger, respectively. In some examples, the first, second, and third finger are the ring, little, and middle finger, respectively.

For example, the second finger and hand gesture can be a gesture in which a second finger and a third finger both contact the ring. In some examples, the first, second, and third finger are the middle, index, and ring finger, respectively. In some examples, the first, second, and third finger are the index finger, the thumb, and the middle finger, respectively. In some examples, the first, second, and third fingers are ring, middle, and little finger, respectively.

For example, the first device can be a television, an audio device, a light device, a game console, a computer, a smart device having a data processor or controller, an augmented reality device, or a virtual reality device.

For example, a first particular finger gesture corresponding to a lock command can be detected, and a link between the selected device and the ring is maintained such that subsequence finger and/or hand movements are used to control the selected device until a second particular finger gesture corresponding to an unlock command is detected.

Other embodiments are within the scope of the following claims. For example, each of the contact regions 190, 192, 194, 196, 198, 200, and 202 can have a single touch/proximity sensor that is sensitive to touch or proximity inputs. When the ring 100 is worn on a finger, the user can bend the finger so that a portion of the finger triggers the contact region 194. The ring 100 can detect various finger and hand gestures in which the contact region 194 is either triggered or not triggered, in combination with the trigger or non-trigger of the other contact regions. In some examples, the entire outer ring surface is a single capacitive touch sensitive surface. The ring can have touch/proximity sensors with different sensitivities. For example, when the ring is worn on the middle finger, the ring may be configured to detect touch inputs from the index and ring fingers, touch inputs from a portion of the palm, and swipe inputs from the thumb. The contact regions 192, 196, and 198 can have lower density of sensor points than the contact regions 190 and 194, which need a higher density of sensor points to detect swipe movements across the surface. A smart device can be any device that has a data processor or a controller that can receive data and process data. Examples of smart devices include smart phones, smart televisions, smart refrigerators, smart ovens, smart smoke detectors, smart thermostats, but are not limited to these.

The ring 100 can be used to control an unmanned aerial vehicle (drone) or a robot. The ring 100 itself includes a battery 154. In some examples, a second ring that includes a second battery can be used. The user can wear the second ring adjacent to the first ring that has touch or proximity sensors, and electrodes between the first and second rings allow current to flow from the second ring to the first ring. Because the ring batteries are small, the user can carry a number of fresh ring batteries in one pocket, and when the ring batteries run out of power, carry the depleted ring batteries in another pocket. Referring to FIG. 46, a ring battery charging station 360 can have a base 362 and a pole 364, and ring batteries 366a, 366b, 366c can be stacked up around the pole 364. Electrodes on the lower edge of the ring battery 366a contacts the electrodes on the base 362 so that the ring battery 366a can receive a charging current from the base 362. Electrodes on the lower edge of the ring battery 366b contacts electrodes on the upper edge of the ring battery 366a, and electrodes on the lower edge of the ring battery 366c contacts electrodes on the upper edge of the ring battery 366b, thus allowing the charging current to also charge the ring batteries 366b and 366c.

What is claimed is:

1. An apparatus comprising:
a ring comprising:
two or more touch and/or proximity sensors, each touch and/or proximity sensor configured to detect touch and/or proximity inputs;
a data processor to process sensed data from the touch and/or proximity sensors;
a storage storing information about a mapping between finger gestures and sets of keys, each finger gesture corresponds to a particular touch or proximity input, or a particular combination of touch and/or proximity inputs, and different finger gestures are associated with different sets of keys; and
a communication unit to wirelessly transmit information about the sensed data or information derived from the sensed data to a receiver;

wherein the ring is configured to be worn on a finger, the ring having a first contact region positioned at an edge of the ring configured to detect a touch or proximity input from a portion of the palm or a portion of the finger when the finger bends;

wherein the ring is configured to detect a touch or proximity input at the first contact region in response to a first finger and hand gesture, wherein when the first contact region comprises a touch sensor, the touch sensor contacts the palm or the portion of the finger, and when the first contact region comprises a proximity sensor, a distance between the proximity sensor and the palm or the portion of the finger is less than a predefined distance, and wherein the ring is configured to detect no touch or proximity input at the first contact region in response to a second finger and hand gesture, wherein when the first contact region comprises a touch sensor, the touch sensor does not contact the palm or the portion of the finger, and when the first contact region comprises a proximity sensor, a distance between the proximity sensor and the palm or the portion of the finger is larger than the predefined distance.

2. The apparatus of claim 1 in which the touch and/or proximity sensor comprises a touch sensor that detects a touch input when a finger contacts the sensor, a proximity sensor that detects a proximity input when a distance between a finger and the sensor is less than a threshold, or a touch and proximity sensor that detects touch inputs and proximity inputs.

3. The apparatus of claim 1 in which the information about the sensed data comprises raw sensor data.

4. The apparatus of claim 1 in which the data processor is configured to identify which one or more touch and/or proximity sensors is or are triggered, and the information derived from the sensed data comprises information indicating which one or more touch and/or proximity sensors is or are triggered.

5. The apparatus of claim 1 in which the data processor is configured to identify a finger gesture based on the sensed data from the touch and/or proximity sensors, and the information derived from the sensed data comprises information representing the identified finger gesture.

6. The apparatus of claim 1 in which the data processor is configured to identify a command based on the sensed data from the touch and/or proximity sensors, and information derived from the sensed data comprises information representing the command.

7. The apparatus of claim 1 in which the touch and/or proximity sensor comprises at least one of a capacitance touch and/or proximity sensor, a resistive touch sensor, an infrared proximity sensor, an ambient light sensor, an inductive proximity sensor, or a laser range sensor.

8. The apparatus of claim 1 in which the ring includes at least one of an inertial measurement sensor, an accelerometer, a gyrometer, or a magnetometer to detect hand movements.

9. The apparatus of claim 1 in which the touch and/or proximity sensor is configured to detect at least one of a presence of an object in a proximity of the sensor, a distance between the sensor and an object in a proximity of the sensor, or a contact between the sensor and an object.

10. The apparatus of claim 1 in which the touch and/or proximity sensors are configured to detect approximate locations of one or more fingers relative to the ring, and the data processor is configured to determine a finger gesture based on the detected approximate locations of the one or more fingers.

11. The apparatus of claim 1 in which the ring comprises a storage storing information about a mapping between devices and touch and/or proximity input or inputs.

12. The apparatus of claim 11 in which in which upon receiving a particular touch or proximity input, or a particular combination of touch and/or proximity inputs, the ring is configured to generate signals for interacting with the device associated with the particular touch or proximity input, or the particular combination of touch and/or proximity inputs.

13. The apparatus of claim 11 in which the each of the touch or proximity input, or combination of touch and/or proximity inputs is associated with at least one of a television, an audio device, a light device, a game console, an augmented reality device, or a virtual reality device.

14. The apparatus of claim 1, comprising moving a hand to draw a character in the air and maintaining a finger gesture while drawing in the air, and using the ring to identify the character from the set of keys associated with the finger gesture.

15. The apparatus of claim 1 in which the set of keys comprise at least one of a set of alphabet keys, a set of numeric keys, a set of symbol keys, or a set of emoticon keys.

16. An apparatus comprising:
a ring comprising:
two or more contact regions, each contact region comprising one or more touch and/or proximity sensors configured to detect touch and/or proximity inputs;
a data processor to process sensed data from the contact regions;
a storage storing information about a mapping between devices and touch and/or proximity input or inputs, including a first mapping between a first device and a first finger and hand gesture and a second mapping between a second device and a second finger and hand gesture; and
a communication unit to wirelessly transmit information about the sensed data or information derived from the sensed data to a receiver;
wherein the ring is configured to be worn on a finger, the ring having a first contact region positioned at an edge of the ring configured to detect a touch or proximity input from a portion of the palm or a portion of the finger when the finger bends;
wherein the ring is configured to detect a touch or proximity input at the first contact region in response to a first finger and hand gesture, wherein when the first contact region comprises a touch sensor, the touch sensor contacts the palm or the portion of the finger, and when the first contact region comprises a proximity sensor, a distance between the proximity sensor and the palm or the portion of the finger is less than a predefined distance, and
wherein the ring is configured to detect no touch or proximity input at the first contact region in response to a second finger and hand gesture, wherein when the first contact region comprises a touch sensor, the touch sensor does not contact the palm or the portion of the finger, and when the first contact region comprises a proximity sensor, a distance between the proximity sensor and the palm or the portion of the finger is larger than the predefined distance.

17. The apparatus of claim 16 in which the touch and/or proximity sensor comprises a touch sensor that detects a touch input when a finger contacts the sensor, a proximity sensor that detects a proximity input when a distance between a finger and the sensor is less than a threshold, or a touch and proximity sensor that detects touch inputs and proximity inputs.

18. The apparatus of claim 16 in which at least one of the contact regions comprises a trackpad that detects movements cross the surface of the contact region.

19. The apparatus of claim 18 in which the trackpad is configured to detect a first swipe movement along a first direction.

20. The apparatus of claim 19 in which the trackpad is configured to detect a second swipe movement along a second direction that is opposite the first direction.

21. The apparatus of claim 19 in which the trackpad is configured to detect a second swipe movement along a second direction that is perpendicular to the first direction.

22. The apparatus of claim 21 in which the trackpad is configured to detect a third swipe movement along a third direction that is opposite the second direction.

23. The apparatus of claim 19 in which the first swipe movement comprises a clockwise circular movement.

24. The apparatus of claim 19 in which the first swipe movement comprises a linear movement along a direction parallel to a direction in which the finger is extended.

25. The apparatus of claim 19 in which the first swipe movement comprises a linear movement along a direction perpendicular to a direction in which the finger is extended.

26. The apparatus of claim 16 in which upon receiving a particular touch or proximity input, or a particular combination of touch and/or proximity inputs, the ring is configured to generate signals for interacting with the device associated with the particular touch or proximity input, or the particular combination of touch and/or proximity inputs.

27. The apparatus of claim 16 in which the each of the touch or proximity input, or combination of touch and/or proximity inputs is associated with at least one of a television, an audio device, a light device, a game console, a computer, a smart device, an augmented reality device, or a virtual reality device.

28. The apparatus of claim 16 in which the ring includes at least one of an inertial measurement sensor, an accelerometer, a gyrometer, or a magnetometer to detect hand movements.

29. The apparatus of claim 16 in which the data processor is configured to receive signals from the touch and/or proximity sensors and identify a finger gesture based on the received signals.

30. The apparatus of claim 16 in which the ring comprises a storage storing information about a mapping between finger gestures and sets of keys,
each finger gesture corresponds to a particular touch or proximity input, or a particular combination of touch and/or proximity inputs, and
different finger gestures are associated with different sets of keys.

31. The apparatus of claim 30, comprising moving a hand to draw a character in the air and maintaining a finger gesture while drawing in the air, and using the ring to identify the character from the set of keys associated with the finger gesture.

32. The apparatus of claim 31 in which the set of keys comprise at least one of a set of alphabet keys, a set of numeric keys, a set of symbol keys, or a set of emoticon keys.

33. The apparatus of claim 16 in which the ring comprises an inner ring surface and an outer ring surface, the entire outer ring surface is a touch sensitive surface, and the two or more contact regions are regions of the outer ring touch sensitive surface.

34. A system comprising:
a ring comprising:
two or more touch and/or proximity sensors, each sensor to detect touch and/or proximity inputs; and
a communication unit to wirelessly transmit signals representing the outputs from the sensors or data derived from the outputs from the sensors;
wherein the ring is configured to be worn on a finger, the ring having a first contact region positioned at an edge of the ring configured to detect a touch or proximity input from a portion of the palm or a portion of the finger when the finger bends;
wherein the ring is configured to detect a touch or proximity input at the first contact region in response to a first finger and hand gesture, wherein when the first contact region comprises a touch sensor, the touch sensor contacts the palm or the portion of the finger, and when the first contact region comprises a proximity sensor, a distance between the proximity sensor and the palm or the portion of the finger is less than a predefined distance, and
wherein the ring is configured to detect no touch or proximity input at the first contact region in response to a second finger and hand gesture, wherein when the first contact region comprises a touch sensor, the touch sensor does not contact the palm or the portion of the finger, and when the first contact region comprises a proximity sensor, a distance between the proximity sensor and the palm or the portion of the finger is larger than the predefined distance; and
a controller to receive the signals from the ring and identify a finger gesture based on the received signals, in which the controller comprises a storage storing information about a mapping between finger gestures and devices, in which different finger gestures are associated with different devices.

35. The system of claim 34 in which the controller is part of at least one of a television, an audio device, a light device, a game console, a computer, a smart device, an augmented reality device, or a virtual reality device.

36. A system comprising:
a ring comprising:
two or more touch and/or proximity sensors, each touch and/or proximity sensor configured to detect touch and/or proximity inputs;
a data processor to process sensed data from the touch and/or proximity sensors;
a storage storing information about a mapping between finger gestures and sets of keys, in which each finger gesture corresponds to a particular touch or proximity input, or a particular combination of touch and/or proximity inputs, different finger gestures are associated with different sets of keys, a first finger gesture is associated with a first set of keys, a second finger gesture is associated with a second set of keys, a first hand movement drawing in the air and maintaining the first finger gesture while drawing in the air is associated with a first character in the first set of keys, and the first hand movement drawing in the air and maintaining the second finger gesture while drawing in the air is associated with a second character in the second set of keys; and a communication unit to wirelessly transmit information about the sensed data or information derived from the sensed data to a receiver.

37. The system of claim 36 in which (i) the first set of keys comprise a set of alphabet keys, the second set of keys comprise a set of numeric keys, (ii) the first set of keys comprise a set of alphabet keys, the second set of keys comprise a set of symbol keys, (iii) the first set of keys comprise a set of alphabet keys, the second set of keys comprise a set of emoticon keys, (iv) the first set of keys comprise a set of numeric keys, the second set of keys comprise a set of symbol keys, (v) the first set of keys comprise a set of numeric keys, the second set of keys comprise, or (vi) the first set of keys comprise a set of symbol keys, the second set of keys comprise a set of emoticon keys.

38. The system of claim 36 in which a first hand movement drawing in the air a shape of a character 'O' and maintaining the first finger gesture while drawing in the air is associated with a capital letter 'O' or a small letter 'o', and the first hand movement drawing in the air the shape of the character 'O' and maintaining the second finger gesture while drawing in the air is associated with a number '0'.

39. The system of claim 36 in which a third finger gesture is associated with a third set of keys, a first hand movement drawing in the air a shape of a character 'O' and maintaining the first finger gesture while drawing in the air is associated with a capital letter 'O', the first hand movement drawing in the air the shape of the character 'O' and maintaining the second finger gesture while drawing in the air is associated with a small letter 'o', and the first hand movement drawing in the air the shape of the character 'O' and maintaining the third finger gesture while drawing in the air is associated with a number '0'.

* * * * *

UNITED STATES PATENT AND TRADEMARK OFFICE
CERTIFICATE OF CORRECTION

| | | |
|---|---|---|
| PATENT NO. | : 10,948,992 B1 | Page 1 of 1 |
| APPLICATION NO. | : 15/407288 | |
| DATED | : March 16, 2021 | |
| INVENTOR(S) | : Guiyu Bai | |

It is certified that error appears in the above-identified patent and that said Letters Patent is hereby corrected as shown below:

In the Claims

Column 28
Line 7, in Claim 12, delete "in which in which" and insert -- in which --

Column 29
Line 8, in Claim 18, delete "cross" and insert -- across --

Column 31
Lines 13-14, in Claim 37, delete "the second set of keys comprise," and insert -- the second set of keys comprise a set of emoticon keys, --

Signed and Sealed this
Twenty-second Day of June, 2021

Drew Hirshfeld
*Performing the Functions and Duties of the
Under Secretary of Commerce for Intellectual Property and
Director of the United States Patent and Trademark Office*